US012811714B2

(12) United States Patent
Gong et al.

(10) Patent No.: US 12,811,714 B2
(45) Date of Patent: Nov. 24, 2026

(54) HIGH EFFICIENT LINK ADAPTATION COMMUNICATION METHOD AND APPARATUS

(71) Applicant: HUAWEI TECHNOLOGIES CO., LTD., Shenzhen (CN)

(72) Inventors: Bo Gong, Shenzhen (CN); Jian Yu, Shenzhen (CN); Chenchen Liu, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 18/510,274

(22) Filed: Nov. 15, 2023

(65) Prior Publication Data

US 2024/0080127 A1 Mar. 7, 2024

Related U.S. Application Data

(63) Continuation of application No. PCT/CN2022/093093, filed on May 16, 2022.

(30) Foreign Application Priority Data

May 20, 2021 (CN) ........................ 202110554343.2

(51) Int. Cl.
*H04L 1/00* (2006.01)
*H04L 5/00* (2006.01)
*H04B 7/0452* (2017.01)

(52) U.S. Cl.
CPC .......... *H04L 1/0003* (2013.01); *H04L 5/0046* (2013.01); *H04B 7/0452* (2013.01)

(58) Field of Classification Search
CPC .... H04W 84/12; H04B 7/0452; H04L 1/0003; H04L 1/0009; H04L 1/0025;
(Continued)

(56) References Cited

U.S. PATENT DOCUMENTS

2013/0294397 A1* 11/2013 Lee ........................ H04L 1/0027 370/329
2017/0070914 A1* 3/2017 Chun ...................... H04W 4/70
(Continued)

FOREIGN PATENT DOCUMENTS

CN 112135364 A 12/2020
EP 3654723 A1 5/2020

OTHER PUBLICATIONS

"IEEE 802.11be Extremely High Throughput: The Next Generation of Wi-Fi Technology Beyond 802.11ax"; Lopez_Perez et al.; IEEE Communications Magazine • Sep. 2019 (Year: 2019).*
(Continued)

*Primary Examiner* — Benjamin H Elliott, IV
(74) *Attorney, Agent, or Firm* — Fish & Richardson P.C.

(57) ABSTRACT

The present disclosure relates to communication methods and apparatuses, and relates to the field of communication technologies. In one example method, a first communication apparatus generates a physical layer protocol data unit (PPDU), and sends the PPDU to a second communication apparatus. The PPDU includes a first field with 26 bits, and the first field includes a one-bit unsolicited modulation and coding scheme (MCS) feedback (MFB) subfield and a one-bit first indication information. When a value of the unsolicited MFB subfield is a first value, the first indication information indicates an MCS request (MRQ). When a value of the unsolicited MFB subfield is a second value, the first indication information indicates an uplink extremely high throughput trigger-based PPDU MFB (UL EHT TB PPDU MFB).

20 Claims, 26 Drawing Sheets

(58) Field of Classification Search
CPC ....... H04L 1/0027; H04L 1/0023; H04L 9/40; H04L 1/0029; H04L 5/0046; H04L 69/06; H04L 69/323
See application file for complete search history.

(56) References Cited

U.S. PATENT DOCUMENTS

| | | | | |
|---|---|---|---|---|
| 2018/0368118 | A1* | 12/2018 | Hsu | H04L 1/0009 |
| 2020/0314754 | A1 | 10/2020 | Lim et al. | |
| 2021/0068197 | A1* | 3/2021 | Kim | H04W 84/12 |
| 2022/0417793 | A1* | 12/2022 | Kim | H04L 1/0001 |
| 2023/0085190 | A1* | 3/2023 | Suh | H04L 1/06 370/329 |
| 2023/0121274 | A1* | 4/2023 | Xin | H04B 7/0452 375/262 |
| 2023/0370125 | A1* | 11/2023 | Xin | H04L 1/0023 |
| 2023/0379760 | A1* | 11/2023 | Huang | H04W 74/06 |
| 2023/0388055 | A1* | 11/2023 | Chun | H04L 5/0044 |
| 2023/0412300 | A1* | 12/2023 | Yu | H04L 27/345 |
| 2024/0080127 | A1* | 3/2024 | Gong | H04W 84/12 |
| 2024/0196277 | A1* | 6/2024 | Dong | H04L 1/0003 |

OTHER PUBLICATIONS

"IEEE 802.11be Wi-Fi 7: New Challenges and Opportunities"; Deng et al.; IEEE Communications Surveys & Tutorials, vol. 22, No. 4, Fourth Quarter 2020 (Year: 2020).*

IEEE Std 802.11ax™—2021 "IEEE Standard for Information Technology—Telecommunications and Information Exchange between Systems Local and Metropolitan Area Networks—Specific Requirements; Part 11: WirelessLAN Medium Access Control (MAC) and Physical Layer (PHY)Specifications; Amendment 1: Enhancements for High-Efficiency WLAN," Feb. 9, 2021, 767 pages.

Extended European Search Report in European Appln. No. 22803925.1, mailed on Sep. 27, 2024, 10 pages.

Office Action in Korean Appln. No. 10-2023-7042329, mailed on Dec. 1, 2024, 22 pages (with English translation).

Office Action in Japanese Appln. No. 2023-571483, mailed on Nov. 19, 2024, 11 pages.

IN Patent Examination Report in Indian Appln. No. 202337078434, mailed on Mar. 11, 2025, 6 pages.

IEEE P802.11ax/D8.0, "Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 1: Enhancements for High Efficiency, WLAN," Oct. 2020, 820 pages.

IEEE P802.11be/D0.3, "Draft Standard for Information technology, Telecommunications and information exchange between systems Local and metropolitan area networks, Specific requirements, Part 11; Wireless LAN Medium Access Control (MAC) and Physical Layer (PHY) Specifications, Amendment 8: Enhancements for extremely high throughput (EHT)," Jan. 22021, 196 pages.

* cited by examiner

| Octets (oCtets) | 2 | 2 | 6 | 0 or 6 | 0 or 6 | 0 or 2 | 0 or 6 | 0 or 2 | 0 or 4 | Variable Variable | 4 |
|---|---|---|---|---|---|---|---|---|---|---|---|
| | Frame Control (frame control) | Duration/ ID duration/ ID | A1 address 1 | A2 address 2 | A3 address 3 | Sequence Control sequence control | A4 address 4 | QoS Control quality of service control | HT Control high throughput control | Frame Body frame body | FCS frame check sequence |

FIG. 3

| | | | | | | | | | |
|---|---|---|---|---|---|---|---|---|---|
| Control ID control identifier =2 (4 bits) | Unsolicited MFB unsolicited MCS feedback (1 bit) | MRQ/UL HE TB PPDU MFB MCS request/ uplink high efficient trigger-based PPDU MCS feedback (1 bit) | NSS number of spatial streams (4 bits) | EHT MCS extremely high throughput-MCS (4 bits) | RU allocation resource unit allocation (9 bits) | BW bandwidth (3 bits) | MSI/Partial PPDU parameters MCS request sequence indicator or partial PPDU parameters (2 bits) | Tx Beamforming Tx beamforming (1 bit) | HE/EHT fourth indication information (1 bit) |

FIG. 25

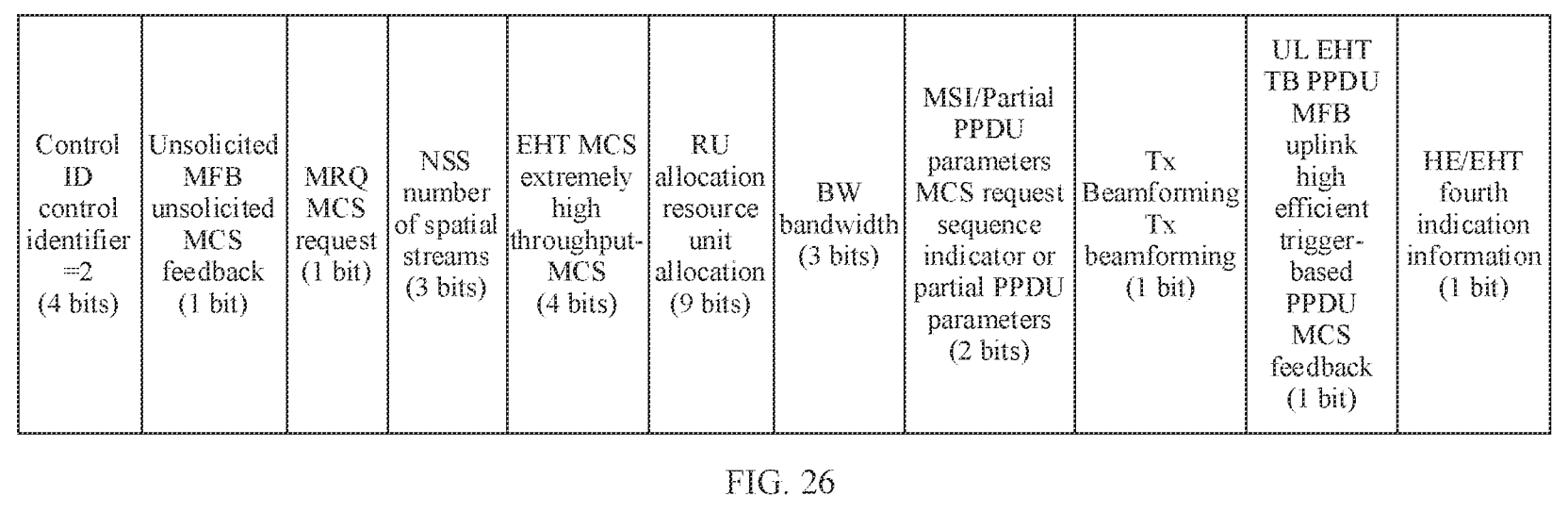

| | | | | | | | | | | |
|---|---|---|---|---|---|---|---|---|---|---|
| Control ID control identifier =2 (4 bits) | Unsolicited MFB unsolicited MCS feedback (1 bit) | MRQ MCS request (1 bit) | NSS number of spatial streams (3 bits) | EHT MCS extremely high throughput-MCS (4 bits) | RU allocation resource unit allocation (9 bits) | BW bandwidth (3 bits) | MSI/Partial PPDU parameters MCS request sequence indicator or partial PPDU parameters (2 bits) | Tx Beamforming Tx beamforming (1 bit) | UL EHT TB PPDU MFB uplink high efficient trigger-based PPDU MCS feedback (1 bit) | HE/EHT fourth indication information (1 bit) |

FIG. 26

| | | | | | | | | | |
|---|---|---|---|---|---|---|---|---|---|
| Control ID<br>control<br>identifier=9<br>to 14<br>(4 bits) | Unsolicited<br>MFB<br>unsolicited<br>MCS<br>feedback<br>(1 bit) | MRQ/UL HE<br>TB PPDU<br>MFB<br>MCS request/<br>uplink high<br>efficient<br>trigger-based<br>PPDU MCS<br>feedback<br>(1 bit) | NSS<br>number<br>of<br>spatial<br>streams<br>(4 bits) | EHT MCS<br>extremely<br>high<br>throughput-<br>MCS<br>(4 bits) | RU<br>allocation<br>resource<br>unit<br>allocation<br>(9 bits) | BW<br>bandwidth<br>(3 bits) | MSI/Partial<br>PPDU<br>parameters<br>MCS request<br>sequence<br>indicator or<br>partial PPDU<br>parameters<br>(2 bits) | Tx<br>Beamforming<br>Tx<br>beamforming<br>(1 bit) | Reserved<br>reserved<br>(1 bit) |

FIG. 27

HIGH EFFICIENT LINK ADAPTATION COMMUNICATION METHOD AND APPARATUS

CROSS-REFERENCE TO RELATED APPLICATIONS

This application is a continuation of International Patent Application No. PCT/CN2022/093093, filed on May 16, 2022, which claims priority to Chinese Patent Application No. 202110554343.2, filed on May 20, 2021. The disclosures of the aforementioned applications are hereby incorporated by reference in their entireties.

TECHNICAL FIELD

This application relates to the field of communication technologies, and in particular, to a communication method and apparatus.

BACKGROUND

An existing wireless local area network (WLAN) communication system goes through a plurality of generations of standards starting from the 802.11a/b/g standard, such as the 802.11n standard, the 802.11ac standard, the 802.11ax standard, and the 802.11be standard. Based on the foregoing standards, communication apparatuses may communicate with each other by using a physical layer protocol data unit (PPDU). The PPDU may include a medium access control protocol data unit (MPDU).

For example, in the 802.11ax standard, an MPDU may include a high throughput (HT) control field, and the HT control field may include one or more control identifiers and control information corresponding to each control identifier. When a value of the control identifier is 2, the control information may be a 26-bit high efficient link adaptation (HLA) control subfield.

The HLA control subfield may include a 3-bit number of spatial streams (NSS) subfield, a 2-bit bandwidth (BW) subfield, and other subfields.

With continuous evolution of the standards, compared with the 802.11ax standard, the 802.11be standard or a future wireless fidelity (Wi-Fi) standard may support more features and functions. However, a quantity of bits and a meaning of each subfield of the HLA control subfield have been predefined in the 802.11ax standard. If the HLA control subfield continues to be used, more features and functions cannot be supported. Therefore, how to properly design a link adaptation control subfield corresponding to the 802.11be standard or the future Wi-Fi standard becomes a technical problem to be resolved urgently.

SUMMARY

This application provides a communication method and apparatus, to support more features and functions in the 802.11be standard or a future Wi-Fi standard if an HLA control subfield continues to be used.

According to a first aspect, an embodiment of this application provides a communication method. The method includes: A first communication apparatus generates a physical layer protocol data unit PPDU, and sends the PPDU to a second communication apparatus. The PPDU includes a first field whose quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

Based on the first aspect, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or a future Wi-Fi standard can be supported by using the one saved bit, so that the first field feeds back more information without increasing the quantity of bits (in other words, the quantity of bits is still 26).

In a possible design, the first field further includes a number of spatial streams NSS subfield whose quantity of bits is greater than or equal to 3, and a maximum number of spatial streams indicated by the NSS subfield is 16.

Based on this possible design, the maximum number of spatial streams indicated by the NSS subfield may be 16, so that a requirement for a number of spatial streams in the 802.11be standard or the future Wi-Fi standard can be met.

In a possible design, the first field further includes an extremely high throughput modulation and coding scheme EHT-MCS subfield whose quantity of bits is 4. Alternatively, the first field further includes a signal-to-noise ratio SNR subfield whose quantity of bits is 6.

Based on this possible design, compared with the 802.11ax standard, function extension is performed on the EHT-MCS subfield or the SNR subfield, so that a requirement for an EHT MCS or an SNR in the 802.11be standard or the future Wi-Fi standard can be met.

In a possible design, the first field further includes a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9.

Based on this possible design, the resource unit allocation subfield is adjusted, so that a requirement for an RU in the 802.11be standard or the future Wi-Fi standard can be met.

In a possible design, the first field further includes a bandwidth BW subfield whose quantity of bits is greater than or equal to 3.

Based on this possible design, compared with the 802.11ax standard, the quantity of bits of the BW subfield is extended, so that the BW subfield may indicate more bandwidth information, thereby meeting a requirement for a bandwidth in the 802.11be standard or the future Wi-Fi standard.

In a possible design, the first field further includes fourth indication information whose quantity of bits is 1. The fourth indication information indicates that the first field is an extremely high throughput EHT LA control subfield, or the fourth indication information indicates that the first field is a high efficient HE LA control subfield.

Based on this possible design, whether the current first field is the HE LA control subfield or the EHT LA control subfield can be effectively distinguished by adding the fourth indication information.

In a possible design, the first field further includes a modulation and coding scheme MCS request sequence identifier or partial PPDU parameters subfield whose quantity of bits is 2.

Based on this possible design, compared with the 802.11ax standard, in this embodiment of this application, the modulation and coding scheme MCS request sequence identifier or partial PPDU parameters subfield is compressed from 3 bits to 2 bits, so that the quantity of bits can be saved while a requirement for a modulation and coding scheme MCS request sequence identifier or partial PPDU parameters subfield in the 802.11be standard or the future Wi-Fi standard is met. Further, more features and functions in the 802.11be standard or the future Wi-Fi standard can be supported by using the one saved bit, so that the first field feeds back more information without increasing the quantity of bits (in other words, the quantity of bits is still 26).

In a possible design, the first field further includes a Tx beamforming subfield whose quantity of bits is 1.

In a possible design, the PPDU further includes a control identifier field corresponding to the first field, and a value of the control identifier field is one of the following values: 2, 9, 10, 11, 12, 13, and 14. When the value of the control identifier field is one of the following values: 9, 10, 11, 12, 13, and 14, the control identifier field further indicates that the first field is the EHT LA control subfield.

Based on this possible design, when the value of the control identifier field is 2, the first field may include the fourth indication information, to indicate whether the current first field is the HE LA control subfield or the EHT LA control subfield. When the value of the control identifier field is any one of 9 to 14, the control identifier field indicates that the first field is the EHT LA control subfield.

According to a second aspect, an embodiment of this application provides a first communication apparatus. The first communication apparatus may implement functions performed by the first communication apparatus in the first aspect or the possible designs of the first aspect, and the function may be implemented by executing corresponding software by hardware. The hardware or the software includes one or more modules corresponding to the function, for example, a processing module and a transceiver module. The processing module is configured to generate a physical layer protocol data unit PPDU, and the transceiver module is configured to send the PPDU to a second communication apparatus. The PPDU includes a first field whose quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

For descriptions of the first field in the second aspect, refer to the descriptions of the first field in the first aspect. Details are not described again. For a specific implementation of the first communication apparatus in the second aspect, refer to behavior functions of the first communication apparatus in the communication method provided in any one of the first aspect or the possible designs of the first aspect.

According to a third aspect, an embodiment of this application provides a first communication apparatus. The first communication apparatus may be the first communication apparatus, or a chip or system on chip in the first communication apparatus. The first communication apparatus may implement functions performed by the first communication apparatus in the foregoing aspects or the possible designs, and the function may be implemented by hardware. In a possible design, the first communication apparatus may include a processor and a transceiver. The processor and the transceiver may be configured to support the first communication apparatus to implement the functions in any one of the first aspect or the possible designs of the first aspect. For example, the processor may be configured to generate a physical layer protocol data unit PPDU, and the transceiver may be configured to send the PPDU to a second communication apparatus. The PPDU includes a first field whose quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the first aspect or the possible designs of the first aspect.

For descriptions of the first field in the third aspect, refer to the descriptions of the first field in the first aspect. Details are not described again. For a specific implementation of the first communication apparatus in the third aspect, refer to behavior functions of the first communication apparatus in the communication method provided in any one of the first aspect or the possible designs of the first aspect.

According to a fourth aspect, an embodiment of this application provides a communication method. The method includes: A second communication apparatus receives a physical layer protocol data unit PPDU from a first communication apparatus, and parses the PPDU. The PPDU includes a first field whose quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

For descriptions of the first field in the fourth aspect, refer to the descriptions of the first field in the first aspect. Details are not described again.

According to a fifth aspect, an embodiment of this application provides a second communication apparatus. The second communication apparatus may implement functions performed by the second communication apparatus in the fourth aspect or the possible designs of the fourth aspect, and the function may be implemented by executing corresponding software by hardware. The hardware or the software includes one or more modules corresponding to the function, for example, a transceiver module and a processing module. The transceiver module is configured to receive a physical layer protocol data unit PPDU from a first communication apparatus, and the processing unit is configured to parse the PPDU. The PPDU includes a first field quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

For descriptions of the first field in the fifth aspect, refer to the descriptions of the first field in the fourth aspect. Details are not described again. For a specific implementation of the second communication apparatus in the fifth aspect, refer to behavior functions of the second communication apparatus in the communication method provided in any one of the fourth aspect or the possible designs of the fourth aspect.

According to a sixth aspect, an embodiment of this application provides a second communication apparatus. The second communication apparatus may be the second communication apparatus, or a chip or system on chip in the second communication apparatus. The second communication apparatus may implement functions performed by the second communication apparatus in the foregoing aspects or possible designs, and the function may be implemented by hardware. In a possible design, the second communication apparatus may include a transceiver and a processor. The transceiver and the processor may be configured to support the second communication apparatus to implement the functions in any one of the fourth aspect or the possible designs of the fourth aspect. For example, the transceiver may be configured to receive a physical layer protocol data unit PPDU from a first communication apparatus, and the processor may be configured to parse the PPDU. The PPDU includes a first field whose quantity of bits is 26, and the first field includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB. In another possible design, the second communication apparatus further includes a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the fourth aspect or the possible designs of the fourth aspect.

For descriptions of the first field in the sixth aspect, refer to the descriptions of the first field in the fourth aspect. Details are not described again. For a specific implementation of the second communication apparatus in the sixth aspect, refer to behavior functions of the second communication apparatus in the communication method provided in any one of the fourth aspect or the possible designs of the fourth aspect.

According to a seventh aspect, an embodiment of this application provides a communication method. The method includes: A first communication apparatus generates a physical layer protocol data unit PPDU, and sends the PPDU to a second communication apparatus. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO.

Based on the seventh aspect, for the SU-MIMO and the MU-MIMO, users in the MU-MIMO may interfere with each other, and a link adaptation feedback parameter corresponding to the MU-MIMO is usually different from that of the SU-MIMO. Whether a current feedback is the SU-MIMO or the MU-MIMO can be distinguished by adding the second indication information, thereby improving a throughput of a communication system.

In a possible design, the first field further includes a number of spatial streams NSS subfield whose quantity of bits is greater than or equal to 3. When the second indication information indicates that the first field corresponds to the SU-MIMO, a maximum number of spatial streams indicated by the NSS subfield is 16; or when the second indication information indicates that the first field corresponds to the MU-MIMO, a maximum number of spatial streams indicated by the NSS subfield is 4.

Based on this possible design, when the second indication information indicates that the first field corresponds to the SU-MIMO, the maximum number of spatial streams indicated by the NSS subfield may be 16; or when the second indication information indicates that the first field corresponds to the MU-MIMO, the maximum number of spatial streams of each user indicated by the NSS subfield may be 4, so that a requirement for a number of spatial streams in the 802.11be standard or a future Wi-Fi standard can be met.

In a possible design, the first field further includes an extremely high throughput modulation and coding scheme EHT-MCS subfield whose quantity of bits is 4. Alternatively, the first field further includes a signal-to-noise ratio SNR subfield whose quantity of bits is 6.

Based on this possible design, compared with the 802.11ax standard, function extension is performed on the EHT-MCS subfield or the SNR subfield, so that a requirement for an EHT MCS or an SNR in the 802.11be standard or the future Wi-Fi standard can be met.

In a possible design, the first field further includes a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9.

Based on this possible design, the resource unit allocation subfield is adjusted, so that a requirement for an RU in the 802.11be standard or the future Wi-Fi standard can be met.

In a possible design, the first field further includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

Based on this possible design, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or the future Wi-Fi standard can be supported by using the one saved bit, so that the first field feeds back more information without increasing the quantity of bits (in other words, the quantity of bits is still 26).

In a possible design, the first field further includes a bandwidth BW subfield whose quantity of bits is greater than or equal to 3.

Based on this possible design, compared with the 802.11ax standard, the quantity of bits of the BW subfield is extended, so that the BW subfield may indicate more bandwidth information, thereby meeting a requirement for a bandwidth in the 802.11be standard or the future Wi-Fi standard.

In a possible design, the first field further includes fourth indication information whose quantity of bits is 1. The fourth indication information indicates that the first field is an extremely high throughput EHT LA control subfield, or the fourth indication information indicates that the first field is a high efficient HE LA control subfield.

Based on this possible design, whether the current first field is the HE LA control subfield or the EHT LA control subfield can be effectively distinguished by adding the fourth indication information.

In a possible design, the first field further includes a modulation and coding scheme MCS request sequence identifier or partial PPDU parameters subfield whose quantity of bits is 2.

Based on this possible design, compared with the 802.11ax standard, in this embodiment of this application, the modulation and coding scheme MCS request sequence identifier or partial PPDU parameters subfield is compressed from 3 bits to 2 bits, so that the quantity of bits can be saved while a requirement for a modulation and coding scheme MCS request sequence identifier or partial PPDU parameters subfield in the 802.11be standard or the future Wi-Fi standard is met. Further, more features and functions in the 802.11be standard or the future Wi-Fi standard can be supported by using the one saved bit, so that the first field can feed back more features and functions with the 26 bits.

In a possible design, the first field further includes a Tx beamforming subfield whose quantity of bits is 1.

In a possible design, the PPDU further includes a control identifier field corresponding to the first field, and a value of the control identifier field is one of the following values: 2, 9, 10, 11, 12, 13, and 14. When the value of the control identifier field is one of the following values: 9, 10, 11, 12, 13, and 14, the control identifier field further indicates that the first field is the EHT LA control subfield.

Based on this possible design, when the value of the control identifier field is 2, the first field may include the fourth indication information, to indicate whether the current first field is the HE LA control subfield or the EHT LA control subfield. When the value of the control identifier field is any one of 9 to 14, the control identifier field indicates that the first field is the EHT LA control subfield.

According to an eighth aspect, an embodiment of this application provides a first communication apparatus. The first communication apparatus may implement functions performed by the first communication apparatus in the seventh aspect or the possible designs of the seventh aspect, and the function may be implemented by executing corresponding software by hardware. The hardware or the software includes one or more modules corresponding to the function, for example, a processing module and a transceiver module. The processing module may be configured to generate a physical layer protocol data unit PPDU, and the transceiver module may be configured to send the PPDU to a second communication apparatus. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO.

For descriptions of the first field in the eighth aspect, refer to the descriptions of the first field in the seventh aspect. Details are not described again. For a specific implementation of the first communication apparatus in the eighth aspect, refer to behavior functions of the first communication apparatus in the communication method provided in any one of the seventh aspect or the possible designs of the seventh aspect.

According to a ninth aspect, an embodiment of this application provides a first communication apparatus. The first communication apparatus may be the first communication apparatus, or a chip or system on chip in the first communication apparatus. The first communication apparatus may implement functions performed by the first communication apparatus in the foregoing aspects or the possible designs, and the function may be implemented by hardware. In a possible design, the first communication apparatus may include a processor and a transceiver. The processor and the transceiver may be configured to support the first communication apparatus to implement the functions in any one of the seventh aspect or the possible designs of the seventh aspect. For example, the processor may be configured to generate a physical layer protocol data unit PPDU, and the transceiver may be configured to send the PPDU to a second communication apparatus. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the seventh aspect or the possible designs of the seventh aspect.

For descriptions of the first field in the ninth aspect, refer to the descriptions of the first field in the seventh aspect. Details are not described again. For a specific implementation of the first communication apparatus in the ninth aspect, refer to behavior functions of the first communication apparatus in the communication method provided in any one of the seventh aspect or the possible designs of the seventh aspect.

According to a tenth aspect, an embodiment of this application provides a communication method. The method includes: A second communication apparatus receives a physical layer protocol data unit PPDU from a first communication apparatus, and parses the PPDU. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO.

For descriptions of the first field in the tenth aspect, refer to the descriptions of the first field in the seventh aspect. Details are not described again.

According to an eleventh aspect, an embodiment of this application provides a second communication apparatus. The second communication apparatus may implement functions performed by the second communication apparatus in the tenth aspect or the possible designs of the tenth aspect, and the function may be implemented by executing corresponding software by hardware. The hardware or the software includes one or more modules corresponding to the function, for example, a transceiver module and a processing module. The transceiver module is configured to receive a physical layer protocol data unit PPDU from a first communication apparatus, and the processing unit is configured to parse the PPDU. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO.

For descriptions of the first field in the eleventh aspect, refer to the descriptions of the first field in the tenth aspect. Details are not described again. For a specific implementation of the second communication apparatus in the eleventh aspect, refer to behavior functions of the second communication apparatus in the communication method provided in any one of the tenth aspect or the possible designs of the tenth aspect.

According to a twelfth aspect, an embodiment of this application provides a second communication apparatus. The second communication apparatus may be the second communication apparatus, or a chip or system on chip in the second communication apparatus. The second communication apparatus may implement functions performed by the second communication apparatus in the foregoing aspects or possible designs, and the function may be implemented by hardware. In a possible design, the second communication apparatus may include a transceiver and a processor. The transceiver and the processor may be configured to support the second communication apparatus to implement the functions in any one of the tenth aspect or the possible designs of the tenth aspect. For example, the transceiver may be configured to receive a physical layer protocol data unit PPDU from a first communication apparatus, and the processor may be configured to parse the PPDU. The PPDU includes a first field whose quantity of bits is 26, and the first field includes second indication information. The second indication information indicates that the first field corresponds to single-user multiple-input multiple-output SU-MIMO, or the second indication information indicates that the first field corresponds to multi-user multiple-input multiple-output MU-MIMO. In another possible design, the second communication apparatus further includes a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the tenth aspect or the possible designs of the tenth aspect.

For descriptions of the first field in the twelfth aspect, refer to the descriptions of the first field in the tenth aspect. Details are not described again. For a specific implementation of the second communication apparatus in the twelfth aspect, refer to behavior functions of the second communication apparatus in the communication method provided in any one of the tenth aspect or the possible designs of the tenth aspect.

According to a thirteenth aspect, an embodiment of this application provides a communication method. The method includes: A first communication apparatus generates a physical layer protocol data unit PPDU, and sends the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6.

Based on the thirteenth aspect, MCSs or SNRs of SU-MIMO and MU-MIMO may be fed back in a same first field at the same time.

In a possible design, the first field further includes a number of spatial streams NSS subfield whose quantity of bits is 2, and a maximum number of spatial streams indicated by the NSS subfield is 4.

Based on this possible design, the NSS subfield may be applicable to both the SU-MIMO and the MU-MIMO, and values 0 to 3 of the NSS subfield may correspond to numbers 1 to 4 of spatial streams, respectively.

In a possible design, the first field further includes a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9.

Based on this possible design, the resource unit allocation subfield is adjusted, so that a requirement for an RU in the 802.11be standard or a future Wi-Fi standard can be met.

In a possible design, the first field further includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

Based on this possible design, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or the future Wi-Fi standard can be supported by using the one saved bit, so that the first field feeds back more information without increasing the quantity of bits (in other words, the quantity of bits is still 26).

In a possible design, the first field further includes a bandwidth BW subfield whose quantity of bits is greater than or equal to 3.

Based on this possible design, compared with the 802.11ax standard, the quantity of bits of the BW subfield is extended, so that the BW subfield may indicate more bandwidth information, thereby meeting a requirement for a bandwidth in the 802.11be standard or the future Wi-Fi standard.

In a possible design, the first field further includes fourth indication information whose quantity of bits is 1. The fourth indication information indicates that the first field is an extremely high throughput EHT LA control subfield, or the fourth indication information indicates that the first field is a high efficient HE LA control subfield.

Based on this possible design, whether the current first field is the HE LA control subfield or the EHT LA control subfield can be effectively distinguished by adding the fourth indication information.

In a possible design, the first field further includes a modulation and coding scheme MCS request sequence identifier or partial PPDU parameters subfield whose quantity of bits is 2.

Based on this possible design, compared with the 802.11ax standard, in this embodiment of this application, the modulation and coding scheme MCS request sequence identifier or partial PPDU parameters subfield is compressed from 3 bits to 2 bits, so that the quantity of bits can be saved while a requirement for a modulation and coding scheme MCS request sequence identifier or partial PPDU parameters subfield in the 802.11be standard or the future Wi-Fi standard is met. Further, more features and functions in the 802.11be standard or the future Wi-Fi standard can be supported by using the one saved bit, so that the first field can feed back more features and functions with the 26 bits.

In a possible design, the first field includes a Tx beamforming subfield whose quantity of bits is 1.

In a possible design, the PPDU further includes a control identifier field corresponding to the first field, and a value of the control identifier field is one of the following values: 2, 9, 10, 11, 12, 13, and 14. When the value of the control identifier field is one of the following values: 9, 10, 11, 12, 13, and 14, the control identifier field further indicates that the first field is the EHT LA control subfield.

Based on this possible design, when the value of the control identifier field is 2, the first field may include the fourth indication information, to indicate whether the current first field is the HE LA control subfield or the EHT LA control subfield. When the value of the control identifier field is any one of 9 to 14, the control identifier field indicates that the first field is the EHT LA control subfield.

According to a fourteenth aspect, an embodiment of this application provides a first communication apparatus. The first communication apparatus may implement functions performed by the first communication apparatus in the thirteenth aspect or the possible designs of the thirteenth aspect, and the function may be implemented by executing corresponding software by hardware. The hardware or the software includes one or more modules corresponding to the function, for example, a processing module and a transceiver module. The processing module is configured to generate a physical layer protocol data unit PPDU, and the transceiver module is configured to send the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6.

For descriptions of the first field in the fourteenth aspect, refer to the descriptions of the first field in the thirteenth aspect. Details are not described again. For a specific implementation of the first communication apparatus in the fourteenth aspect, refer to behavior functions of the first communication apparatus in the communication method provided in any one of the thirteenth aspect or the possible designs of the thirteenth aspect.

According to a fifteenth aspect, an embodiment of this application provides a first communication apparatus. The first communication apparatus may be the first communication apparatus, or a chip or system on chip in the first communication apparatus. The first communication apparatus may implement functions performed by the first communication apparatus in the foregoing aspects or the possible designs, and the function may be implemented by hardware. In a possible design, the first communication apparatus may include a processor and a transceiver. The processor and the transceiver may be configured to support the first communication apparatus to implement the functions in any one of the thirteenth aspect or the possible designs of the thirteenth aspect. For example, the processor may be configured to generate a physical layer protocol data unit PPDU, and the transceiver may be configured to send the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the thirteenth aspect or the possible designs of the thirteenth aspect.

For descriptions of the first field in the fifteenth aspect, refer to the descriptions of the first field in the thirteenth aspect. Details are not described again. For a specific implementation of the first communication apparatus in the fifteenth aspect, refer to behavior functions of the first communication apparatus in the communication method provided in any one of the thirteenth aspect or the possible designs of the thirteenth aspect.

According to a sixteenth aspect, an embodiment of this application provides a communication method. The method includes: A second communication apparatus receives a physical layer protocol data unit PPDU from a first communication apparatus, and parses the PPDU. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6.

For descriptions of the first field in the sixteenth aspect, refer to the descriptions of the first field in the thirteenth aspect. Details are not described again.

According to a seventeenth aspect, an embodiment of this application provides a second communication apparatus. The second communication apparatus may implement functions performed by the second communication apparatus in the sixteenth aspect or the possible designs of the sixteenth aspect, and the function may be implemented by executing corresponding software by hardware. The hardware or the software includes one or more modules corresponding to the function, for example, a transceiver module and a processing module. The transceiver module is configured to receive a physical layer protocol data unit PPDU from a first communication apparatus, and the processing unit is configured to parse the PPDU. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6.

For descriptions of the first field in the seventeenth aspect, refer to the descriptions of the first field in the sixteenth aspect. Details are not described again. For a specific implementation of the second communication apparatus in the seventeenth aspect, refer to behavior functions of the second communication apparatus in the communication method provided in any one of the sixteenth aspect or the possible designs of the sixteenth aspect.

According to an eighteenth aspect, an embodiment of this application provides a second communication apparatus. The second communication apparatus may be the second communication apparatus, or a chip or system on chip in the second communication apparatus. The second communication apparatus may implement functions performed by the second communication apparatus in the foregoing aspects or possible designs, and the function may be implemented by hardware. In a possible design, the second communication apparatus may include a transceiver and a processor. The transceiver and the processor may be configured to support the second communication apparatus to implement the functions in any one of the sixteenth aspect or the possible designs of the sixteenth aspect. For example, the transceiver may be configured to receive a physical layer protocol data unit PPDU from a first communication apparatus, and the processor may be configured to parse the PPDU. The PPDU includes a first field whose quantity of bits is 26. The first field includes a single-user multiple-input multiple-output extremely high throughput modulation and coding scheme EHT-MCS subfield whose quantity of bits is 4 and a multi-user multiple-input multiple-output EHT-MCS subfield whose quantity of bits is 4, or the first field includes a single-user multiple-input multiple-output signal-to-noise ratio SNR subfield whose quantity of bits is 6 and a multi-user multiple-input multiple-output SNR subfield whose quantity of bits is 6. In another possible design, the second communication apparatus further includes a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the sixteenth aspect or the possible designs of the sixteenth aspect.

For descriptions of the first field in the eighteenth aspect, refer to the descriptions of the first field in the sixteenth aspect. Details are not described again. For a specific implementation of the second communication apparatus in the eighteenth aspect, refer to behavior functions of the second communication apparatus in the communication method provided in any one of the sixteenth aspect or the possible designs of the sixteenth aspect.

According to a nineteenth aspect, an embodiment of this application provides a communication method. The method includes: A first communication apparatus generates a physical layer protocol data unit PPDU, and sends the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2.

Based on the nineteenth aspect, MCSs (or SNRs) and NSSs of SU-MIMO and MU-MIMO may be fed back in a same first field at the same time, so that the number of spatial streams is fed back more accurately, and a throughput of a communication system is improved.

In a possible design, the first field further includes a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9.

Based on this possible design, the resource unit allocation subfield is adjusted, so that a requirement for an RU in the 802.11be standard or a future Wi-Fi standard can be met.

In a possible design, the first field further includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

Based on this possible design, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or the future Wi-Fi standard can be supported by using the one saved bit, so that the first field feeds back more information without increasing the quantity of bits (in other words, the quantity of bits is still 26).

In a possible design, the first field further includes a bandwidth BW subfield whose quantity of bits is greater than or equal to 3.

Based on this possible design, compared with the 802.11ax standard, the quantity of bits of the BW subfield is extended, so that the BW subfield may indicate more bandwidth information, thereby meeting a requirement for a bandwidth in the 802.11be standard or the future Wi-Fi standard.

In a possible design, the first field further includes fourth indication information whose quantity of bits is 1. The fourth indication information indicates that the first field is an extremely high throughput EHT LA control subfield, or the fourth indication information indicates that the first field is a high efficient HE LA control subfield.

Based on this possible design, whether the current first field is the HE LA control subfield or the EHT LA control subfield can be effectively distinguished by adding the fourth indication information.

In a possible design, the first field further includes a modulation and coding scheme MCS request sequence identifier or partial PPDU parameters subfield whose quantity of bits is 2.

Based on this possible design, compared with the 802.11ax standard, in this embodiment of this application, the modulation and coding scheme MCS request sequence identifier or partial PPDU parameters subfield is compressed from 3 bits to 2 bits, so that the quantity of bits can be saved while a requirement for a modulation and coding scheme MCS request sequence identifier or partial PPDU parameters subfield in the 802.11be standard or the future Wi-Fi standard is met. Further, more features and functions in the 802.11be standard or the future Wi-Fi standard can be supported by using the one saved bit, so that the first field can feed back more features and functions with the 26 bits.

In a possible design, the first field further includes a Tx beamforming subfield whose quantity of bits is 1.

In a possible design, the PPDU further includes a control identifier field corresponding to the first field, and a value of the control identifier field is one of the following values: 2, 9, 10, 11, 12, 13, and 14. When the value of the control identifier field is one of the following values: 9, 10, 11, 12, 13, and 14, the control identifier field further indicates that the first field is the EHT LA control subfield.

Based on this possible design, when the value of the control identifier field is 2, the first field may include the fourth indication information, to indicate whether the current first field is the HE LA control subfield or the EHT LA control subfield. When the value of the control identifier field is any one of 9 to 14, the control identifier field indicates that the first field is the EHT LA control subfield.

According to a twentieth aspect, an embodiment of this application provides a first communication apparatus. The first communication apparatus may implement functions performed by the first communication apparatus in the nineteenth aspect or the possible designs of the nineteenth aspect, and the function may be implemented by executing corresponding software by hardware. The hardware or the software includes one or more modules corresponding to the function, for example, a processing module and a transceiver module. The processing module is configured to generate a physical layer protocol data unit PPDU, and the transceiver module is configured to send the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2.

For descriptions of the first field in the twentieth aspect, refer to the descriptions of the first field in the nineteenth aspect. Details are not described again. For a specific implementation of the first communication apparatus in the twentieth aspect, refer to behavior functions of the first communication apparatus in the communication method provided in any one of the nineteenth aspect or the possible designs of the nineteenth aspect.

According to a twenty-first aspect, an embodiment of this application provides a first communication apparatus. The first communication apparatus may be the first communication apparatus, or a chip or system on chip in the first communication apparatus. The first communication apparatus may implement functions performed by the first communication apparatus in the foregoing aspects or the possible designs, and the function may be implemented by hardware. In a possible design, the first communication apparatus may include a processor and a transceiver. The processor and the transceiver may be configured to support the first communication apparatus to implement the functions in any one of the nineteenth aspect or the possible designs of the nineteenth aspect. For example, the processor may be configured to generate a physical layer protocol data unit PPDU, and the transceiver may be configured to send the PPDU to a second communication apparatus. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the nineteenth aspect or the possible designs of the nineteenth aspect.

For descriptions of the first field in the twenty-first aspect, refer to the descriptions of the first field in the nineteenth aspect. Details are not described again. For a specific implementation of the first communication apparatus in the twenty-first aspect, refer to behavior functions of the first communication apparatus in the communication method provided in any one of the nineteenth aspect or the possible designs of the nineteenth aspect.

According to a twenty-second aspect, an embodiment of this application provides a communication method. The method includes: A second communication apparatus receives a physical layer protocol data unit PPDU from a first communication apparatus, and parses the PPDU. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2.

For descriptions of the first field in the twenty-second aspect, refer to the descriptions of the first field in the nineteenth aspect. Details are not described again.

According to a twenty-third aspect, an embodiment of this application provides a second communication apparatus. The second communication apparatus may implement functions performed by the second communication apparatus in the twenty-second aspect or the possible designs of the twenty-second aspect, and the function may be implemented by executing corresponding software by hardware. The hardware or the software includes one or more modules corresponding to the function, for example, a transceiver module and a processing module. The transceiver module is configured to receive a physical layer protocol data unit PPDU from a first communication apparatus, and the processing unit is configured to parse the PPDU. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2.

For descriptions of the first field in the twenty-third aspect, refer to the descriptions of the first field in the twenty-second aspect. Details are not described again. For a specific implementation of the second communication apparatus in the twenty-third aspect, refer to behavior functions of the second communication apparatus in the communication method provided in any one of the twenty-second aspect or the possible designs of the twenty-second aspect.

According to a twenty-fourth aspect, an embodiment of this application provides a second communication apparatus. The second communication apparatus may be the second communication apparatus, or a chip or system on chip in the second communication apparatus. The second communication apparatus may implement functions performed by the second communication apparatus in the foregoing aspects or possible designs, and the function may be implemented by hardware. In a possible design, the second communication apparatus may include a transceiver and a processor. The transceiver and the processor may be configured to support the second communication apparatus to implement the functions in any one of the twenty-second aspect or the possible designs of the twenty-second aspect. For example, the transceiver may be configured to receive a physical layer protocol data unit PPDU from a first communication apparatus, and the processor may be configured to parse the PPDU. The PPDU includes a first field whose quantity of bits is 26. The first field includes a single-user multiple-input multiple-output extremely high throughput modulation and coding scheme EHT-MCS subfield whose quantity of bits is 4, a multi-user multiple-input multiple-output EHT-MCS subfield whose quantity of bits is 4, a single-user multiple-input multiple-output number of spatial streams NSS subfield whose quantity of bits is greater than or equal to 3, and a multi-user multiple-input multiple-output NSS subfield whose quantity of bits is 2. Alternatively, the first field includes a single-user multiple-input multiple-output signal-to-noise ratio SNR subfield whose quantity of bits is 6, a multi-user multiple-input multiple-output SNR subfield whose quantity of bits is 6, a single-user multiple-input multiple-output number of spatial streams NSS subfield whose quantity of bits is greater than or equal to 3, and a multi-user multiple-input multiple-output NSS subfield whose quantity of bits is 2. In another possible design, the second communication apparatus further includes a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the twenty-second aspect or the possible designs of the twenty-second aspect.

For descriptions of the first field in the twenty-fourth aspect, refer to the descriptions of the first field in the twenty-second aspect. Details are not described again. For a specific implementation of the second communication apparatus in the twenty-fourth aspect, refer to behavior functions of the second communication apparatus in the communication method provided in any one of the twenty-second aspect or the possible designs of the twenty-second aspect.

According to a twenty-fifth aspect, an embodiment of this application provides a communication method. The method includes: A first communication apparatus generates a physical layer protocol data unit PPDU, and sends the PPDU to a second communication apparatus. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA.

Based on the twenty-fifth aspect, the third indication information may be added to indicate that the first field corresponds to the OFDMA or corresponds to the non-OFDMA.

In a possible design, when the third indication information indicates that the first field corresponds to the OFDMA, the first field further includes a single-user multiple-input multiple-output extremely high throughput modulation and coding scheme EHT-MCS subfield whose quantity of bits is 4, a single-user multiple-input multiple-output number of spatial streams NSS subfield whose quantity of bits is greater than or equal to 3, and a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9. Alternatively, when the third indication information indicates that the first field corresponds to the non-OFDMA, the first field further includes a single-user multiple-input multiple-output EHT-MCS subfield whose quantity of bits is 4, a single-user multiple-input multiple-output NSS subfield whose quantity of bits is greater than or equal to 3, a multi-user multiple-input multiple-output NSS subfield whose quantity of bits is 2, and a multi-user multiple-input multiple-output EHT-MCS subfield whose quantity of bits is 4.

Based on this possible design, compared with the OFDMA, when the first field corresponds to the non-OFDMA, a manner of reusing a quantity of bits may be used. The quantity of bits of the RU allocation subfield in the first field is used as a quantity of bits of an MU-MIMO NSS subfield and a quantity of bits of an MU-MIMO EHT-MCS subfield, to effectively distinguish between the OFDMA and the non-OFDMA in limited bits through bit reusing. In this way, feedback is more accurate, and a throughput of a communication system is improved.

In a possible design, when the third indication information indicates that the first field corresponds to the OFDMA, the first field further includes a single-user multiple-input multiple-output signal-to-noise ratio SNR subfield whose quantity of bits is 6, a single-user multiple-input multiple-output number of spatial streams NSS subfield whose quantity of bits is greater than or equal to 3, and a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9. Alternatively, when the third indication information indicates that the first field corresponds to the non-OFDMA, the first field further includes a single-user multiple-input multiple-output SNR subfield whose quantity of bits is 6, a single-user multiple-input multiple-output NSS subfield whose quantity of bits is greater than or equal to 3, a multi-user multiple-input multiple-output NSS subfield whose quantity of bits is 2, and a multi-user multiple-input multiple-output SNR subfield whose quantity of bits is 6.

Based on this possible design, compared with the OFDMA, when the first field corresponds to the non-OFDMA, a manner of reusing a quantity of bits may be used. The quantity of bits of the RU allocation subfield in the first field is used as a quantity of bits of an MU-MIMO NSS subfield and a quantity of bits of an MU-MIMO SNR subfield, to effectively distinguish between the OFDMA and the non-OFDMA in limited bits through bit reusing. In this way, feedback is more accurate, and a throughput of a communication system is improved.

In a possible design, the first field further includes an unsolicited modulation and coding scheme feedback MFB subfield whose quantity of bits is 1 and first indication information whose quantity of bits is 1. When a value of the unsolicited MFB subfield is a first value, the first indication information indicates a modulation and coding scheme request MRQ; or when a value of the unsolicited MFB subfield is a second value, the first indication information indicates an uplink extremely high throughput trigger-based PPDU modulation and coding scheme feedback UL EHT TB PPDU MFB.

Based on this possible design, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or the future Wi-Fi standard can be supported by using the one saved bit, so that the first field feeds back more information without increasing the quantity of bits (in other words, the quantity of bits is still 26).

In a possible design, the first field further includes a bandwidth BW subfield whose quantity of bits is greater than or equal to 3.

Based on this possible design, compared with the 802.11ax standard, the quantity of bits of the BW subfield is extended, so that the BW subfield may indicate more bandwidth information, thereby meeting a requirement for a bandwidth in the 802.11be standard or the future Wi-Fi standard.

In a possible design, the first field further includes fourth indication information whose quantity of bits is 1. The fourth indication information indicates that the first field is an extremely high throughput EHT LA control subfield, or the fourth indication information indicates that the first field is a high efficient HE LA control subfield.

Based on this possible design, whether the current first field is the HE LA control subfield or the EHT LA control subfield can be effectively distinguished by adding the fourth indication information.

In a possible design, the first field further includes a modulation and coding scheme MCS request sequence identifier or partial PPDU parameters subfield whose quantity of bits is 2.

Based on this possible design, compared with the 802.11ax standard, in this embodiment of this application, the modulation and coding scheme MCS request sequence identifier or partial PPDU parameters subfield is compressed from 3 bits to 2 bits, so that the quantity of bits can be saved while a requirement for a modulation and coding scheme MCS request sequence identifier or partial PPDU parameters subfield in the 802.11be standard or the future Wi-Fi standard is met. Further, more features and functions in the 802.11be standard or the future Wi-Fi standard can be supported by using the one saved bit, so that the first field can feed back more features and functions with the 26 bits.

In a possible design, the first field further includes a Tx beamforming subfield whose quantity of bits is 1.

In a possible design, the PPDU further includes a control identifier field corresponding to the first field, and a value of the control identifier field is one of the following values: 2, 9, 10, 11, 12, 13, and 14. When the value of the control identifier field is one of the following values: 9, 10, 11, 12, 13, and 14, the control identifier field further indicates that the first field is the EHT LA control subfield.

Based on this possible design, when the value of the control identifier field is 2, the first field may include the fourth indication information, to indicate whether the current first field is the HE LA control subfield or the EHT LA control subfield. When the value of the control identifier field is any one of 9 to 14, the control identifier field indicates that the first field is the EHT LA control subfield.

According to a twenty-sixth aspect, an embodiment of this application provides a first communication apparatus. The first communication apparatus may implement functions performed by the first communication apparatus in the twenty-fifth aspect or the possible designs of the twenty-fifth aspect, and the function may be implemented by executing corresponding software by hardware. The hardware or the software includes one or more modules corresponding to the function, for example, a processing module and a transceiver module. The processing module is configured to generate a physical layer protocol data unit PPDU, and the transceiver module is configured to send the PPDU to a second communication apparatus. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA.

For descriptions of the first field in the twenty-sixth aspect, refer to the descriptions of the first field in the twenty-fifth aspect. Details are not described again. For a specific implementation of the first communication apparatus in the twenty-sixth aspect, refer to behavior functions of the first communication apparatus in the communication method provided in any one of the twenty-fifth aspect or the possible designs of the twenty-fifth aspect.

According to a twenty-seventh aspect, an embodiment of this application provides a first communication apparatus. The first communication apparatus may be the first communication apparatus, or a chip or system on chip in the first communication apparatus. The first communication apparatus may implement functions performed by the first communication apparatus in the foregoing aspects or the possible designs, and the function may be implemented by hardware. In a possible design, the first communication apparatus may include a processor and a transceiver. The processor and the transceiver may be configured to support the first communication apparatus to implement the functions in any one of the twenty-fifth aspect or the possible designs of the twenty-fifth aspect. For example, the processor may be configured to generate a physical layer protocol data unit PPDU, and the transceiver may be configured to send the PPDU to a second communication apparatus. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA. In another possible design, the first communication apparatus may further include a memory. The memory is configured to store computer-executable instructions and data that are necessary for the first communication apparatus. When the first communication apparatus runs, the transceiver and the processor execute the computer-executable instructions stored in the memory, so that the first communication apparatus performs the communication method according to any one of the twenty-fifth aspect or the possible designs of the twenty-fifth aspect.

For descriptions of the first field in the twenty-seventh aspect, refer to the descriptions of the first field in the twenty-fifth aspect. Details are not described again. For a specific implementation of the first communication apparatus in the twenty-seventh aspect, refer to behavior functions of the first communication apparatus in the communication method provided in any one of the twenty-fifth aspect or the possible designs of the twenty-fifth aspect.

According to a twenty-eighth aspect, an embodiment of this application provides a communication method. The method includes: A second communication apparatus receives a physical layer protocol data unit PPDU from a first communication apparatus, and parses the PPDU. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA.

For descriptions of the first field in the twenty-eighth aspect, refer to the descriptions of the first field in the twenty-fifth aspect. Details are not described again.

According to a twenty-ninth aspect, an embodiment of this application provides a second communication apparatus. The second communication apparatus may implement functions performed by the second communication apparatus in the twenty-eighth aspect or the possible designs of the twenty-eighth aspect, and the function may be implemented by executing corresponding software by hardware. The hardware or the software includes one or more modules corresponding to the function, for example, a transceiver module and a processing module. The transceiver module is configured to receive a physical layer protocol data unit PPDU from a first communication apparatus, and the processing unit is configured to parse the PPDU. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA.

For descriptions of the first field in the twenty-ninth aspect, refer to the descriptions of the first field in the twenty-eighth aspect. Details are not described again. For a specific implementation of the second communication apparatus in the twenty-ninth aspect, refer to behavior functions of the second communication apparatus in the communication method provided in any one of the twenty-eighth aspect or the possible designs of the twenty-eighth aspect.

According to a thirtieth aspect, an embodiment of this application provides a second communication apparatus. The second communication apparatus may be the second communication apparatus, or a chip or system on chip in the second communication apparatus. The second communication apparatus may implement functions performed by the second communication apparatus in the foregoing aspects or possible designs, and the function may be implemented by hardware. In a possible design, the second communication apparatus may include a transceiver and a processor. The transceiver and the processor may be configured to support the second communication apparatus to implement the functions in any one of the twenty-eighth aspect or the possible designs of the twenty-eighth aspect. For example, the transceiver may be configured to receive a physical layer protocol data unit PPDU from a first communication apparatus, and the processor may be configured to parse the PPDU. The PPDU includes a first field whose quantity of bits is 26, and the first field includes third indication information whose quantity of bits is 1. The third indication information indicates that the first field corresponds to orthogonal frequency division multiple access OFDMA, or the third indication information indicates that the first field corresponds to non-orthogonal frequency division multiple access non-OFDMA. In another possible design, the second communication apparatus further includes a memory. The memory is configured to store computer-executable instructions and data that are necessary for the second communication apparatus. When the second communication apparatus runs, the transceiver and the processor execute the computer-executable instructions stored in the memory, so that the second communication apparatus performs the communication method according to any one of the twenty-eighth aspect or the possible designs of the twenty-eighth aspect.

For descriptions of the first field in the thirtieth aspect, refer to the descriptions of the first field in the twenty-eighth aspect. Details are not described again. For a specific implementation of the second communication apparatus in the thirtieth aspect, refer to behavior functions of the second communication apparatus in the communication method provided in any one of the twenty-eighth aspect or the possible designs of the twenty-eighth aspect.

According to a thirty-first aspect, a communication apparatus is provided. The communication apparatus includes one or more processors and one or more memories, and the one or more memories are coupled to the one or more processors. The one or more memories are configured to store computer programs or instructions, and the one or more processors are configured to run the computer programs or instructions. When the one or more processors execute the computer programs or instructions, the communication method according to any one of the first aspect or the possible designs of the first aspect is performed, the communication method according to any one of the fourth aspect or the possible designs of the fourth aspect is performed, the communication method according to any one of the seventh aspect or the possible designs of the seventh aspect is performed, the communication method according to any one of the tenth aspect or the possible designs of the tenth aspect is performed, the communication method according to any one of the thirteenth aspect or the possible designs of the thirteenth aspect is performed, the communication method according to any one of the sixteenth aspect or the possible designs of the sixteenth aspect is performed, the communication method according to any one of the nineteenth aspect or the possible designs of the nineteenth aspect is performed, the communication method according to any one of the twenty-second aspect or the possible designs of the twenty-second aspect is performed, the communication method according to any one of the twenty-fifth aspect or the possible designs of the twenty-fifth aspect is performed, or the communication method according to any one of the twenty-eighth aspect or the possible designs of the twenty-eighth aspect is performed.

In a possible implementation, the memory is located outside the communication apparatus. In another possible implementation, the memory is located inside the communication apparatus. In this embodiment of this application, the processor and the memory may alternatively be integrated into one component. In other words, the processor and the memory may alternatively be integrated together.

In a possible design, the communication apparatus further includes one or more communication interfaces, the one or more communication interfaces are coupled to the one or more processors, and the one or more communication interfaces are configured to communicate with a module other than the communication apparatus. The one or more communication interfaces are coupled to the one or more processors.

According to a thirty-second aspect, a communication apparatus is provided. The communication apparatus includes an interface circuit and a logic circuit. The interface circuit is coupled to the logic circuit, and the interface circuit is configured to input information and/or output information. The logic circuit is configured to: perform the communication method according to any one of the first aspect or the possible designs of the first aspect, the communication method according to any one of the fourth aspect or the possible designs of the fourth aspect, the communication method according to any one of the seventh aspect or the possible designs of the seventh aspect, the communication method according to any one of the tenth aspect or the possible designs of the tenth aspect, the communication method according to any one of the thirteenth aspect or the possible designs of the thirteenth aspect, the communication method according to any one of the sixteenth aspect or the possible designs of the sixteenth aspect, the communication method according to any one of the nineteenth aspect or the possible designs of the nineteenth aspect, the communication method according to any one of the twenty-second aspect or the possible designs of the twenty-second aspect, the communication method according to any one of the twenty-fifth aspect or the possible designs of the twenty-fifth aspect, or the communication method according to any one of the twenty-eighth aspect or the possible designs of the twenty-eighth aspect; and process and/or generate information based on the information. It should be noted that the interface circuit may also be described as an input/output interface.

According to a thirty-third aspect, a computer-readable storage medium is provided. The computer-readable storage medium stores computer instructions or programs. When the computer instructions or programs are run on a computer, the communication method according to any one of the first aspect or the possible designs of the first aspect is performed, the communication method according to any one of the fourth aspect or the possible designs of the fourth aspect is performed, the communication method according to any one of the seventh aspect or the possible designs of the seventh aspect is performed, the communication method according to any one of the tenth aspect or the possible designs of the tenth aspect is performed, the communication method according to any one of the thirteenth aspect or the possible designs of the thirteenth aspect is performed, the communication method according to any one of the sixteenth aspect or the possible designs of the sixteenth aspect is performed, the communication method according to any one of the nineteenth aspect or the possible designs of the nineteenth aspect is performed, the communication method according to any one of the twenty-second aspect or the possible designs of the twenty-second aspect is performed, the communication method according to any one of the twenty-fifth aspect or the possible designs of the twenty-fifth aspect is performed, or the communication method according to any one of the twenty-eighth aspect or the possible designs of the twenty-eighth aspect is performed.

According to a thirty-fourth aspect, a computer program product including computer instructions is provided. When the computer program product runs on a computer, the communication method according to any one of the first aspect or the possible designs of the first aspect is performed, the communication method according to any one of the fourth aspect or the possible designs of the fourth aspect is performed, the communication method according to any one of the seventh aspect or the possible designs of the seventh aspect is performed, the communication method according to any one of the tenth aspect or the possible designs of the tenth aspect is performed, the communication method according to any one of the thirteenth aspect or the possible designs of the thirteenth aspect is performed, the communication method according to any one of the sixteenth aspect or the possible designs of the sixteenth aspect is performed, the communication method according to any one of the nineteenth aspect or the possible designs of the nineteenth aspect is performed, the communication method according to any one of the twenty-second aspect or the possible designs of the twenty-second aspect is performed, the communication method according to any one of the twenty-fifth aspect or the possible designs of the twenty-fifth aspect is performed, or the communication method according to any one of the twenty-eighth aspect or the possible designs of the twenty-eighth aspect is performed.

According to a thirty-fifth aspect, an embodiment of this application provides a computer program. When the computer program is run on a computer, the communication method according to any one of the first aspect or the possible designs of the first aspect is performed, the communication method according to any one of the fourth aspect or the possible designs of the fourth aspect is performed, the communication method according to any one of the seventh aspect or the possible designs of the seventh aspect is performed, the communication method according to any one of the tenth aspect or the possible designs of the tenth aspect is performed, the communication method according to any one of the thirteenth aspect or the possible designs of the thirteenth aspect is performed, the communication method according to any one of the sixteenth aspect or the possible designs of the sixteenth aspect is performed, the communication method according to any one of the nineteenth aspect or the possible designs of the nineteenth aspect is performed, the communication method according to any one of the twenty-second aspect or the possible designs of the twenty-second aspect is performed, the communication method according to any one of the twenty-fifth aspect or the possible designs of the twenty-fifth aspect is performed, or the communication method according to any one of the twenty-eighth aspect or the possible designs of the twenty-eighth aspect is performed.

For technical effect brought by any design manner of the thirty-first aspect to the thirty-fifth aspect, refer to the technical effect brought by any possible design of the first aspect, refer to the technical effect brought by any possible design of the fourth aspect, refer to the technical effect brought by any possible design of the seventh aspect, refer to the technical effect brought by any possible design of the tenth aspect, refer to the technical effect brought by any possible design of the thirteenth aspect, refer to the technical effect brought by any possible design of the sixteenth aspect, refer to the technical effect brought by any possible design of the nineteenth aspect, refer to the technical effect brought by any possible design of the twenty-second aspect, refer to the technical effect brought by any possible design of the twenty-fifth aspect, or refer to the technical effect brought by any possible design of the twenty-eighth aspect. Details are not described again.

According to a thirty-sixth aspect, a communication system is provided. The communication system includes the first communication apparatus according to any one of the second aspect and the third aspect and the second communication apparatus according to any one of the fifth aspect and the sixth aspect, the first communication apparatus according to any one of the eighth aspect and the ninth aspect and the second communication apparatus according to any one of the eleventh aspect and the twelfth aspect, the first communication apparatus according to any one of the fourteenth aspect and the fifteenth aspect and the second communication apparatus according to any one of the seventeenth aspect and the eighteenth aspect, the first communication apparatus according to any one of the twentieth aspect and the twenty-first aspect and the second communication apparatus according to any one of the twenty-third aspect and the twenty-fourth aspect, or the first communication apparatus according to any one of the twenty-sixth aspect and twenty-seventh aspect and the second communication apparatus according to any one of the twenty-ninth aspect and the thirtieth aspect.

BRIEF DESCRIPTION OF DRAWINGS

FIG. 3 is a schematic diagram of a structure of an MPDU frame according to an embodiment of this application;

FIG. 25 is a schematic diagram of a structure of a first field frame according to an embodiment of this application;

FIG. 26 is a schematic diagram of a structure of a first field frame according to an embodiment of this application;

FIG. 27 is a schematic diagram of a structure of a first field frame according to an embodiment of this application;

DESCRIPTION OF EMBODIMENTS

Figure 1:
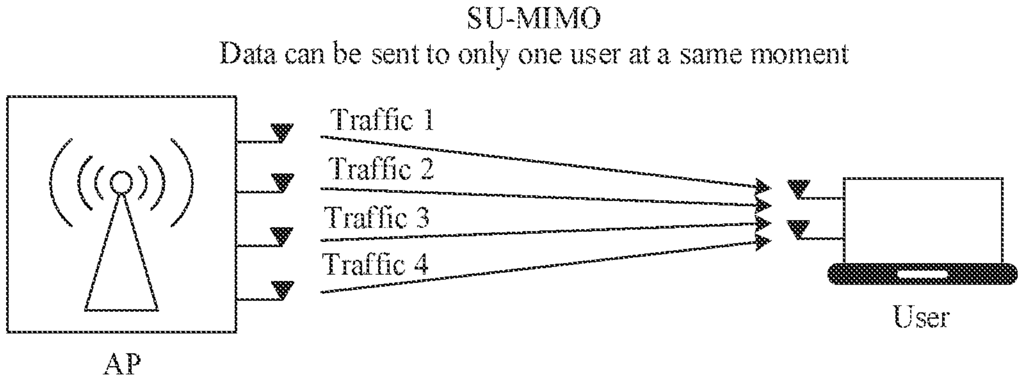
FIG. 1 is a schematic diagram of SU-MIMO according to an embodiment of this application.

Before embodiments of this application are described, technical terms used in embodiments of this application are described.

A wireless local area network (WLAN) communication system goes through a plurality of generations of standards starting from the 802.11a/b/g standard, such as the 802.11n standard, the 802.11ac standard, the 802.11ax standard, and the 802.11be standard. Standards before the 802.11be standard, such as the 802.11a/b/g standard, the 802.11n standard, the 802.11ac standard, and the 802.11ax standard, may also be collectively referred to as non-802.11be standards.

Standards before the 802.11n standard, such as 802.11a/b/g, may be collectively referred to as non-high throughput (non-HT) standards. The 802.11n standard may be referred to as a high throughput (HT) standard. The 802.11ac standard may be referred to as a very high throughput (VHT) standard. The 802.11ax standard may be referred to as a high efficient (HE) standard, or may be referred to as the 6th generation wireless fidelity (Wi-Fi 6) standard. The 802.11be standard may be referred to as an extremely high throughput (EHT) standard, or may be referred to as the Wi-Fi 7 standard.

For example, refer to Table 1. Allowed transmission bandwidths, numbers of space-time streams, coding and modulation schemes, and supported maximum data rates of the foregoing standards may be shown in Table 1.

TABLE 1

| | 802.11a/g | 802.11n (HT) | 802.11ac (VHT) | 802.11ax (HE) | 802.11be (EHT) |
|---|---|---|---|---|---|
| Bandwidth (MHz) | 20 | 20, 40 | 20, 40, 80, or 160 | 20, 40, 80, or 160 | 20, 40, 80, 160, or 320 |
| Number of space-time streams | 1 | 1-4 | 1-8 | 1-8 | 1-16 |
| Coding and modulation | BPSK to 64-QAM | BPSK to 64-QAM | BPSK to 256-QAM | BPSK to 1024-QAM | BPSK to 4096-QAM |
| Supported maximum data rate | 54 Mbps | 600 Mbps | 6.9 Gbps | 9.6 Gbps | 46.08 Gbps |

It should be noted that all the standards in Table 1 use an orthogonal frequency division multiplexing (OFDM) mode. Because the 802.11b standard uses a non-OFDM mode, the 802.11b standard is not listed in Table 1.

The OFDM is a basic transmission mode of a current wireless communication system for minimizing a subcarrier spacing by using orthogonality of subcarriers within an allowable range, to ensure that a plurality of parallel paths that do not interfere with each other are formed, and to improve frequency utilization efficiency of the wireless communication system. The OFDM is widely used in wireless communication systems such as a long term evolution (LTE) wireless communication system, a global interoperability for microwave access (WiMAX) wireless communication system, and a Wi-Fi wireless communication system. Further, the OFDM may be applied to fixed network transmission, for example, a transmission manner of an optical fiber, a copper strand cable, or a cable.

Based on the foregoing descriptions of the OFDM, if subcarriers that use the OFDM and that do not interfere with each other are allocated to a plurality of users, the OFDM may be used to implement access or data transmission of the plurality of users, that is, orthogonal frequency division multiple access (OFDMA). The OFDMA may be used to realize parallel transmission of data of the plurality of users and effectively improve concurrency of data transmission.

Link adaptation (LA): For wireless communication, a status of a channel of the wireless communication usually changes with time. To be specific, the channel changes due to changes of factors such as a path loss, shadowing, fading, noise, and interference. Based on this, a communication apparatus at a transmit end may select different modulation and coding schemes (MCSs) based on different channel statuses by using a specific method, to achieve a compromise between a specific transmission success probability and a high transmission rate. Therefore, an overall throughput of a wireless communication system is improved.

For example, the communication apparatus at the transmit end and a communication apparatus at a receive end may be based on specific channel sounding and feedback procedures, so that the communication apparatus at the transmit end obtains some parameters that can reflect a channel status (for example, a signal-to-noise ratio (SNR)), and then learns of the channel status based on these parameter to select an appropriate MCS. Alternatively, after performing channel sounding, the communication apparatus at the receive end may suggest, to the communication apparatus at the transmit end, the MCS required by the communication apparatus at the receive end and a number of spatial streams (NSS) required by the communication apparatus at the receive end.

Multiple-input multiple-output (MIMO) system: The MIMO system may be classified into a single-user multiple-input multiple-output (SU-MIMO) and a multi-user multiple-input multiple-output (MU-MIMO) system based on a quantity of users. Compared with the MU-MIMO system, the SU-MIMO system may also be described as a non-MU-MIMO system.

In the SU-MIMO system, a plurality of parallel spatial streams that occupy a same time-frequency resource are sent to a same user, and the SU-MIMO system may be used to increase a rate of one user.

For example, as shown in FIG. 1, the SU-MIMO system is an antenna system shown in FIG. 1. The antenna system may include an access point (AP) whose quantity of antennas is 4 and a user whose quantity of antennas is 2, and the AP can send data to only one user at a same moment.

In the MU-MIMO system, a plurality of parallel spatial streams that occupy a same time-frequency resource are sent to different users, and the MU-MIMO system may be used to increase rates of a plurality of users. A core of the MU-MIMO system may be a space division multiple access (SDMA) technology, to be specific, data of the plurality of users is transmitted by using a same slot and a same subcarrier but different antennas. The SDMA technology may be used to accommodate more users on a link by distinguishing users in space, to increase a capacity of a communication system.

Figure 2:
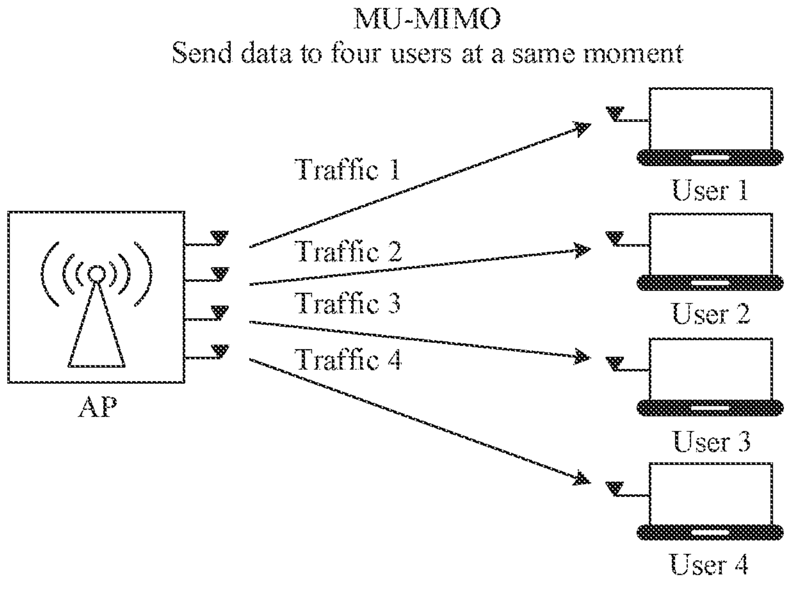
FIG. 2 is a schematic diagram of MU-MIMO according to an embodiment of this application.

For example, as shown in FIG. 2, the MU-MIMO system is an antenna system shown in FIG. 2. The antenna system may include an AP whose quantity of antennas is 4 and four users whose quantity of antennas is 1, and the AP may send data to the four users at a same moment.

A physical layer protocol data unit (PPDU) is a carrier sent at a physical layer, and may also be described as a data packet or a physical layer data packet.

A medium access control protocol data unit (MPDU) is a carrier sent at a medium access control (MAC) layer, may also be described as a MAC frame, and may be carried in a data field of a PPDU. The MPDU may include a control frame, a management frame, a data frame, and the like.

In a WLAN communication system, control signaling, management signaling, or data may be transmitted between communication apparatuses by using an MPDU in a PPDU.

For example, as shown in FIG. 3, the MPDU may include a frame header, a frame body field, and a frame check sequence (FCS) field. The frame header may include a frame control field whose quantity of octets is 2, a duration/ID field whose quantity of octets is 2, an address 1 (A1) field whose quantity of octets is 6, an address 2 (A2) field whose quantity of octets is 0 or 6, an address 3 (A3) field whose quantity of octets is 0 or 6, a sequence control field whose quantity of octets is 0 or 2, an address 4 (A4) field whose quantity of octets is 0 or 6, a quality of service control (QoS control) field whose quantity of octets is 0 or 2, and a high throughput control (HT control) field whose quantity of octets is 0 or 4. The frame body field may be used to carry data transferred from an upper layer or some management signaling and control signaling. The frame check sequence field may be used to check whether the MPDU is correctly transmitted.

In addition, in the high throughput control field of the frame header of the MPDU, a communication apparatus may also transmit some control information.

Figure 4:
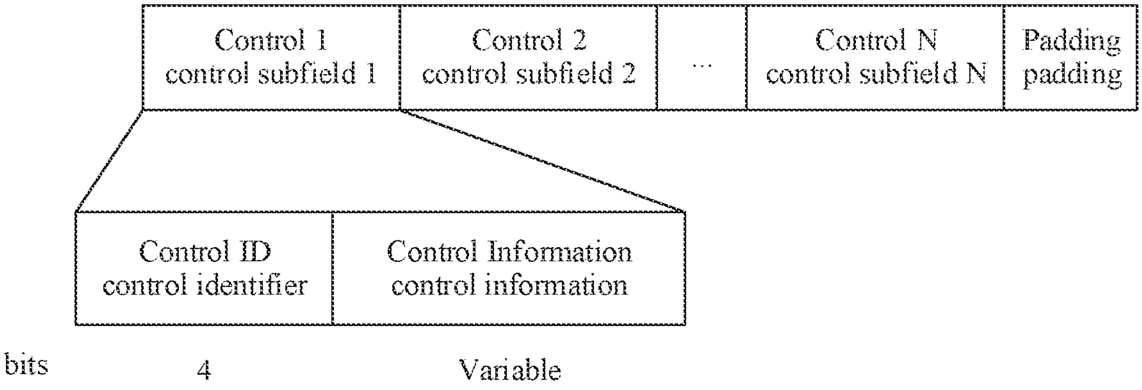
FIG. 4 is a schematic diagram of a structure of an A-control subfield frame according to an embodiment of this application.

For example, a high efficient variant (for example, an HT variant, a VHT variant, or an HE variant) of the high throughput control field may include an aggregated control (A-control) subfield. As shown in FIG. 4, the A-control subfield may include one or N control subfields and a padding field. Each control subfield may include a control identifier field whose quantity of bits is 4 and a control information field whose quantity of bits is variable, to carry one or N pieces of control information. In each control subfield, the control identifier field may indicate a type of the control information.

Figure 5:
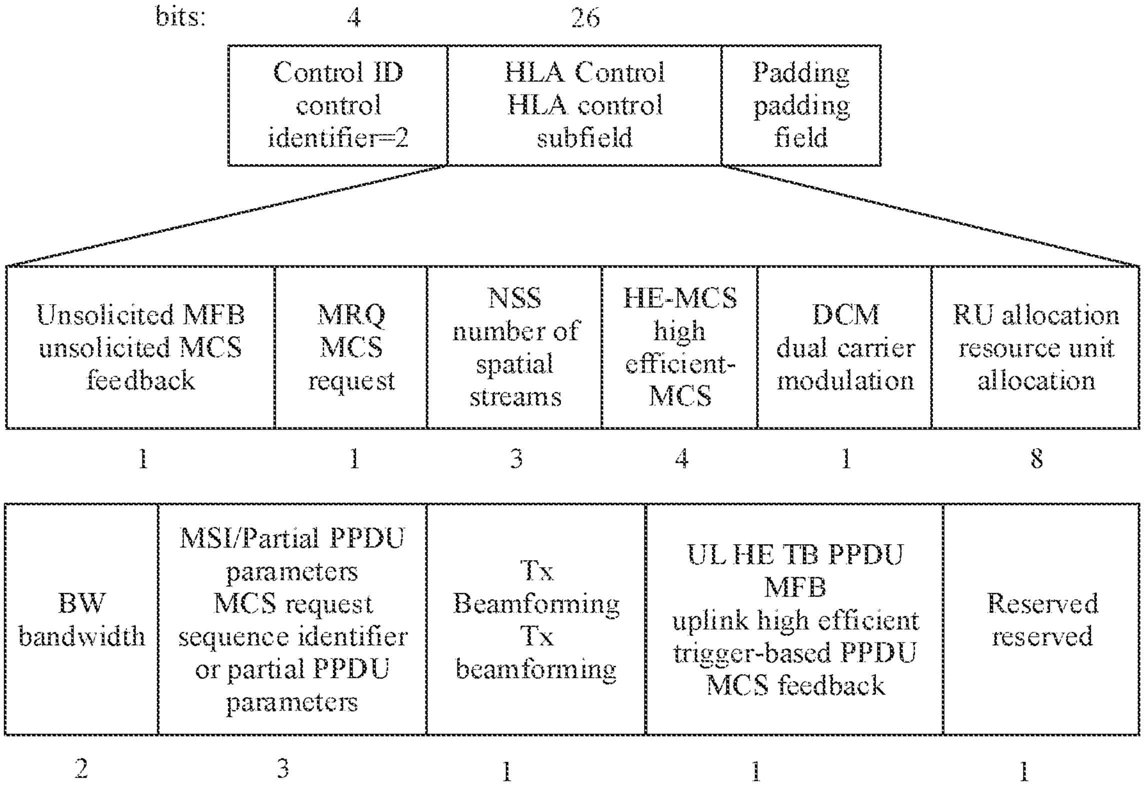
FIG. 5 is a schematic diagram of a structure of an HLA control subfield frame according to an embodiment of this application.

Specifically, for the 802.11ax standard, an MPDU may include an HT control field (or may also be described as the A-control subfield). The HT control field may include one or more control identifier fields, a control information field corresponding to each control identifier field, and a padding field. As shown in FIG. 5, when a value of the control identifier field is 2, the control information field may be a 26-bit high efficient link adaptation (HE link adaptation, HLA) control subfield.

As shown in FIG. 5, in the 802.11ax standard, the HLA control subfield may include an unsolicited MCS feedback (unsolicited MFB) subfield whose quantity of bits is 1, an MCS request (MRQ) subfield whose quantity of bits is 1, an NSS subfield whose quantity of bits is 3, an E-MCS subfield whose quantity of bits is 4, a dual carrier modulation (DCM) subfield whose quantity of bits is 1, a resource unit allocation (RU allocation) subfield whose quantity of bits is 8, a bandwidth (BW) subfield whose quantity of bits is 2, an MCS request sequence identifier or partial PPDU parameters (MRQ sequence identifier or partial PPDU parameters, MSI/partial PPDU parameters) subfield whose quantity of bits is 3, a Tx beamforming subfield whose quantity of bits is 1, an uplink high efficient trigger-based PPDU MCS feedback (UL HE TB PPDU MFB) subfield whose quantity of bits is 1, and a reserved subfield whose quantity of bits is 1.

Specifically, a meaning and a definition of each subfield in FIG. 5 may be shown in Table 2.

TABLE 2

| Subfield | Meaning | Definition |
|---|---|---|
| unsolicited MFB (1 bit) | Indicates whether the unsolicited MFB is used. | Set to 1 if the HLA control subfield is an unsolicited MFB.<br>Set to 0 if the HLA control subfield is an MCS request or a solicited MCS feedback. |
| MRQ (1 bit) | HLA feedback request indicator | Set the unsolicited MFB subfield to 0 and set the MRQ subfield to 1 to request an HLA feedback.<br>Set the unsolicited MFB subfield to 0 and set the MRQ subfield to 0 to respond to the HLA feedback.<br>Set the unsolicited MFB subfield to 1 to indicate that the MRQ subfield is reserved. |
| NSS (3 bits) | Indicates a recommended number of spatial streams | If the unsolicited MFB subfield is set to 1 and the UL HE TB PPDU MFB subfield is set to 0, or if the unsolicited MFB subfield is set to 0 and the MRQ subfield is set to 0, the NSS subfield indicates the recommended number of spatial streams to a PPDU sent to a station (that is, a station that sends the feedback).<br>If the unsolicited MFB subfield is set to 1 and the UL HE TB PPDU MFB subfield is set to 1, the NSS subfield indicates the recommended number of spatial streams to an HE TB PPDU sent from the station.<br>In other cases, this indication is reserved. |
| HE-MCS (4 bits) | Indicates a recommended HE-MCS | If the unsolicited MFB subfield is set to 1 and the UL HE TB PPDU MFB subfield is set to 0, or if the unsolicited MFB subfield is set to 0 and the MRQ subfield is set to 0, the HE-MCS subfield indicates the recommended HE-MCS of the PPDU sent to the station.<br>If the unsolicited MFB subfield is set to 1 and the UL HE TB PPDU MFB subfield is set to 1, the HE-MCS subfield indicates the recommended HE-MCS of the HE TB PPDU sent from the station.<br>In other cases, this indication is reserved. |
| DCM (1 bit) | Indicates (whether) dual carrier modulation is recommended. | If the unsolicited MFB subfield is set to 1 and the UL HE TB PPDU MFB subfield is set to 0, or if the unsolicited MFB subfield is set to 0 and the MRQ subfield is set to 0, the DCM subfield indicates whether dual carrier modulation is recommended to the PPDU sent to the station. If the DCM subfield is set to 1, it indicates that dual carrier modulation is recommended. If the DCM subfield is set to 0, it indicates that dual carrier modulation is not recommended.<br>If the unsolicited MFB subfield is set to 1 and the UL HE TB PPDU MFB subfield is set to 1, the DCM subfield indicates whether dual carrier modulation is recommended to the HE TB PPDU sent from the station. If the DCM subfield is set to 1, it indicates that dual carrier modulation is recommended. If the DCM subfield is set to 0, it indicates that dual carrier modulation is not recommended.<br>In other cases, this indication is reserved. |
| RU allocation (8 bits) | Indicates an RU of the recommended HE-MCS or an RU specified by an MFB requester to get feedback. | If the unsolicited MFB subfield is set to 1 and the UL HE TB PPDU MFB subfield is set to 0, the RU allocation subfield indicates the RU for which the recommended HE-MCS applies to the PPDU sent to the station.<br>If the unsolicited MFB subfield is set to 0 and the MRQ subfield is set to 1, the RU allocation subfield indicates the RU specified by the MFB requester to get feedback.<br>The RU allocation subfield and the BW subfield may jointly indicate a specific RU.<br>If the unsolicited MFB subfield is set to 1 and the UL HE TB PPDU MFB subfield is set to 1, the RU allocation subfield indicates the RU for which the recommended HE-MCS applies to the HE TB PPDU sent from the station, and that actual allocation of the RU can be ignored by a recipient.<br>In other cases, this indication is reserved. |

TABLE 2-continued

| Subfield | Meaning | Definition |
|---|---|---|
| BW (2 bits) | Indicates a bandwidth of the recommended HE-MCS or a bandwidth specified by the MFB requester to get feedback. | If the unsolicited MFB subfield is set to 1 and the UL HE TB PPDU MFB subfield is set to 0, the BW subfield indicates the bandwidth for which the recommended HE-MCS applies to the PPDU sent to the station.<br>If the unsolicited MFB subfield is set to 0 and the MRQ subfield is set to 1, the BW subfield indicates the bandwidth specified by the MFB requester to get feedback.<br>If the unsolicited MFB subfield is set to 1 and the UL HE TB PPDU MFB subfield is set to 1, the BW subfield indicates the bandwidth for which the recommended HE-MCS applies to the HE TB PPDU sent from the station.<br>Set to 0 for 20 MHz. Set to 1 for 40 MHz. Set to 2 for 80 MHz. Set to 3 for 160 MHz. |
| MSI/Partial PPDU parameters (3 bits) | Indicates an MCS request sequence identifier or partial parameters of a measured PPDU | If the unsolicited MFB subfield is set to 0 and the MRQ subfield is set to 1, the MSI/partial PPDU parameters subfield contains a sequence number in a range 0 to 6 that identifies a specific HE-MCS feedback request.<br>If the unsolicited MFB subfield is set to 0 and the MRQ subfield is set to 0, the MSI/partial PPDU parameters subfield contains a sequence number in a range 0 to 6 that responds to the specific HE-MCS feedback.<br>If the unsolicited MFB subfield is set to 1, the MSI/partial PPDU parameters subfield further includes two subfields:<br>a 2-bit PPDU format subfield, indicating a format of a PPDU used when parameter estimation is performed on the unsolicited MFB: 0 indicates a high efficient single-user PPDU (HE SU PPDU), 1 indicates a high efficient multi-user PPDU (HE MU PPDU), 2 indicates a high efficient extended range single-user PPDU (HE ER SU PPDU), and 3 indicates a high efficient trigger-based PPDU (HE TB PPDU); and<br>a 1-bit coding type subfield, indicating a coding type: 0 indicates binary convolutional coding (BCC), and 1 indicates low-density parity check (LDPC) coding. |
| Tx beamforming (1 bit) | Indicates a transmission type of the measured PPDU | If the unsolicited MFB subfield is set to 1 and the UL HE TB PPDU MFB subfield is set to 0, the Tx beamforming subfield indicates whether a PPDU from which the unsolicited MFB was estimated is beamformed: set to 0 for a non-beamformed PPDU; and set to 1 for the beamformed PPDU.<br>In other cases, this indication is reserved. |
| UL HE TB PPDU MFB (1 bit) | Uplink high efficient trigger-based PPDU MCS feedback indicator | If the unsolicited MFB subfield is set to 1 and the subfield is set to 1, it indicates that the indicated NSS subfield, the HE-MCS subfield, the DCM subfield, the BW subfield, and the RU allocation subfield indicate recommended MCS feedback parameters of the HE TB PPDU sent from the station.<br>Otherwise, this field is reserved. |

It should be noted that, in the 802.11ax standard, in the 8 bits of the RU allocation subfield, 7 bits may indicate a specific RU, and the remaining 1 bit indicates whether the RU indicated by the 7 bits is applicable to a primary 80 MHz or a secondary 80 MHz.

For example, the 8 bits of the RU allocation subfield are B0 to B7. B0 may indicate whether an RU indicated by B7 to B1 is applicable to the primary 80 MHz or the secondary 80 MHz. For example, B0 may be set to 0 to indicate the primary 80 MHz, and B0 may be set to 1 to indicate the secondary 80 MHz. B7 to B1 may indicate the specific RU by using indexes of the 7 bits.

Specifically, a bandwidth, an RU size, and an RU index corresponding to the RU allocation subfield may be shown in Table 3.

In embodiments of this application, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or a future Wi-Fi standard can be supported by using the one saved bit, so that the first field feeds back more information without increasing the quantity of bits (in other words, the quantity of bits is still 26).

The following describes implementations of embodiments of this application in detail with reference to accompanying drawings in this specification.

The communication method provided in embodiments of this application may be applied to any WLAN communication system, for example, may be a WLAN system using the 802.11be standard, or may be a WLAN communication system using the future Wi-Fi standard. This is not limited. The future Wi-Fi standard may be a standard such as the 802.11bx standard or the 802.11cx standard. This is not limited.

TABLE 3

| RU allocation subfield (B7-B1) | UL BW subfield (MHz) | RU size | RU index |
|---|---|---|---|
| 0-8 | 20, 40, 80, 80 + 80, or 160 | 26 | RU 1 to RU 9, respectively |
| 9-17 | 40, 80, 80 + 80, or 160 | | RU 10 to RU 18, respectively |
| 18-36 | 80, 80 + 80, or 160 | | RU 19 to RU37, respectively |
| 37-40 | 20, 40, 80, 80 + 80, or 160 | 52 | RU 1 to RU 4, respectively |
| 41-44 | 40, 80, 80 + 80, or 160 | | RU 5 to RU 8, respectively |
| 45-52 | 80, 80 + 80, or 160 | | RU 9 to RU 16, respectively |
| 53, 54 | 20, 40, 80, 80 + 80, or 160 | 106 | RU 1 and RU 2, respectively |
| 55, 56 | 40, 80, 80 + 80, or 160 | | RU 3 and RU 4, respectively |
| 57-60 | 80, 80 + 80, or 160 | | RU 5 to RU 8, respectively |
| 61 | 20, 40, 80, 80 + 80, or 160 | 242 | RU 1 |
| 62 | 40, 80, 80 + 80, or 160 | | RU 2 |
| 63, 64 | 80, 80 + 80, or 160 | | RU 3 and RU 4, respectively |
| 65 | 40, 80, 80 + 80, or 160 | 484 | RU 1 |
| 66 | 80, 80 + 80, or 160 | | RU 2 |
| 67 | 80, 80 + 80, or 160 | 996 | RU 1 |
| 68 | 80 + 80 or 160 | 2 × 996 | RU 1 |

Compared with the 802.11ax standard, the 802.11be standard or a future Wi-Fi standard may support more features and functions. However, based on the foregoing descriptions of Table 2, a quantity of bits and the meaning of each subfield of the HLA control subfield have been predefined in the 802.11 ax standard. If the HLA control subfield continues to be used in the 802.11be standard or the future Wi-Fi standard, there is a technical problem that more features and functions cannot be supported.

For example, the 802.11be standard or the future Wi-Fi standard may support a larger number of spatial streams or a larger bandwidth. However, because the quantities of bits and the meanings of the NSS subfield and the BW field in the HLA control subfield have been predefined in the 802.11ax standard, the HLA control subfield cannot support the larger number of spatial streams or the larger bandwidth.

In conclusion, how to properly design a link adaptation control subfield corresponding to the 802.11be standard or the future Wi-Fi standard becomes a technical problem to be resolved urgently.

To resolve this problem, embodiments of this application provide a communication method and apparatus. A first communication apparatus generates a PPDU, and sends the PPDU to a second communication apparatus. The PPDU includes a first field whose quantity of bits is 26, and the first field includes an unsolicited MFB subfield whose quantity of bits is 1 and first indication information whose quantity of bits is 1. When a value of the unsolicited MFB subfield is a first value, the first indication information indicates an MRQ; or when a value of the unsolicited MFB subfield is a second value, the first indication information indicates an UL EHT TB PPDU MFB.

It should be noted that the 802.11bx standard may also be described as a Wi-Fi 8 standard, and the 802.11cx standard may also be described as a Wi-Fi 9 standard. A first field corresponding to the 802.11be standard may be referred to as an LA control subfield, an EHT LA control subfield, or a subfield with another name. This is not limited. A first field corresponding to a standard after the 802.11be standard may be referred to as an LA control subfield, an evolved extremely high throughput LA (EHT+LA) control subfield, or a subfield with another name. This is not limited. For example, an LA control subfield corresponding to the 802.11bx standard may be referred to as an LA control subfield, an EHT+LA control subfield, or a subfield with another name. This is not limited. Alternatively, an LA control subfield corresponding to the 802.11cx standard may be referred to as an LA control subfield, an EHT+LA control subfield, or a subfield with another name. This is not limited. That is, a name of a first field in each standard after the 802.11ax standard is not limited in this application.

In addition, the WLAN communication system provided in embodiments of this application may further be a communication system using the foregoing Wi-Fi standard, for example, cellular, Bluetooth, and ultra-wideband (UWB). This is not limited.

Figure 6:
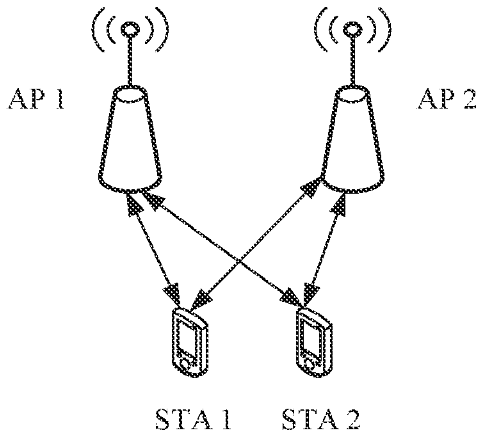
FIG. 6 is a schematic diagram of a communication system according to an embodiment of this application.

The following uses FIG. 6 as an example to describe the WLAN communication system provided in embodiments of this application.

FIG. 6 is a schematic diagram of a communication system according to an embodiment of this application. As shown in FIG. 6, the communication system may include an access point device and a station device. One or more access point devices may communicate with one or more station devices, one access point device may alternatively communicate with one or more other access point devices, and one station device may alternatively communicate with one or more other station devices.

The access point device may be an AP, and the station device may be a station (STA).

For example, the AP may be a device that supports a plurality of WLAN standards such as the 802.11be standard or a future Wi-Fi standard (for example, the 802.11bx standard or the 802.11cx standard), or may be a device that supports the 802.11a/b/g standard, the 802.11n standard, the 802.11ac standard, or the 802.11ax standard. This is not limited.

For example, the AP may be a terminal device, a network device, a communication server, a router, a switch, a bridge, or a computer that has a Wi-Fi chip. The AP may alternatively be an access point used for a mobile user to access a wired network. The AP is mainly deployed inside a house, a building, and a campus, with a typical coverage radius of tens of meters to hundreds of meters. Certainly, the AP may alternatively be deployed outdoors. The AP is equivalent to a bridge that connects the wired network and a wireless network; and is mainly used to connect wireless network clients to each other, and then connect the wireless network to the Ethernet.

For example, the STA may be a device that supports the plurality of WLAN standards such as the 802.11be standard or the future Wi-Fi standard (for example, the 802.11bx standard or the 802.11cx standard), or may be a device that supports the 802.11a/b/g standard, the 802.11n standard, the 802.11ac standard, or the 802.11ax standard. This is not limited.

For example, the STA may be a wireless communication chip, a wireless sensor, a wireless communication terminal, a communication server, a router, a switch, a bridge, or a computer. For example, the STA may be a mobile phone that supports a Wi-Fi communication function, a tablet computer that supports a Wi-Fi communication function, a set-top box that supports a Wi-Fi communication function, a smart TV that supports a Wi-Fi communication function, a smart wearable device that supports a Wi-Fi communication function, a vehicle-mounted communication device that supports a Wi-Fi communication device, and a computer that supports a Wi-Fi communication function. This is not limited.

Figure 7:
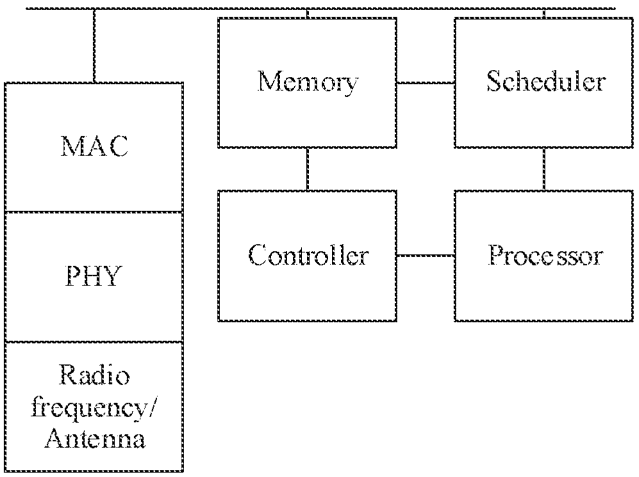
FIG. 7 is a diagram of a composition structure of a communication apparatus according to an embodiment of this application.

During specific implementation, as shown in FIG. 6, for example, each access point device and each station device may use a composition structure shown in FIG. 7, or include components shown in FIG. 7. FIG. 7 is a schematic composition diagram of a communication apparatus according to an embodiment of this application. The communication apparatus may be an access point device or a chip or system on chip in the access point device. Alternatively, the communication apparatus may be a station device or a chip or system on chip in the station device. As shown in FIG. 7, the communication apparatus may include a memory, a scheduler, a controller, and a processor, and may further include a MAC layer, a physical (PHY) layer, and a radio frequency/antenna.

The memory may be configured to store signaling information, a preset value agreed in advance, or the like. The processor may be configured to parse the signaling information and process related data. The radio frequency/antenna may be configured to send and/or receive the signaling information. In addition, the communication apparatus may further include a preempted queue and a fast queue, and an interface may exist between the preempted queue and the fast queue for mutual communication.

Figure 8:
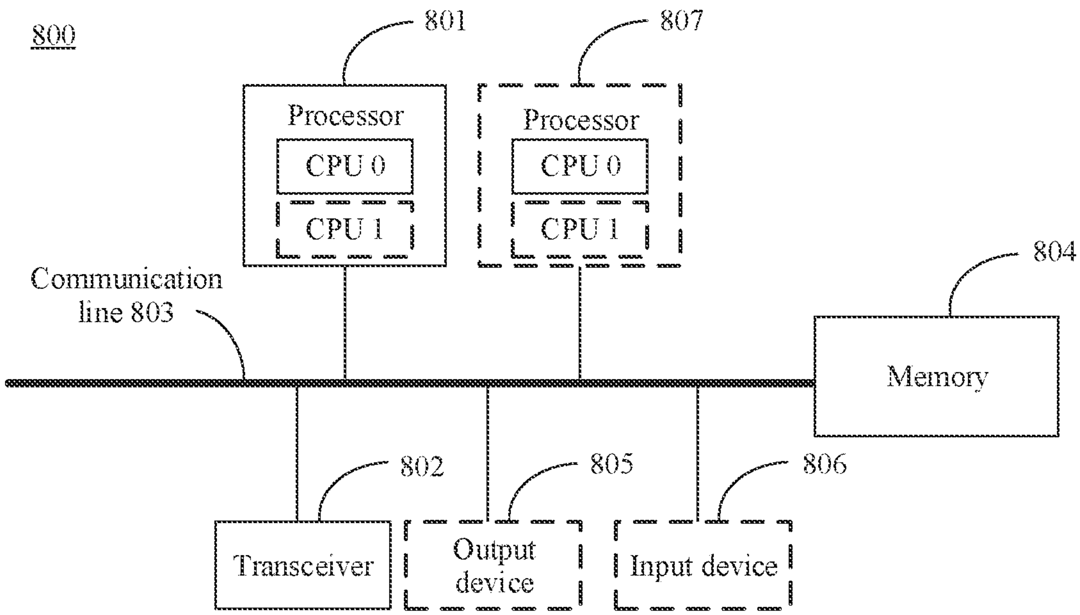
FIG. 8 is a diagram of a composition structure of a communication apparatus according to an embodiment of this application.

In another implementation, as shown in FIG. 6, for example, each access point device and each station device may alternatively use a composition structure shown in FIG. 8, or include components shown in FIG. 8. FIG. 8 is a schematic composition diagram of a communication apparatus 800 according to an embodiment of this application. The communication apparatus 800 may be an access point device or a chip or system on chip in the access point device. Alternatively, the communication apparatus 800 may be a station device or a chip or system on chip in the station device. As shown in FIG. 8, the communication apparatus 800 includes a processor 801, a transceiver 802, and a communication line 803.

Further, the communication apparatus 800 may further include a memory 804. The processor 801, the memory 804, and the transceiver 802 may be connected by using the communication line 803.

The processor 801 is a central processing unit (CPU), a general-purpose processor, a network processor (NP), a digital signal processor (DSP), a microprocessor, a microcontroller, a programmable logic device (PLD), or any combination thereof. Alternatively, the processor 801 may be another apparatus that has a processing function, for example, a circuit, a component, or a software module. This is not limited.

The transceiver 802 is configured to communicate with another device or another communication network. The another communication network may be the Ethernet, a radio access network (RAN), or the like. The transceiver 802 may be a module, a circuit, a transceiver, or any apparatus that can implement communication.

The communication line 803 is configured to transmit information between components included in the communication apparatus 800.

The memory 804 is configured to store instructions. The instruction may be a computer program.

The memory 804 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or the like. This is not limited.

It should be noted that the memory 804 may exist independently of the processor 801, or may be integrated with the processor 801. The memory 804 may be configured to store the instructions, program code, some data, or the like. The memory 804 may be located in the communication apparatus 800, or may be located outside the communication apparatus 800. This is not limited. The processor 801 is configured to execute the instructions stored in the memory 804, to implement the communication method provided in the following embodiments of this application.

In an example, the processor 801 may include one or more CPUs, for example, a CPU 0 and a CPU 1 in FIG. 8.

In an optional implementation, the communication apparatus 800 includes a plurality of processors. For example, in addition to the processor 801 in FIG. 8, the communication apparatus 800 may further include a processor 807.

In an optional implementation, the communication apparatus 800 further includes an output device 805 and an input device 806. For example, the input device 806 is a device, for example, a keyboard, a mouse, a microphone, or a joystick, and the output device 805 is a device, for example, a display or a speaker.

It should be noted that the communication apparatus 800 may be a desktop computer, a portable computer, a network server, a mobile phone, a tablet computer, a wireless terminal, an embedded device, a chip system, or a device that has a structure similar to a structure in FIG. 8. In addition, the composition structure shown in FIG. 8 does not constitute a limitation on the communication apparatus. In addition to the components shown in FIG. 8, the communication apparatus may include more or fewer components than those shown in the figure, or some components may be combined, or different component arrangements may be used.

In this embodiment of this application, the chip system may include a chip, or may include a chip and another discrete component.

In addition, for actions, terms, and the like in embodiments of this application, refer to each other. This is not limited. In embodiments of this application, names of messages exchanged between devices, names of parameters in the messages, or the like are merely examples. Other names may alternatively be used during specific implementation. This is not limited.

Figure 9:
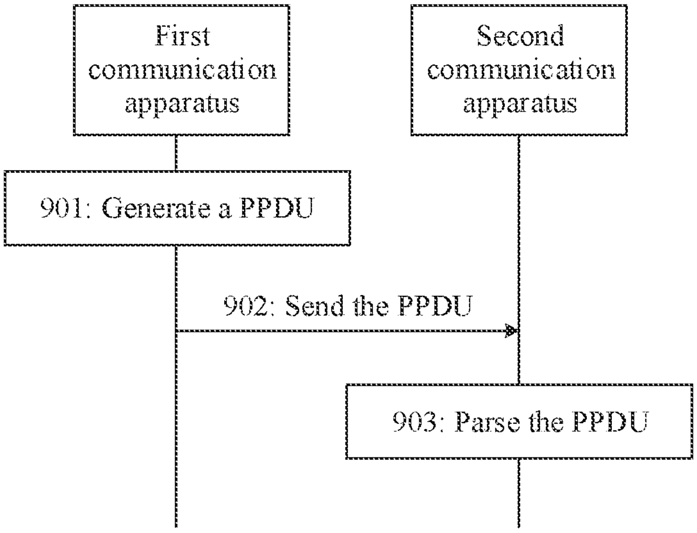
FIG. 9 is a flowchart of a communication method according to an embodiment of this application.

With reference to the communication system shown in FIG. 6, the following describes the communication method provided in embodiments of this application with reference to FIG. 9. The first communication apparatus may be any access point device or station device in the communication system shown in FIG. 6. The second communication apparatus may be any access point device or station device in the communication system shown in FIG. 6. Both the first communication apparatus and the second communication apparatus described in the following embodiments may have the components shown in FIG. 7 or FIG. 8.

FIG. 9 is a flowchart of a communication method according to an embodiment of this application. As shown in FIG. 9, the method may include the following steps.

Step 901: A first communication apparatus generates a PPDU.

The PPDU may include a first field whose quantity of bits is 26, and the first field may include an unsolicited MFB subfield whose quantity of bits is 1 and first indication information whose quantity of bits is 1.

When a value of the unsolicited MFB subfield is a first value, the first indication information may indicate an MRQ; or when a value of the unsolicited MFB subfield is a second value, the first indication information may indicate an UL EHT TB PPDU MFB.

In a possible implementation, the first field may be specifically located in an A-control field in a MAC frame.

It should be noted that the first field may also be described as an LA control subfield, and the first indication information may also be described as an MRQ/UL EHT TB PPDU MFB subfield. Specifically, when the first indication information indicates the MRQ, the first indication information may also be described as the MRQ subfield. When the first indication information indicates the UL EHT TB PPDU MFB, the first indication information may also be described as the UL EHT TB PPDU MFB subfield.

For example, when the value of the unsolicited MFB subfield is 0, the first indication information may indicate the MRQ; or when the value of the unsolicited MFB subfield is 1, the first indication information may indicate the UL EHT TB PPDU MFB.

Specifically, it can be learned from the foregoing Table 2 that, when the value of the unsolicited MFB subfield is 1, an UL EHT TB PPDU may indicate whether information provided in the first field is used for an UL TB PPDU, and the MRQ is a reserved bit. When the value of the unsolicited MFB subfield is 0, the MRQ may indicate whether a solicited feedback is used, and an UL EHT TB PPDU is a reserved bit. The UL EHT TB PPDU subfield and the MRQ subfield are compressed into 1 bit, in other words, the UL EHT TB PPDU or the MRQ is indicated by using the first indication information whose quantity of bits is 1, so that a quantity of bits can be saved.

For example, a specific procedure of the solicited feedback may be as follows: The first communication apparatus (which may also be described as an MFB requester) may send an MFB request by using a PPDU. In the MFB request, an unsolicited MFB subfield is set to 0. First indication information indicates an MRQ, and the first indication information is set to 1. After receiving the MFB request sent by the MFB requester, a second communication apparatus (which may also be described as an MFB responder) may measure a related MFB parameter based on the PPDU that carries the MFB request, and send an MFB response to the MFB requester. In this MFB response, the unsolicited MFB subfield is set to 0 and the MRQ subfield is set to 0.

Optionally, the MFB request further includes an SU-MIMO/MU-MIMO indication.

For example, the SU-MIMO/MU-MIMO indicator is 1 bit. The 1 bit may be set to 0 to indicate SU-MIMO, and the 1 bit may be set to 1 to indicate MU-MIMO. Alternatively, the 1 bit may be set to 1 to indicate SU-MIMO, and the 1 bit may be set to 0 to indicate MU-MIMO.

For example, a specific procedure of an unsolicited feedback may be as follows: The first communication apparatus may send an unsolicited MFB by using a PPDU. An unsolicited MFB subfield is set to 1, and first indication information indicates an UL EHT TB PPDU MFB. The unsolicited MFB may indicate a corresponding parameter of the PPDU, so that the second communication apparatus estimates an MFB parameter based on the received PPDU.

The corresponding parameter of the PPDU may include one or more of the following: a PPDU format, a coding type, a Tx beamforming indication, SU-MIMO/MU-MIMO transmission, and the like.

Step 902: The first communication apparatus sends the PPDU to the second communication apparatus. Correspondingly, the second communication apparatus receives the PPDU.

Step 903: The second communication apparatus parses the PPDU.

Based on the method shown in FIG. 9, with reference to the value of the unsolicited MFB subfield, the MRQ and the UL EHT TB PPDU MFB are indicated by using 1 bit. Compared with the 802.11ax standard in which an MRQ and an UL EHT TB PPDU MFB each are indicated by using 1 bit, 1 bit can be saved. Further, more features and functions in the 802.11be standard or a future Wi-Fi standard can be supported by using the one saved bit, so that the first field feeds back more information without increasing the quantity of bits (in other words, the quantity of bits is still 26).

Further, the first field may further include an NSS subfield whose quantity of bits is greater than or equal to 3. The NSS subfield indicates a number of spatial streams, and a maximum number of spatial streams may be 16.

For example, the quantity of bits of the NSS subfield is equal to 3. Values 0 to 7 of the quantity of bits may respectively correspond to any eight numbers of spatial streams in numbers 1 to 16 of spatial streams. This is not limited in this application.

For example, the values 0 to 7 of the quantity of bits may respectively correspond to numbers 1, 2, 4, 6, 8, 10, 12, and 16 of spatial streams. Alternatively, the values 0 to 7 of the quantity of bits may respectively correspond to numbers 1, 3, 5, 7, 9, 11, 13, and 16 of spatial streams. This is not limited.

For example, the quantity of bits of the NSS subfield is equal to 4. Values 0 to 15 of the quantity of bits may correspond to numbers 1 to 16 of spatial streams, and a specific correspondence between a bit value and a number of spatial streams is not limited. In a possible implementation, the values 0 to 15 of the quantity of bits one-to-one correspond to the numbers 1 to 16 of spatial streams. To be specific, a bit value 0 corresponds to a number 1 of spatial streams, a bit value 1 corresponds to a number 2 of spatial streams, and examples are not enumerated herein.

It should be noted that, in the first field, when the unsolicited MFB subfield is set to 1 and the UL EHT TB PPDU MFB subfield is set to 0, or when the unsolicited MFB subfield is set to 0 and the MRQ subfield is set to 0, the NSS subfield may indicate a recommended number of spatial streams to a PPDU sent to a station (or may be described as a station that sends the feedback). When the unsolicited MCS feedback is set to 1 and the UL EHT TB PPDU MFB subfield is set to 1, the NSS subfield may indicate a recommended number of spatial streams to an EHT TB PPDU sent from the station. In other cases, the NSS subfield is reserved.

Based on the foregoing descriptions of the NSS subfield, compared with the 802.11ax standard, the maximum number of spatial streams indicated by the NSS subfield in this embodiment of this application may be 16, so that a requirement for a number of spatial streams in the 802.11be standard or the future Wi-Fi standard can be better met.

Further, the first field may further include an EHT-MCS subfield whose quantity of bits is 4. Alternatively, the first field may further include a signal-to-noise ratio SNR subfield whose quantity of bits is 6.

When the first field includes the EHT-MCS subfield whose quantity of bits is 4, the EHT-MCS subfield may indicate a recommended EHT MCS. A value of the EHT-MCS subfield and an EHT MCS corresponding to each value may be shown in the following Table 4.

TABLE 4

| Value of the EHT-MCS subfield | EHT MCS |
|---|---|
| 0 | Binary phase shift keying (BPSK), coding rate (bit rate, R)1/2 |
| 1 | Quadrature phase shift keying (QPSK), R1/2 |
| 2 | QPSK, R3/4 |
| 3 | 16-quadrature amplitude modulation (QAM), R1/2 |
| 4 | 16-QAM, R3/4 |
| 5 | 64-QAM, R2/3 |
| 6 | 64-QAM, R3/4 |
| 7 | 64-QAM, R5/6 |
| 8 | 256-QAM, R3/4 |
| 9 | 256-QAM, R5/6 |
| 10 | 1024-QAM, R3/4 |
| 11 | 1024-QAM, R5/6 |
| 12 | 4096-QAM, R3/4 |

TABLE 4-continued

| Value of the EHT-MCS subfield | EHT MCS |
|---|---|
| 13 | 4096-QAM, R5/6 |
| 14 | BPSK-DCM-duplication, R1/2 |
| 15 | BPSK-DCM, R1/2 |

When the value of the EHT-MCS subfield is 14 or 15, the EHT-MCS subfield may further indicate that DCM is recommended. In other words, when the values of the EHT-MCS subfield are 0 to 15, the EHT-MCS subfield may further indicate whether DCM is recommended. Further, when the value of the EHT-MCS subfield is 14, repeated transmission may be introduced on the basis of BPSK-DCM.

It should be noted that, in the first field, when the unsolicited MFB subfield is set to 1 and the UL EHT TB PPDU MFB subfield is set to 0, or when the unsolicited MFB subfield is set to 0 and the MRQ subfield is set to 0, the EHT-MCS subfield may indicate the recommended EHT MCS of the PPDU sent to the station. When the unsolicited MFB subfield is set to 1 and the UL EHT TB PPDU MFB subfield is set to 1, the EHT-MCS subfield may indicate the recommended EHT-MCS of the EHT TB PPDU sent from the station. In other cases, the EHT-MCS subfield is reserved.

When the first field includes the signal-to-noise ratio SNR subfield whose quantity of bits is 6, the SNR subfield may be a signed integer indicated by a 2 s complement code, where a most significant bit of a bit is negative, and another bit is positive. For example, 100001 may indicate: −32+1=−31. A range of signed integers indicated by the SNR subfield may be −32 to 31. A correspondence between each signed integer and a signal-to-noise ratio may be shown in the following Table 5.

TABLE 5

| Signed integer indicated by the SNR subfield | Signal-to-noise ratio (dB) |
|---|---|
| −32 | ≤10 |
| −31 | −9 |
| −30 | −8 |
| . . . | . . . |
| 30 | 52 |
| 31 | ≥53 |

Based on the foregoing descriptions of the EHT-MCS subfield or the SNR subfield, compared with the 802.11ax standard, in this embodiment of this application, an HE-MCS subfield is replaced with the 4-bit EHT-MCS subfield. Alternatively, the HE-MCS subfield is replaced with the 6-bit SNR subfield, so that a requirement for an EHT MCS or an SNR in the 802.11be standard or the future Wi-Fi standard can be better met.

Further, the first field may further include an RU allocation subfield. A quantity of bits of the RU allocation subfield is 5, a quantity of bits of the RU allocation subfield is 7, a quantity of bits of the RU allocation subfield is 8, or a quantity of bits of the RU allocation subfield is 9.

Based on an RU size, an RU less than 242-tone may be referred to as a small RU, an RU greater than or equal to 242-tone may be referred to as a large RU, and a plurality of RUs in a fixed combination may be referred to as a multiple resource unit (MRU). It should be noted that combination cases supported by the large RU are different for OFDMA transmission and non-OFDMA (which may also be described as non-OFDMA) transmission. Compared with the OFDMA transmission, the non-OFDMA transmission supports one more 996+484+242-tone RU, and other cases are the same.

Figure 10:
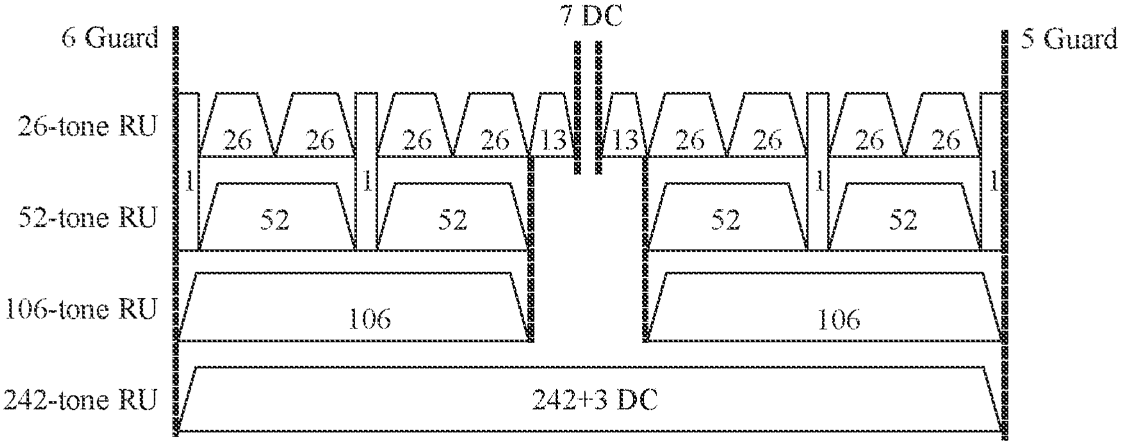
FIG. 10 is a schematic diagram of a tone plan and an RU plan of 20 MHz according to an embodiment of this application.
Figure 11:
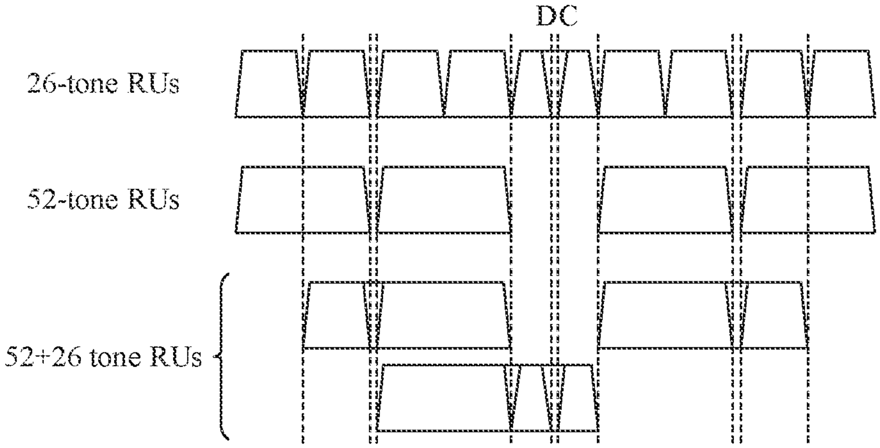
FIG. 11 is a schematic diagram of a tone plan and an RU plan of 20 MHz according to an embodiment of this application.
Figure 12:
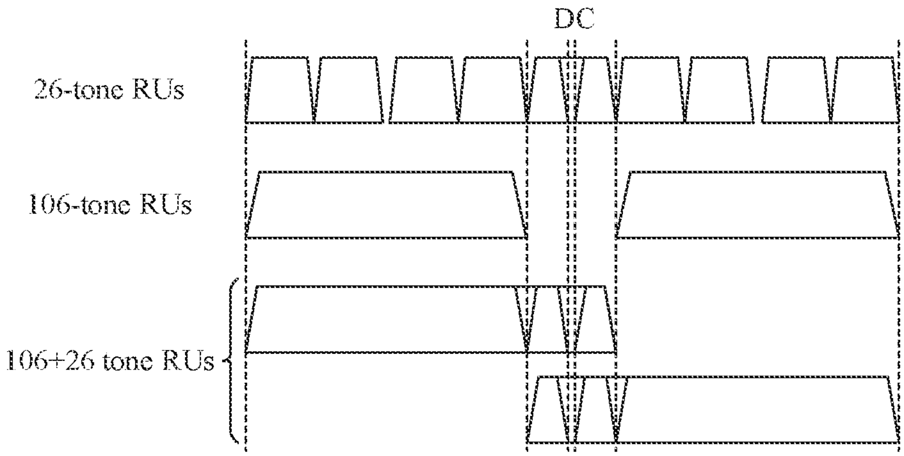
FIG. 12 is a schematic diagram of a tone plan and an RU plan of 20 MHz according to an embodiment of this application.

A bandwidth of 20 MHz is used as an example. FIG. 10 to FIG. 12 may be tone plans and RU plans of 20 MHz. As shown in FIG. 10, an RU size may be 26-tone, 52-tone, 106-tone, or 242-tone. As shown in FIG. 11, an RU size may be 26-tone, 52-tone, or 52+26-tone. As shown in FIG. 12, an RU size may be 26-tone, 106-tone, or 106+26-tone.

Figure 13:
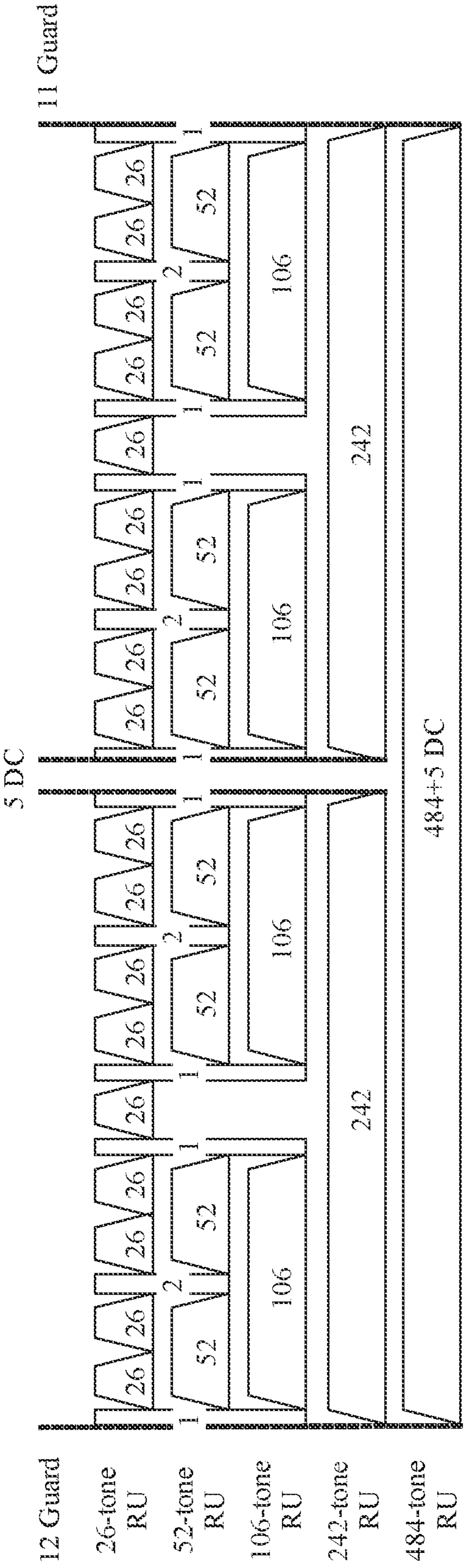
FIG. 13 is a schematic diagram of a tone plan and an RU plan of 40 MHz according to an embodiment of this application.
Figure 14:
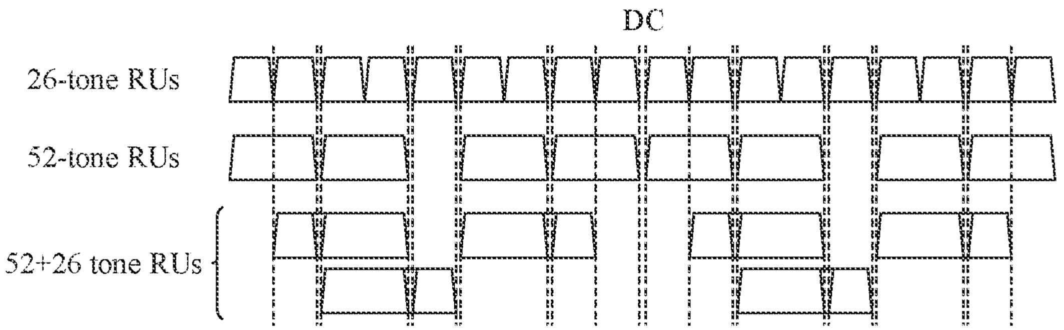
FIG. 14 is a schematic diagram of a tone plan and an RU plan of 40 MHz according to an embodiment of this application.
Figure 15:
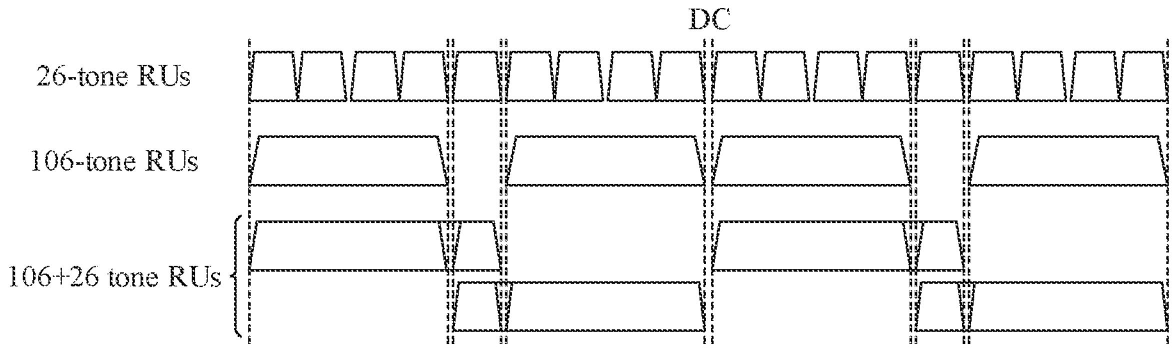
FIG. 15 is a schematic diagram of a tone plan and an RU plan of 40 MHz according to an embodiment of this application.

A bandwidth of 40 MHz is used as an example. FIG. 13 to FIG. 15 may be tone plans and RU plans of 40 MHz. As shown in FIG. 13, an RU size may be 26-tone, 52-tone, 106-tone, 242-tone, or 484-tone. As shown in FIG. 14, an RU size may be 26-tone, 52-tone, or 52+26-tone. As shown in FIG. 15, an RU size may be 26-tone, 106-tone, or 106+26-tone.

Figure 16:
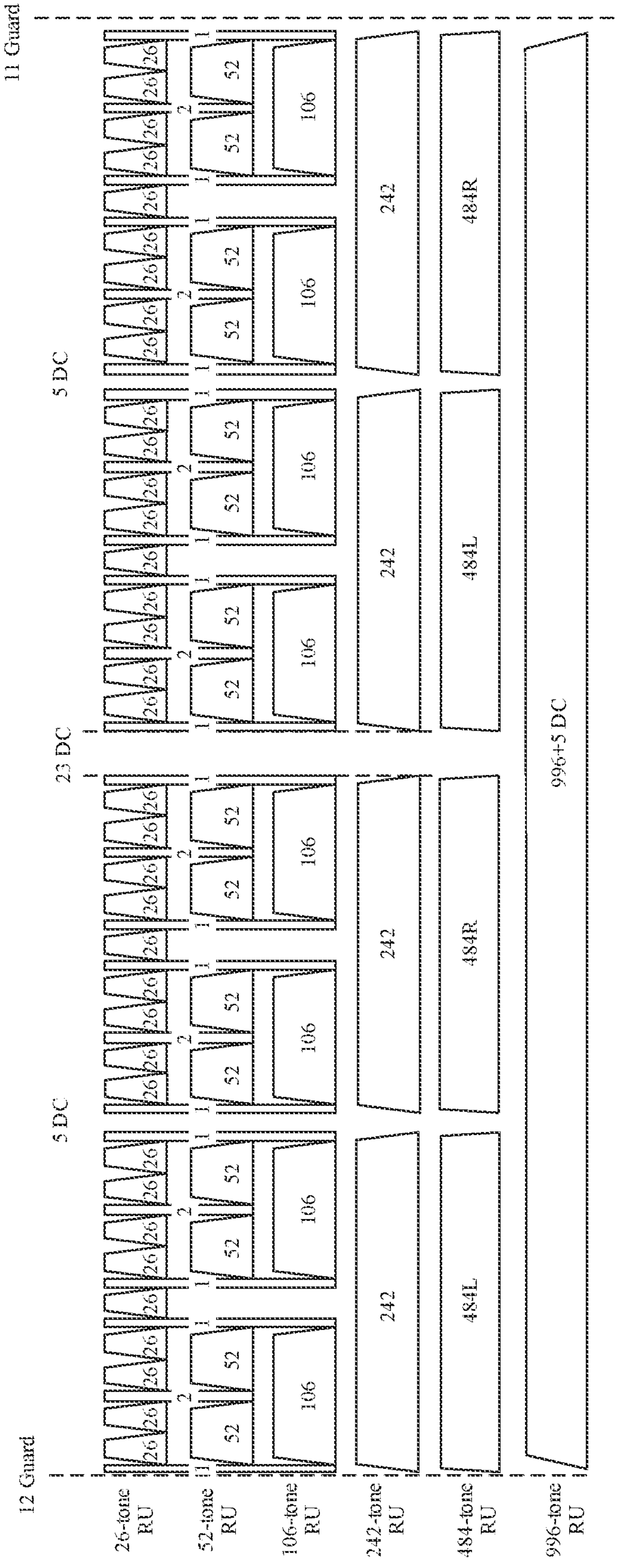
FIG. 16 is a schematic diagram of a tone plan and an RU plan of 80 MHz according to an embodiment of this application.
Figure 17:
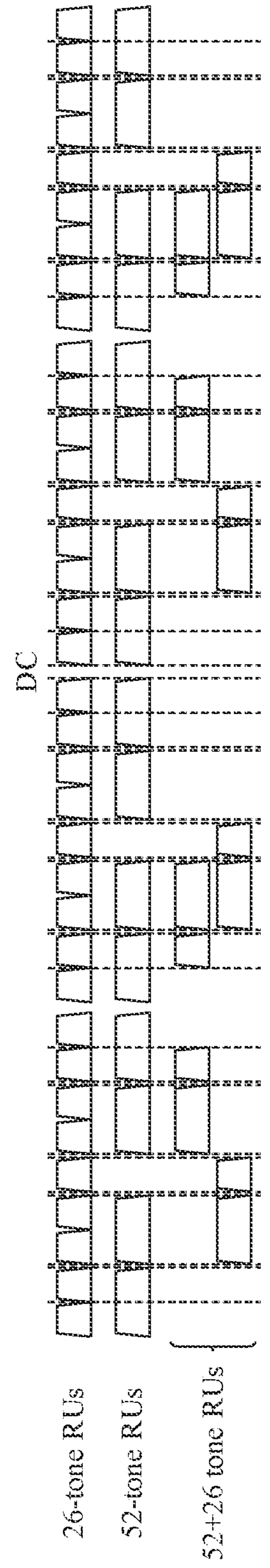
FIG. 17 is a schematic diagram of a tone plan and an RU plan of 80 MHz according to an embodiment of this application.
Figure 18:
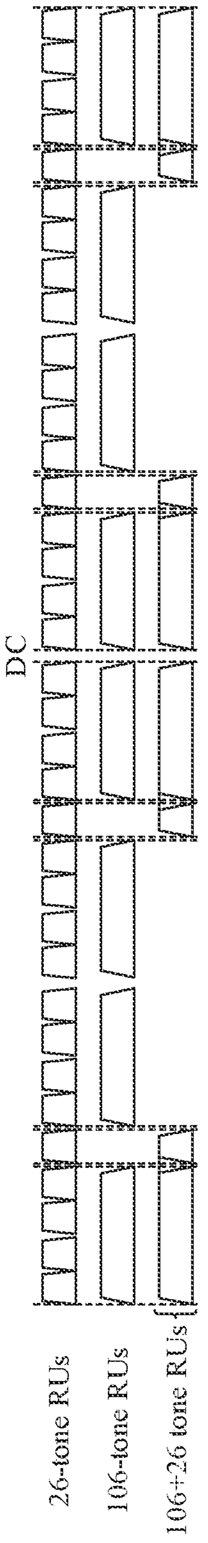
FIG. 18 is a schematic diagram of a tone plan and an RU plan of 80 MHz according to an embodiment of this application.
Figure 19:
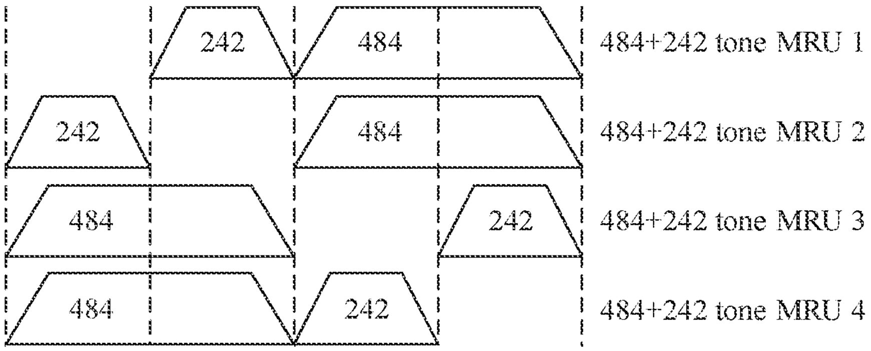
FIG. 19 is a schematic diagram of a tone plan and an RU plan of 80 MHz according to an embodiment of this application.

A bandwidth of 80 MHz is used as an example. FIG. 16 to FIG. 19 may be tone plans and RU plans of 80 MHz. As shown in FIG. 16, an RU size may be 26-tone, 52-tone, 106-tone, 242-tone, 484-tone, or 996-tone. As shown in FIG. 17, an RU size may be 26-tone, 52-tone, or 52+26-tone. As shown in FIG. 18, an RU size may be 26-tone, 106-tone, or 106+26-tone. As shown in FIG. 19, an RU size may be 484+242-tone.

Figure 20:
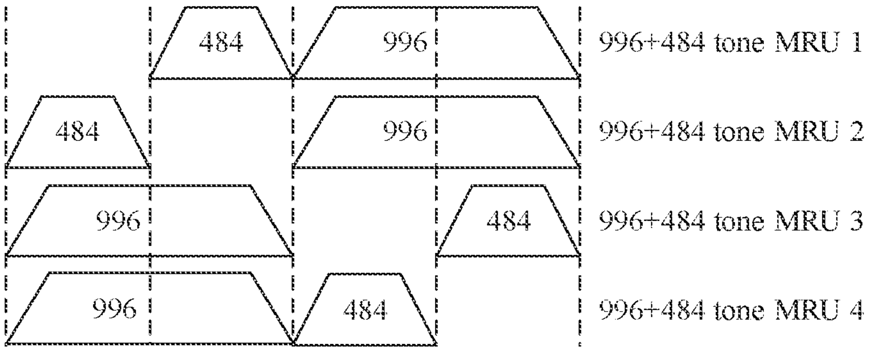
FIG. 20 is a schematic diagram of a tone plan and an RU plan of 160 MHz according to an embodiment of this application.
Figure 21:
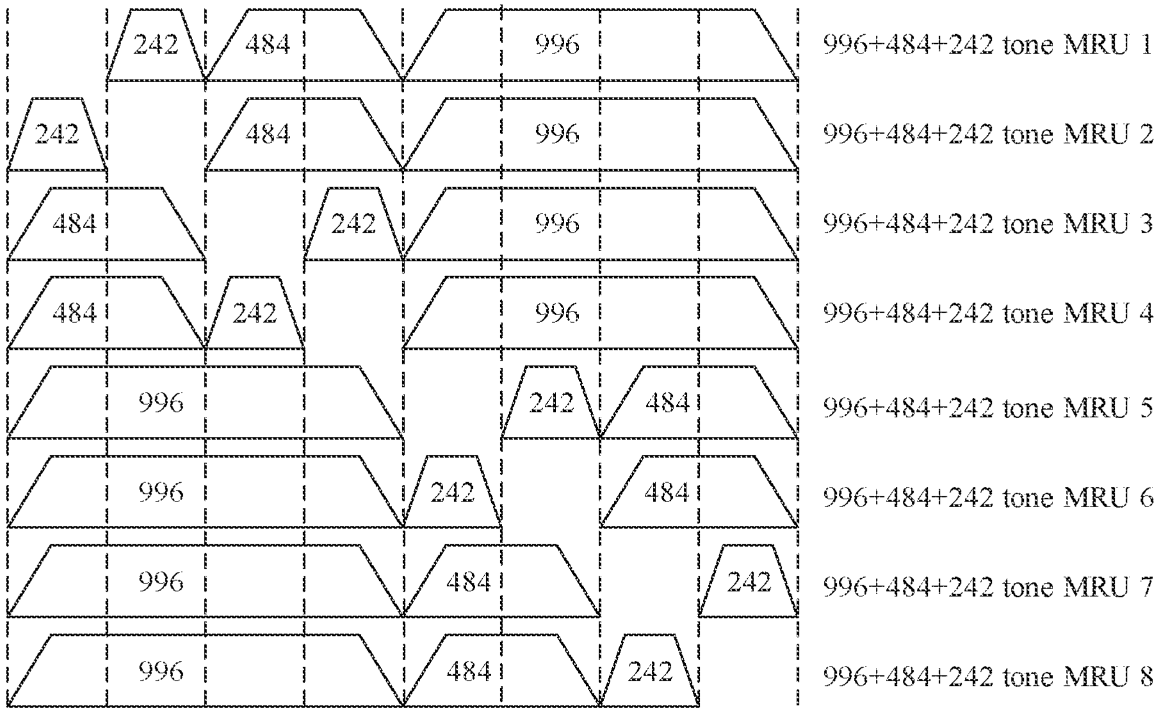
FIG. 21 is a schematic diagram of a tone plan and an RU plan of 160 MHz according to an embodiment of this application.

A bandwidth of 160 MHz or 80+80 n z is used as an example. An entire bandwidth may be considered as replication of tone plans of two 80 MHz. The entire bandwidth may include an entire 2×996-tone RU, or may include various combinations of 26-tone RU, 52-tone RU, 106-tone RU, 242-tone RU, 484-tone RU, and 996-tone RU. As shown in FIG. 20, an RU size may be 996+484-tone. As shown in FIG. 21, an RU size may be 996+484+242-tone.

Figure 22:
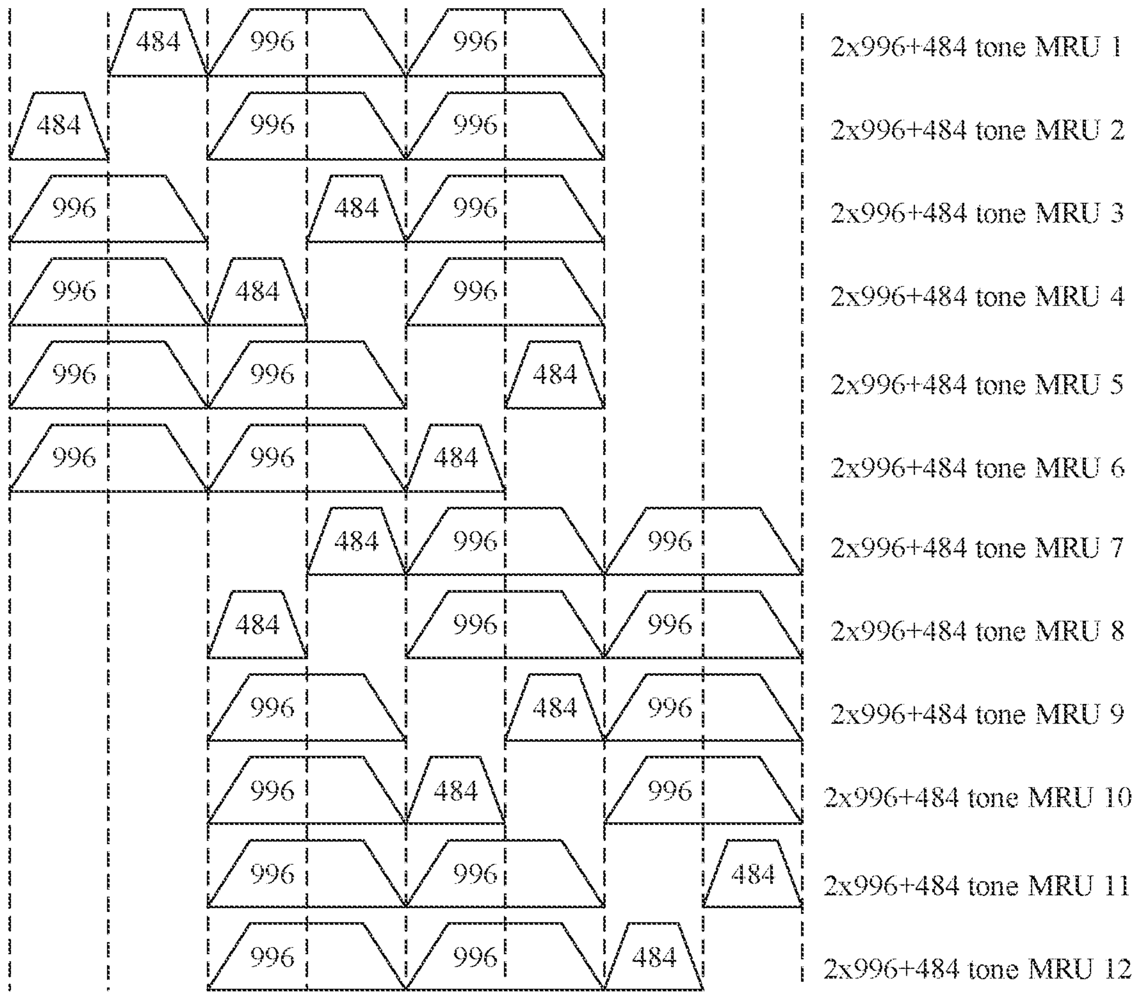
FIG. 22 is a schematic diagram of a tone plan and an RU plan of 320 MHz according to an embodiment of this application.
Figure 23:
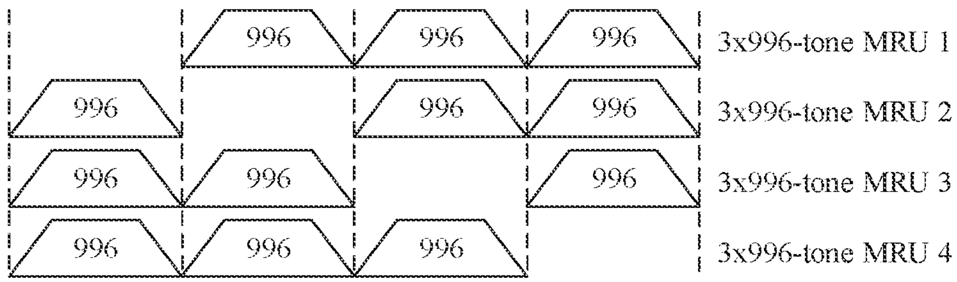
FIG. 23 is a schematic diagram of a tone plan and an RU plan of 320 MHz according to an embodiment of this application.
Figure 24:
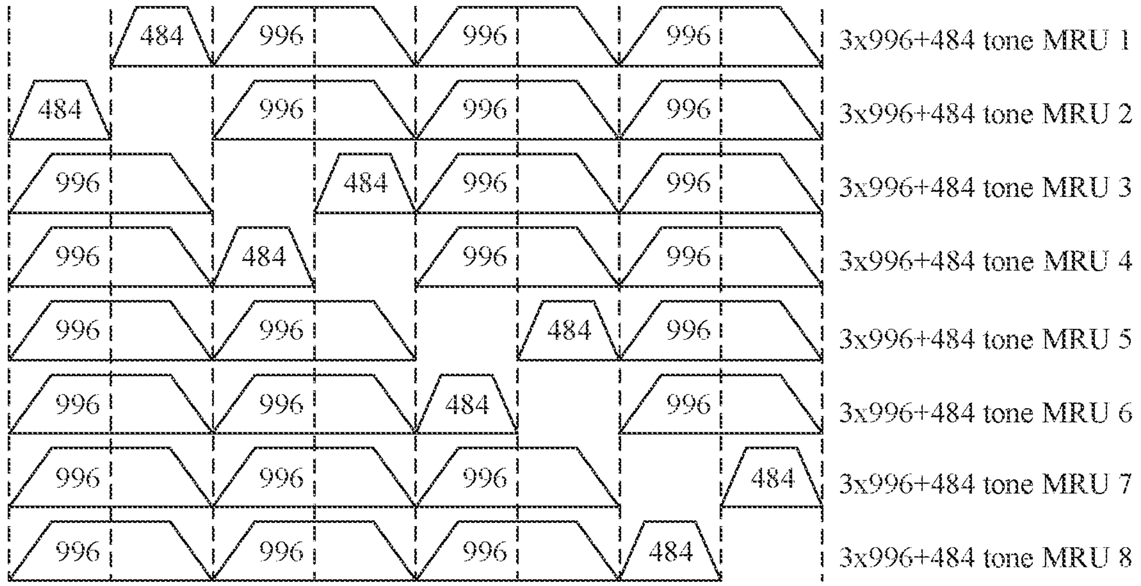
FIG. 24 is a schematic diagram of a tone plan and an RU plan of 320 MHz according to an embodiment of this application.

A bandwidth of 320 MHz or 160+160 MHz is used as an example. An entire bandwidth may be considered as replication of tone plans of four 80 MHz. The entire bandwidth may include an entire 4×996-tone RU, or may include various combinations of 26-tone RU, 52-tone RU, 106-tone RU, 242-tone RU, 484-tone RU, and 996-tone RU. As shown in FIG. 22, an RU size may be 2×996+484-tone. As shown in FIG. 23, an RU size may be 3×996-tone. As shown in FIG. 24, an RU size may be 3×996+484-tone.

Based on the foregoing description of the RU of each bandwidth, in a first example, the quantity of bits of the RU allocation subfield is 5. As shown in Table 6, a specific RU may be indicated by using 5 bits to indicate a puncturing pattern.

TABLE 6

| Bandwidth | Punching case | Puncturing pattern (RU or MRU index) | Field value |
|---|---|---|---|
| 20 MHz | No puncturing | [1 1 1 1] (242-tone RU 1) | 0 |
| 40 MHz | No puncturing | [1 1 1 1] (484-tone RU 1) | 0 |
| 80 MHz | No puncturing | [1 1 1 1] (996-tone RU 1) | 0 |
| | 20 MHz puncturing | [x 1 1 1] (484 + 242-tone MRU 1) | 1 |
| | | [1 x 1 1] (484 + 242-tone MRU 2) | 2 |
| | | [1 1 x 1] (484 + 242-tone MRU 3) | 3 |
| | | [1 1 1 x] (484 + 242-tone MRU 4) | 4 |
| 160 MHz | No puncturing | [1 1 1 1 1 1 1 1] (2 × 996-tone RU 1) | 0 |
| | 20 MHz puncturing | [x 1 1 1 1 1 1 1] (996 + 484 + 242-tone MRU 1) | 1 |
| | | [1 x 1 1 1 1 1 1] (996 + 484 + 242-tone MRU 2) | 2 |
| | | [1 1 x 1 1 1 1 1] (996 + 484 + 242-tone MRU 3) | 3 |
| | | [1 1 1 x 1 1 1 1] (996 + 484 + 242-tone MRU 4) | 4 |
| | | [1 1 1 1 x 1 1 1] (996 + 484 + 242-tone MRU 5) | 5 |
| | | [1 1 1 1 1 x 1 1] (996 + 484 + 242-tone MRU 6) | 6 |
| | | [1 1 1 1 1 1 x 1] (996 + 484 + 242-tone MRU 7) | 7 |
| | | [1 1 1 1 1 1 1 x] (996 + 484 + 242-tone MRU 8) | 8 |
| | 40 MHz puncturing | [x x 1 1 1 1 1 1] (996 + 484-tone MRU 1) | 9 |
| | | [1 1 x x 1 1 1 1] (996 + 484-tone MRU 2) | 10 |
| | | [1 1 1 1 x x 1 1] (996 + 484-tone MRU 3) | 11 |
| | | [1 1 1 1 1 1 x x] (996 + 484-tone MRU 4) | 12 |
| 320 MHz | No puncturing | [1 1 1 1 1 1 1 1] (4 × 996-tone RU 1) | 0 |
| | 40 MHz puncturing | [x 1 1 1 1 1 1 1] (3 × 996 + 484-tone MRU 1) | 1 |
| | | [1 x 1 1 1 1 1 1] (3 × 996 + 484-tone MRU 2) | 2 |
| | | [1 1 x 1 1 1 1 1] (3 × 996 + 484-tone MRU 3) | 3 |
| | | [1 1 1 x 1 1 1 1] (3 × 996 + 484-tone MRU 4) | 4 |
| | | [1 1 1 1 x 1 1 1] (3 × 996 + 484-tone MRU 5) | 5 |
| | | [1 1 1 1 1 x 1 1] (3 × 996 + 484-tone MRU 6) | 6 |
| | | [1 1 1 1 1 1 x 1] (3 × 996 + 484-tone MRU 7) | 7 |
| | | [1 1 1 1 1 1 1 x] (3 × 996 + 484-tone MRU 8) | 8 |
| | 80 MHz puncturing | [x x 1 1 1 1 1 1] (3 × 996-tone MRU 1) | 9 |
| | | [1 1 x x 1 1 1 1] (3 × 996-tone MRU 2) | 10 |
| | | [1 1 1 1 x x 1 1] (3 × 996-tone MRU 3) | 11 |
| | | [1 1 1 1 1 1 x x] (3 × 996-tone MRU 4) | 12 |
| | 320-80-40 | [x x x 1 1 1 1 1] (2 × 996 + 484-tone MRU 7) | 13 |
| | | [x x 1 x 1 1 1 1] (2 × 996 + 484-tone MRU 8) | 14 |
| | | [x x 1 1 x 1 1 1] (2 × 996 + 484-tone MRU 9) | 15 |
| | | [x x 1 1 1 x 1 1] (2 × 996 + 484-tone MRU 10) | 16 |
| | | [x x 1 1 1 1 x 1] (2 × 996 + 484-tone MRU 11) | 17 |
| | | [x x 1 1 1 1 1 x] (2 × 996 + 484-tone MRU 12) | 18 |
| | | [x 1 1 1 1 1 x x] (2 × 996 + 484-tone MRU 1) | 19 |
| | | [1 x 1 1 1 1 x x] (2 × 996 + 484-tone MRU 2) | 20 |
| | | [1 1 x 1 1 1 x x] (2 × 996 + 484-tone MRU 3) | 21 |
| | | [1 1 1 x 1 1 x x] (2 × 996 + 484-tone MRU 4) | 22 |
| | | [1 1 1 1 x 1 x x] (2 × 996 + 484-tone MRU 5) | 23 |
| | | [1 1 1 1 1 x x x] (2 × 996 + 484-tone MRU 6) | 24 |

In a second example, the quantity of bits of the RU allocation subfield is 7. As shown in the following Table 7, with reference to the RU plans shown in FIG. 10 to FIG. 24, a large RU greater than or equal to 242-tone or an MRU may be indicated by using the 7 bits.

TABLE 7

| RU allocation subfield (7 bits) | Indicated RU/MRU | Number of entries |
|---|---|---|
| 0000000-0001111 | 242-tone RU | 16 |
| 0010000-0010111 | 484-tone RU | 8 |
| 0011000-0100111 | 484 + 242-tone MRU | 16 |
| 0101000-0101011 | 996-tone RU | 4 |
| 0101100-0110011 | 996 + 484-tone MRU | 8 |
| 0110100-0110101 | 2 × 996-tone RU | 2 |
| 0110110-1000001 | 2 × 996 + 484-tone MRU | 12 |
| 1000010-1000101 | 3 × 996-tone MRU | 4 |
| 1000110-1001101 | 3 × 996 + 484-tone MRU | 8 |
| 1001110 | 4 × 996-tone RU | 1 |
| 1001111-1111111 | Reserved | 49 |

In a third example, the quantity of bits of the RU allocation subfield is 8. With reference to the bandwidth indication, each of the 8 bits may represent a 242-tone RU or a 484-tone RU. The following Table 8 is used as an example. When the bandwidths are 20 MHz, 40 MHz, 80 MHz, and 160 Hz, each bit may represent one 242-tone RU. When the bandwidth is 320 MHz, each bit may represent one 484-tone RU. The RU may be indicated by setting a value of each bit to 1.

TABLE 8

| Bandwidth | Indicated RU/MRU | 8-bit bitmap indication |
|---|---|---|
| 20 MHz | 242 | 10000000 |
| 40 MHz | 242 | 10000000, 01000000 |
| | 484 | 11000000 |
| 80 MHz | 242 | 10000000, 01000000, 00100000, 00010000 |
| | 484 | 11000000, 00110000 |
| | 484 + 242 | 11100000, 11010000, 10110000, 01110000 |
| | 996 | 11110000 |
| 160 MHz | 242 | 10000000, 01000000, 00100000, 00010000, 00001000, 00000100, 00000010, 00000001 |
| | 484 | 11000000, 00110000, 00001100, 00000011 |
| | 484 + 242 | 11100000, 11010000, 10110000, 01110000, 00001110, 00001101, 00001011, 00000111 |
| | 996 | 11110000, 00001111 |
| | 996 + 484 | 11111100, 11110011, 11001111, 00111111 |
| | 996 + 484 + 242 | 11101111, 11011111, 10111111, 01111111, 11111110, 11111101, 11111011, 11110111 |
| | 2 × 996 | 11111111 |
| 320 MHz | 484 | 10000000, 01000000, 00100000, 00010000, 00001000, 00000100, 00000010, 00000001 |
| | 996 | 11000000, 00110000, 00001100, 00000011 |
| | 996 + 484 | 11100000, 11010000, 10110000, 01110000, 00001110, 00001101, 00001011, 00000111 |
| | 2 × 996 | 11110000, 00001111 |
| | 2 × 996 + 484 | 11111000, 11110100, 11101100, 11011100, 10111100, 01111100, 00111110, 00111101, 00111011, 00110111, 0010111, 0001111 |
| | 3 × 996 | 11111100, 11110011, 11001111, 00111111 |
| | 3 × 996 + 484 | 11111110, 11111101, 11111011, 11110111, 11101111, 11011111, 10111111, 01111111 |
| | 4 × 996 | 11111111 |

In a fourth example, the quantity of bits of the RU allocation subfield is 9. A first bit in the 9 bits may indicate a granularity, to indicate whether each of the subsequent 8 bits represents a 242-tone RU or a 484-tone RU. The following Table 9 is used as an example. A value of the first bit may be set to 0, to indicate that each of the subsequent 8 bits represents the 242-tone RU. This is applicable to communication scenarios in which bandwidths are 20 MHz, 40 MHz, 80 MHz, and 160 MHz. The value of the first bit may be set to 1, to indicate that each of the subsequent 8 bits represents the 484-tone RU. This is applicable to a communication scenario in which a bandwidth is 320 MHz. The RU may be indicated by setting a value of each of the 8 bits to 1.

TABLE 9

| Bandwidth | Indicated RU/MRU | 9-bit bitmap indication |
|---|---|---|
| 20 MHz | 242 | 010000000 |
| 40 MHz | 242 | 010000000, 001000000 |
| | 484 | 011000000 |
| 80 MHz | 242 | 010000000, 001000000, 000100000, 000010000 |
| | 484 | 011000000, 000110000 |
| | 484 + 242 | 011100000, 011010000, 010110000, 001110000 |
| | 996 | 011110000 |
| 160 MHz | 242 | 010000000, 001000000, 000100000, 000010000, 000001000, 000000100, 000000010, 000000001 |
| | 484 | 011000000, 000110000, 000001100, 000000011 |
| | 484 + 242 | 011100000, 011010000, 010110000, 001110000, 000001110, 000001101, 000001011, 000000111 |
| | 996 | 011110000, 000001111 |
| | 996 + 484 | 011111100, 011110011, 011001111, 000111111 |
| | 996 + 484 + 242 | 011101111, 011011111, 010111111, 001111111, 011111110, 011111101, 011111011, 011110111 |
| | 2 × 996 | 011111111 |
| 320 MHz | 484 | 110000000, 101000000, 100100000, 100010000, 100001000, 100000100, 100000010, 100000001 |
| | 996 | 111000000, 100110000, 100001100, 100000011 |
| | 996 + 484 | 111100000, 111010000, 110110000, 101110000, 100001110, 100001101, 100001011, 100000111 |
| | 2 × 996 | 111110000, 100001111 |
| | 2 × 996 + 484 | 111111000, 111110100, 111101100, 111011100, 110111100, 101111100, 100111110, 100111101, 100111011, 100110111, 110010111, 110001111 |
| | 3 × 996 | 111111100, 111110011, 111001111, 100111111 |
| | 3 × 996 + 484 | 111111110, 111111101, 111111011, 111110111, 111101111, 111011111, 110111111, 101111111 |
| | 4 × 996 | 111111111 |

It should be noted that two consecutive 242-tone RUs may be combined into one 484-tone RU, two consecutive 484-tone RUs may be combined into one 996-tone RU, and the rest may be deduced by analogy.

In a fifth example, the quantity of bits of the RU allocation subfield is 9. As shown in the following Table 10, a 1-bit PS160 subfield of the RU allocation subfield may indicate whether an RU corresponds to a primary 160 MHz or a secondary 160 MHz, and an RU or an MRU may be indicated by using the 8 bits.

TABLE 10

| PS160 subfield | RU allocation subfield (B0) | RU allocation subfield (B7-B1) | Bandwidth (MHz) | RU size | RU index | PHY RU index |
|---|---|---|---|---|---|---|
| 0-3: 80 MHz subblock where the RU is located | | 0-8 | 20, 40, 80, 160, or 320 | 26 | RU 1 to RU 9, respectively | 37 × N + RU index |
| | | 9-17 | 40, 80, 160, or 320 | | RU 10 to RU 18, respectively | |
| | | 18 | 80, 160, or 320 | | Reserved | |
| | | 19-36 | 80, 160, or 320 | | RU 20 to RU 37, respectively | |
| | | 37-40 | 20, 40, 80, 160, or 320 | 52 | RU 1 to RU 4, respectively | 16 × N + RU index |
| | | 41-44 | 40, 80, 160, or 320 | | RU 5 to RU 8, respectively | |
| | | 45-52 | 80, 160, or 320 | | RU 9 to RU 16, respectively | |
| | | 53, 54 | 20, 40, 80, 160, or 320 | 106 | RU 1 and RU 2, respectively | 8 × N + RU index |

TABLE 10-continued

| PS160 subfield | RU allocation subfield (B0) | RU allocation subfield (B7-B1) | Bandwidth (MHz) | RU size | RU index | PHY RU index |
|---|---|---|---|---|---|---|
| | | 55, 56 | 40, 80, 160, or 320 | | RU 3 and RU 4, respectively | |
| | | 57-60 | 80, 160, or 320 | | RU 5 to RU 8, respectively | |
| | | 61 | 20, 40, 80, 160, or 320 | 242 | RU 1 | 4 × N + RU index |
| | | 62 | 40, 80, 160, or 320 | | RU 2 | |
| | | 63, 64 | 80, 160, or 320 | | RU 3 and RU 4, respectively | |
| | | 65 | 40, 80, 160, or 320 | 484 | RU 1 | 2 × N + RU index |
| | | 66 | 80, 160, or 320 | | RU 2 | |
| | | 67 | 80, 160, or 320 | 996 | RU 1 | N + RU index |
| 0-1: 160 MHz segment where the RU is located | 0 | 68 | | Reserved | | Reserved |
| | 1 | | 160 or 320 | 2 × 996 | RU 1 | LU160 + RU index |
| 0 | 0 | 69 | | Reserved | | Reserved |
| 0 | 1 | | | | | |
| 1 | 0 | | | | | |
| 1 | 1 | | 320 | 4 × 996 | RU 1 | RU 1 |
| 0-3: 80 MHz subblock where the RU is located | | 70-72 | 20, 40, 80, 160, or 320 | 52 + 26 | MRU 1 to MRU 3, respectively | 12 × N + RU index |
| | | 73-75 | 40, 80, 160, or 320 | 52 + 26 | MRU 4 to MRU 6, respectively | |
| | | 76-81 | 80, 160, or 320 | 52 + 26 | MRU 7 to MRU 12, respectively | |
| | | 82-83 | 20, 40, 80, 160, or 320 | 106 + 26 | MRU 1 and MRU 2, respectively | 8 × N + RU index |
| | | 84-85 | 40, 80, 160, or 320 | 106 + 26 | MRU 3 to MRU 4, respectively | |
| | | 86-89 | 80, 160, or 320 | 106 + 26 | MRU 5 to MRU 8, respectively | |
| | | 90-93 | 80, 160, or 320 | 484 + 242 | MRU 1 to MRU 4, respectively | 4 × N + RU index |
| 0-1: 160 MHz segment where the RU is located | 0 | 94-95 | 160 or 320 | 996 + 484 | MRU 1 and MRU 2, respectively | 4 × LU160 + RU index |
| | 1 | | | | MRU 3 to MRU 4, respectively | |
| 0-1: 160 MHz segment where the RU is located | 0 | 96-99 | 160 or 320 | 996 + 484 + 242 | MRU 1 to MRU 4, respectively | 8 × LU160 + RU index |
| | 1 | | | | MRU 5 to MRU 8, respectively | |
| 0 | 0 | 100-103 | 320 | 2 × 996 + 484 | MRU 1 to MRU 4, respectively | RU index |
| 0 | 1 | | | | MRU 5 and MRU 6, respectively | |

TABLE 10-continued

| PS160 subfield | RU allocation subfield (B0) | RU allocation subfield (B7-B1) | Bandwidth (MHz) | RU size | RU index | PHY RU index |
|---|---|---|---|---|---|---|
| 1 | 0 | | | | MRU 7 and MRU 8, respectively | |
| 1 | 1 | | | | MRU 9 to MRU 12, respectively | |
| 0 | 0 | 104 | 320 | 3 × 996 | MRU 1 | RU index |
| 0 | 1 | | | | MRU 2 | |
| 1 | 0 | | | | MRU 3 | |
| 1 | 1 | | | | MRU 4 | |
| 0 | 0 | 105-106 | 320 | 3 × 996 + 484 | MRU 1 and MRU 2, respectively | RU index |
| 0 | 1 | | | | MRU 3 and MRU 4, respectively | |
| 1 | 0 | | | | MRU 5 and MRU 6, respectively | |
| 1 | 1 | | | | MRU 7 and MRU 8, respectively | |
| Any | Any | 107-127 | Any | Reserved | Reserved | Reserved |

It should be noted that, in the first field, when the unsolicited MFB subfield is set to 1 and the UL EHT TB PPDU MFB subfield is set to 0, the RU allocation subfield may indicate an RU for which the recommended EHT MCS applies to the PPDU sent to the station. When the unsolicited MFB subfield is set to 0 and the MRQ subfield is set to 1, the RU allocation subfield may indicate an RU specified by the MFB requester to get feedback. The RU allocation subfield and the BW subfield may jointly indicate a specific resource unit. When the unsolicited MFB subfield is set to 1 and the UL EHT TB PPDU MFB subfield is set to 1, the RU allocation subfield may indicate a resource unit for which the recommended EHT-MCS applies to the EHT TB PPDU sent from the station. It should be noted that actual allocation of the RU can be ignored by a recipient. In other cases, the RU allocation subfield is reserved.

Based on the foregoing descriptions of the RU allocation subfield, compared with the 802.11ax standard, more RU types are introduced by using any one of the first example to the fifth example in this embodiment of this application, so that a requirement for an RU in the 802.11be standard or the future Wi-Fi standard can be better met.

Further, the first field may further include a BW subfield whose quantity of bits is greater than or equal to 3.

For example, the quantity of bits of the BW subfield is 3. Different values of the 3 bits may correspond to different bandwidths. A specific correspondence between a bit value and a bandwidth is not limited. In a possible implementation, the quantity of bits may be set to 0 to indicate 20 MHz, set to 1 to indicate 40 MHz, set to 2 to indicate 80 MHz, set to 3 to indicate 160 MHz, and set to 4 to indicate 320 MHz.

It should be noted that, in the first field, when the unsolicited MFB subfield is set to 1 and the UL EHT TB PPDU MFB subfield is set to 0, the BW subfield may indicate a bandwidth for which the recommended EHT-MCS applies to the PPDU sent to the station. When the unsolicited MFB subfield is set to 0 and the MRQ subfield is set to 1, the BW subfield may indicate a bandwidth specified by the MFB requester to get feedback. When the unsolicited MFB subfield is set to 1 and the UL EHT TB PPDU MFB subfield is set to 1, the BW subfield may indicate a bandwidth for which the recommended EHT-MCS applies to the EHT TB PPDU sent from the station. In other cases, the BW subfield is reserved.

Based on the foregoing descriptions of the BW subfield, compared with the 802.11ax standard, in this embodiment of this application, the quantity of bits of the BW subfield is extended, to introduce more bandwidths, so that a requirement for a bandwidth in the 802.11be standard or the future Wi-Fi standard can be better met.

Further, the first field may further include an MSI/partial PPDU parameters subfield whose quantity of bits is 2.

In the first field, when the unsolicited MFB subfield is set to 0 and the MRQ subfield is set to 1, the MSI/partial PPDU parameters subfield may contain a sequence number in a range 0 to 3 that identifies a specific EHT-MCS feedback request. When the unsolicited MFB subfield is set to 0 and the MRQ subfield is set to 0, the MSI/partial PPDU parameters subfield may contain a sequence number in the range 0 to 3 that responds to the specific EHT-MCS feedback. When the unsolicited MFB subfield is set to 1, the MSI/partial PPDU parameters subfield may include a 1-bit PPDU format subfield and a 1-bit coding type subfield. The PPDU format subfield may indicate a type of a PPDU used when parameter estimation is performed on the unsolicited MFB. For example, a value of the PPDU format subfield may be set to 0 to indicate an EHT MU PPDU, or a value of the PPDU format subfield may be set to 1 to indicate an EHT TB PPDU. The coding type subfield may indicate a coding type. For example, a value of the coding type subfield may be set to 0 to indicate binary convolutional coding, or a value of the coding type subfield may be set to 1 to indicate low-density parity check coding.

Based on the foregoing descriptions of the MSI/partial PPDU parameters subfield, compared with the 802.11ax standard, in this embodiment of this application, the MSI/partial PPDU parameters subfield is compressed from 3 bits to 2 bits. The quantity of bits can be saved while a requirement for an MSI/partial PPDU parameters subfield in the 802.11be standard or the future Wi-Fi standard is met.

Further, more features and functions in the 802.11be standard or the future Wi-Fi standard can be supported by using the saved 1 bit, so that the first field can feed back more features and functions with the 26 bits.

Further, the first field may further include a Tx beamforming subfield whose quantity of bits is 1.

For descriptions of the Tx beamforming subfield, refer to the descriptions of the Tx beamforming subfield in Table 2. Details are not described again.

Further, the first field may further include fourth indication information whose quantity of bits is 1.

The fourth indication information may indicate that the first field is an EHT LA control subfield. Alternatively, the fourth indication information may indicate that the first field is an HE LA control subfield.

Further, the PPDU may further include a control identifier field corresponding to the first field.

Refer to the following Table 11. When a value of the control identifier field is 2, control information is the first field. Therefore, the value of the control identifier field corresponding to the first field may be 2, or the value of the control identifier field corresponding to the first field may be any one of reserved values. To be specific, the value of the control identifier field corresponding to the first field may be 2, or may be any one of 9 to 14.

TABLE 11

| Value of the control identifier field | Meaning | Length of the control information subfield |
|---|---|---|
| 0 | Triggered response scheduling | 26 |
| 1 | Operating mode | 12 |
| 2 | HLA | 26 |
| 3 | Buffer status report | 26 |
| 4 | UL power headroom | 8 |
| 5 | Bandwidth query report | 10 |
| 6 | Command and status | 8 |
| 7 | EHT operating mode | 6 |
| 8 | Single response scheduling | 10 |
| 9-14 | Reserved | |
| 15 | Ones need expansion surely | 26 |

It should be noted that, when the value of the control identifier field is 2, the first field may include the fourth indication information, to indicate whether the current first field is the PIE LA control subfield or the EHT LA control subfield. When the value of the control identifier field is any one of 9 to 14, the control identifier field indicates that the first field is the EHT LA control subfield.

Based on the foregoing descriptions of the first field and the control identifier field corresponding to the first field, in this embodiment of this application, bit compression is performed by using one or more of the following method 1 to method 6, to better support more features and functions (for example, a larger number of spatial streams, more RUs, a larger bandwidth, and effective differentiation between the HE LA control subfield and the EHT LA control subfield) in the 802.11be standard or the future Wi-Fi standard by using the saved bits on the basis that the quantity of bits of the first field is kept to be 26. In other words, as long as the quantity of bits of the first field is 26, one or more of the following methods may be used for combination, to implement bit compression or perform function information extension by using the bits saved through compression. For how to indicate related information by using a quantity of bits corresponding to a specific field, refer to the descriptions in the foregoing embodiments. Details are not described again below.

Method 1: The MRQ and the UL EHT TB PPDU MFB are compressed into the 1-bit first indication information to implement bit compression.

Method 2: Based on the foregoing descriptions of the EHT-MCS subfield, the EHT-MCS subfield may indicate the DCM. Therefore, compared with the 802.11ax standard, a DCM subfield may be removed to implement bit compression.

Method 3: Based on the foregoing descriptions of the RU allocation subfield, the quantity of bits of the RU allocation subfield are compressed. For example, the quantity of bits of the RU allocation subfield may be set to 5, 7, or 8 to implement bit compression.

Method 4: Based on the foregoing descriptions of the MSI/partial PPDU parameters subfield, the MSI/partial PPDU parameters subfield is compressed from 3 bits in the 802.11ax standard to 2 bits to implement bit compression.

Method 5: The Tx beamforming subfield may be removed to implement bit compression.

Method 6: The value of the control identifier field is set to any one of 9 to 14, to remove the fourth indication information, to implement bit compression.

For example, as shown in FIG. 25, compared with the 802.11ax standard, the MRQ and the UL EHT TB PPDU MFB may be compressed into 1 bit, the MSI/partial PPDU parameters subfield may be compressed into 2 bits, and the DCM subfield may be removed, so that the NSS subfield is extended to 4 bits, the HE-MCS subfield is replaced with a 4-bit EHT-MCS subfield, the RU allocation subfield is extended to 9 bits, the BW subfield is extended to 3 bits, and the fourth indication information is added to indicate whether the first field is the HE LA control subfield or the EHT LA control subfield by using the saved bits. In this way, more features and functions such as the larger number of spatial streams, more RUs, the larger bandwidth, and effective differentiation between the HE LA control subfield and the EHT LA control subfield in the 802.11be standard or the future Wi-Fi standard can be supported.

In another example, as shown in FIG. 26, compared with FIG. 25, the MRQ and the UL EHT TB PPDU MFB may not be compressed into 1 bit, and bit compression may be implemented by using a 3-bit NSS subfield indicating a larger number of spatial streams. Specifically, for indicating the number of spatial streams by the 3-bit NSS subfield, refer to the foregoing embodiment. Details are not described herein again.

In another example, as shown in FIG. 27, compared with FIG. 25, the value of the control identifier field may alternatively be set to any one of 9 to 14, to remove the fourth indication information, to implement bit compression. It should be noted that, in this case, there is still 1 bit that is a reserved bit and is not used for specific indication information. When function extension is performed on the first field, the 1-bit reserved bit may indicate specific information. When the 1 bit is used, the 1 bit is no longer considered as a reserved bit.

Figure 28:
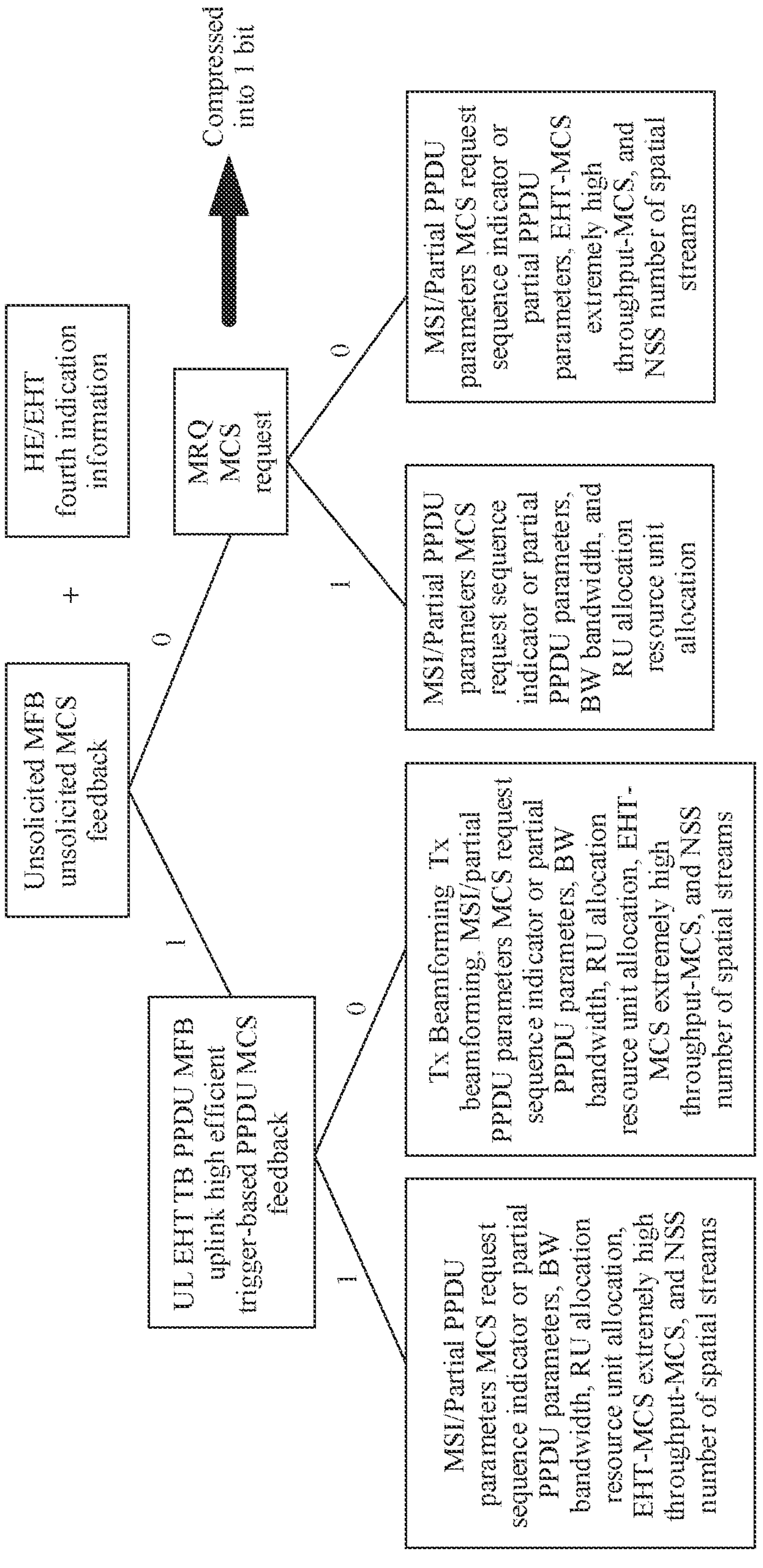
FIG. 28 is a schematic diagram of a structure of a first field frame according to an embodiment of this application.

It should be noted that, as shown in FIG. 28, when the value of the unsolicited MFB subfield is 1, the first indication information may indicate the UL EHT TB PPDU MFB. When the value of the UL EHT TB PPDU MFB subfield is 1, the first field may include the MSI/partial PPDU parameters subfield, the BW subfield, the RU allocation subfield, the EHT-MCS subfield, and the NSS subfield. When the value of the UL EHT TB PPDU MFB subfield is 0, the first field may include the Tx beamforming subfield, the MSI/partial PPDU parameters subfield, the BW subfield, the RU allocation subfield, the EHT-MCS subfield, and the NSS subfield. When the value of the unsolicited MFB subfield is 0, the first indication information may indicate the MRQ. When the value of the MRQ subfield is 1, the first field may include the MSI/partial PPDU Parameters subfield, the BW subfield, and the RU allocation subfield. When the value of the MRQ subfield is 0, the first field may include the MSI/partial PPDU parameters subfield, the EHT-MCS subfield, and the NSS subfield.

Corresponding to the first field shown in FIG. 9 to FIG. 28, an embodiment of this application further provides another first field.

A quantity of bits of the first field is 26, and the first field may include second indication information. The second indication information may indicate that the first field corresponds to SU-MIMO, or the second indication information indicates that the first field corresponds to MU-MIMO.

For the SU-MIMO and the MU-MIMO, users in the MU-MIMO may interfere with each other, and a link adaptation feedback parameter corresponding to the MU-MIMO is usually different from that of the SU-MIMO. Whether a current feedback is the SU-MIMO or the MU-MIMO can be distinguished by adding the second indication information, thereby improving a throughput of a communication system.

For example, a quantity of bits of the second indication information is 1. A value of the second indication information may be set to 0 to indicate that the first field corresponds to the SU-MIMO, or a value of the second indication information may be set to 1 to indicate that the first field corresponds to the MU-MIMO. Alternatively, the value of the second indication information may be set to 1 to indicate that the first field corresponds to the SU-MIMO, or the value of the second indication information may be set to 0 to indicate that the first field corresponds to the MU-MIMO. This is not limited in this application.

Further, the first field may include a number of spatial streams NSS subfield whose quantity of bits is greater than or equal to 3.

When the second indication information indicates that the first field corresponds to the SU-MIMO, a maximum number of spatial streams indicated by the NSS subfield may be 16. When the second indication information indicates that the first field corresponds to the MU-MIMO, a maximum number of spatial streams indicated by the NSS subfield may be 4.

For example, the second indication information indicates that the first field corresponds to the SU-MIMO, and the quantity of bits of the NSS subfield is equal to 3. Values 0 to 7 of the quantity of bits may respectively correspond to any eight numbers of spatial streams in numbers 1 to 16 of spatial streams. This is not limited in this application.

For example, the values 0 to 7 of the quantity of bits may respectively correspond to numbers 1, 2, 4, 6, 8, 10, 12, and 16 of spatial streams. Alternatively, the values 0 to 7 of the quantity of bits may respectively correspond to numbers 1, 3, 5, 7, 9, 11, 13, and 16 of spatial streams. This is not limited.

For example, the quantity of bits of the NSS subfield is equal to 4. Values 0 to 15 of the quantity of bits may correspond to numbers 1 to 16 of spatial streams, and a specific correspondence between a bit value and a number of spatial streams is not limited. In a possible implementation, the values 0 to 15 of the quantity of bits one-to-one correspond to the numbers 1 to 16 of spatial streams. To be specific, a bit value 0 corresponds to a number 1 of spatial streams, a bit value 1 corresponds to a number 2 of spatial streams, and examples are not enumerated herein.

For example, the second indication information indicates that the first field corresponds to the MU-MIMO, and the quantity of bits of the NSS subfield is greater than or equal to 3. Values 0 to 3 of two bits of the NSS subfield may respectively correspond to numbers 1 to 4 of spatial streams, and the remaining bit of the NSS subfield is a reserved bit.

Further, the first field may further include an EHT-MCS subfield whose quantity of bits is 4. Alternatively, the first field may further include a signal-to-noise ratio SNR subfield whose quantity of bits is 6.

For descriptions of the EHT-MCS subfield or the SNR subfield, refer to related descriptions of the EHT-MCS subfield or the SNR subfield corresponding to Table 4 or Table 5. Details are not described again.

Further, the first field may further include an RU allocation subfield. A quantity of bits of the RU allocation subfield is 5, a quantity of bits of the RU allocation subfield is 7, a quantity of bits of the RU allocation subfield is 8, or a quantity of bits of the RU allocation subfield is 9.

For descriptions of the RU allocation subfield, refer to related descriptions of the RU allocation subfield in FIG. 10 to FIG. 24 and Table 6 to Table 10. Details are not described again.

Further, the first field may further include one or more of the following subfields: first indication information whose quantity of bits is 1, a BW subfield whose quantity of bits is greater than or equal to 3, an MSI/partial PPDU parameters subfield whose quantity of bits is 2, a Tx beamforming subfield whose quantity of bits is 1, and fourth indication information whose quantity of bits is 1.

Further, a PPDU corresponding to the first field may further include a control identifier field corresponding to the first field.

For descriptions of the first indication information, the BW subfield, the MSI/partial PPDU parameters subfield, the Tx beamforming subfield, the fourth indication information, and the control identifier field corresponding to the first field, refer to related descriptions in the foregoing embodiments. Details are not described again.

Based on the foregoing descriptions of the LA control field and the control identifier field corresponding to the first field, in this embodiment of this application, bit compression may also be performed by using one or more of the foregoing method 1 to method 6, to better support more features and functions (for example, a larger number of spatial streams, more RUs, a larger bandwidth, and effective differentiation between an HE LA control subfield and an EHT LA control subfield) in the 802.11be standard or a future Wi-Fi standard by using the saved bits on the basis that the quantity of bits of the first field is kept to be 26. In other words, as long as the quantity of bits of the first field is 26, one or more of the foregoing method 1 to method 6 may be used for combination, to implement bit compression or perform function information extension by using the bits saved through compression. For how to indicate related information by using a quantity of bits corresponding to a specific field, refer to the descriptions in the foregoing embodiments. Details are not described below.

Figure 29:
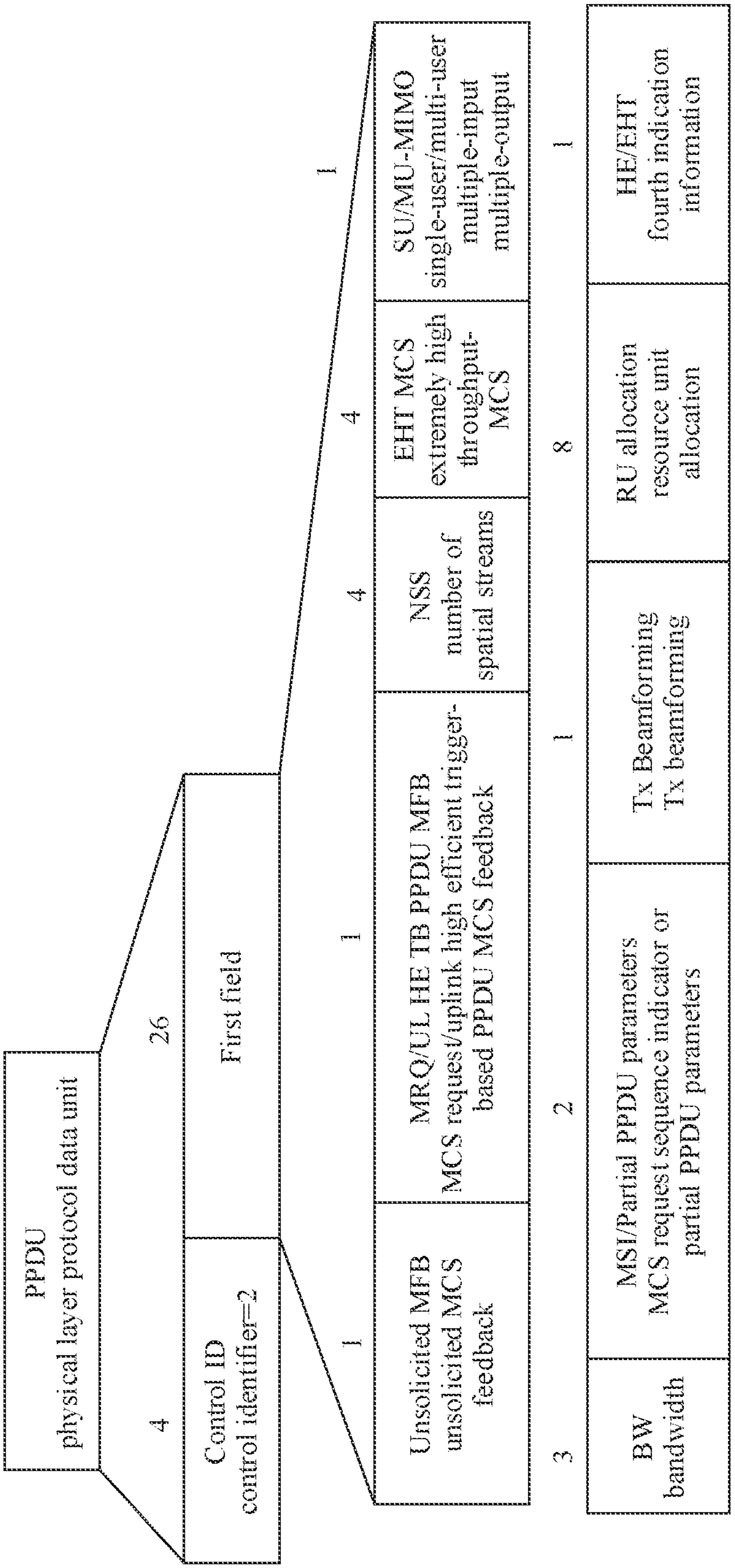
FIG. 29 is a schematic diagram of a structure of a first field frame according to an embodiment of this application.

For example, as shown in FIG. 29, compared with the 802.11ax standard, an MRQ and an UL EHT TB PPDU MFB may be compressed into 1 bit, the MSI/partial PPDU parameters subfield may be compressed into 2 bits, and a DCM subfield may be removed, so that the NSS subfield is extended to 4 bits, an HE-MCS subfield is replaced with a 4-bit EHT-MCS subfield, the second indication information is added, the BW subfield is extended to 3 bits, and the fourth indication information is added to indicate whether the first field is the HE LA control subfield or the EHT LA control subfield by using the saved bits. In this way, more features and functions such as the larger number of spatial streams, more RUs, the larger bandwidth, effective differentiation between the SU-MIMO and the MU-MIMO, and effective differentiation between the HE LA control subfield and the EHT LA control subfield in the 802.11be standard or the future Wi-Fi standard can be supported.

Corresponding to that the second indication information indicates whether the first field corresponds to the SU-MIMO or the MU-MIMO, this embodiment of this application provides a first field, and MCSs or SNRs of the SU-MIMO and the MU-MIMO may be fed back in a same first field at the same time.

A quantity of bits of the first field is 26, and the first field may include an SU-MIMO EHT-MCS subfield whose quantity of bits is 4 and an MU-MIMO EHT-MCS subfield whose quantity of bits is 4. Alternatively, the first field may include an SU-MIMO SNR subfield whose quantity of bits is 6 and an MU-MIMO SNR subfield whose quantity of bits is 6.

Further, the first field may further include an NSS subfield whose quantity of bits is 2.

The NSS subfield may be applicable to both SU-MIMO and MU-MIMO. Values 0 to 3 of the NSS subfield may respectively correspond to numbers 1 to 4 of spatial streams. A specific correspondence between a bit value and a number of spatial streams is not limited. In a possible implementation, the values 0 to 3 of the quantity of bits one-to-one correspond to the numbers 1 to 4 of spatial streams. To be specific, a bit value 0 corresponds to a number 1 of spatial streams, a bit value 1 corresponds to a number 2 of spatial streams, and examples are not enumerated herein.

Further, the first field may further include an RU allocation subfield. A quantity of bits of the RU allocation subfield is 5, a quantity of bits of the RU allocation subfield is 7, a quantity of bits of the RU allocation subfield is 8, or a quantity of bits of the RU allocation subfield is 9.

For descriptions of the RU allocation subfield, refer to related descriptions of the RU allocation subfield in FIG. 10 to FIG. 24 and Table 6 to Table 10. Details are not described again.

Further, the first field may further include one or more of the following subfields: first indication information whose quantity of bits is 1, a BW subfield whose quantity of bits is greater than or equal to 3, an MSI/partial PPDU parameters subfield whose quantity of bits is 2, a Tx beamforming subfield whose quantity of bits is 1, and fourth indication information whose quantity of bits is 1.

Further, a PPDU corresponding to the first field may further include a control identifier field corresponding to the first field.

For descriptions of the first indication information, the BW subfield, the MSI/partial PPDU parameters subfield, the Tx beamforming subfield, the fourth indication information, and the control identifier field corresponding to the first field, refer to related descriptions in the foregoing embodiments. Details are not described again.

Based on the foregoing descriptions of the LA control field and the control identifier field corresponding to the first field, in this embodiment of this application, bit compression may also be performed by using one or more of the foregoing method 1 to method 6 and the following method 7, to better support more features and functions (for example, more RUs, a larger bandwidth, and effective differentiation between an HE LA control subfield and an EHT LA control subfield) in the 802.11be standard or a future Wi-Fi standard by using the saved bits on the basis that the quantity of bits of the first field is kept to be 26. In other words, as long as the quantity of bits of the first field is 26, one or more of the foregoing method 1 to method 6 and the following method 7 may be used for combination, to implement bit compression or perform function information extension by using the bits saved through compression. For how to indicate related information by using a quantity of bits corresponding to a specific field, refer to the descriptions in the foregoing embodiments. Details are not described below.

Method 7: Based on the foregoing descriptions of the NSS subfield whose quantity of bits is 2, the NSS subfield is compressed from 3 bits in the 802.11ax standard to 2 bits, to implement bit compression.

Figure 30:
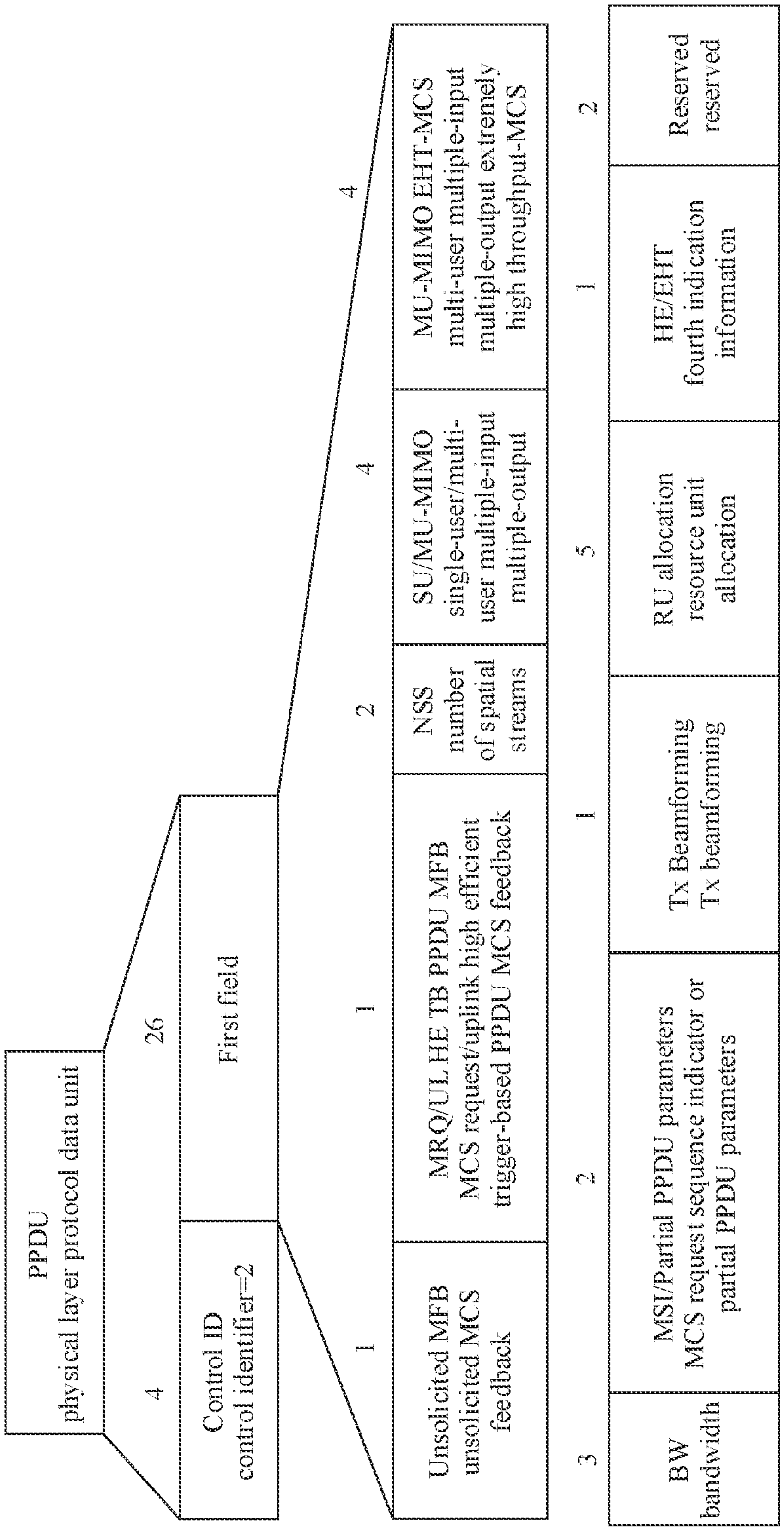
FIG. 30 is a schematic diagram of a structure of a first field frame according to an embodiment of this application.

For example, as shown in FIG. 30, compared with the 802.11ax standard, an MRQ and an UL EHT TB PPDU MFB may be compressed into 1 bit (that is, the first indication information in the foregoing embodiment. For a specific indication manner, refer to the foregoing embodiment), the NSS subfield may be compressed into 2 bits, the MSI/partial PPDU parameters subfield may be compressed into 2 bits, a DCM subfield may be removed, and the RU allocation subfield may be compressed into 5 bits, so that the 4-bit SU-MIMO EHT-MCS subfield and the 4-bit MU-MIMO EHT-MCS subfield are added, the BW subfield is extended to 3 bits, and the fourth indication information is added to indicate whether the first field is the HE LA control subfield or the EHT LA control subfield by using the saved bits. In this way, more features and functions such as more RUs, the larger bandwidth, effective differentiation between the SU-MIMO and the MU-MIMO, and effective differentiation between the HE LA control subfield and the EHT LA control subfield in the 802.11be standard or the future Wi-Fi standard can be supported. It should be noted that, in this case, there are still 2 bits that are reserved bits and are not used for specific indication information. When function extension is performed on the first field, the 2-bit reserved bits may indicate specific information. When the 2 bits are used, the 2 bits are no longer considered as reserved bits.

Similar to that the MCSs or the SNRs of both the SU-MIMO and the MU-MIMO are fed back in the same first field at the same time, an embodiment of this application provides a first field. MCSs (or SNRs) and NSSs of SU-MIMO and MU-MIMO may be fed back in a same first field at the same time, so that the number of spatial streams is fed back more accurately, and a throughput of a communication system is improved.

A quantity of bits of the first field is 26, and the first field may include an SU-MIMO EHT-MCS subfield whose quantity of bits is 4, an MU-MIMO EHT-MCS subfield whose quantity of bits is 4, an SU-MIMO NSS subfield whose quantity of bits is greater than or equal to 3, and an MU-MIMO NSS subfield whose quantity of bits is 2. Alternatively, the first field may include an SU-MIMO SNR subfield whose quantity of bits is 6, an MU-MIMO SNR subfield whose quantity of bits is 6, an SU-MIMO NSS subfield whose quantity of bits is greater than or equal to 3, and an MU-MIMO NSS subfield whose quantity of bits is 2.

A maximum number of spatial streams indicated by the SU-MIMO NSS subfield may be 16. A maximum number of spatial streams indicated by the MU-MIMO NSS subfield may be 4.

For example, the quantity of bits of the SU-MIMO NSS subfield is equal to 3. Values 0 to 7 of the quantity of bits may respectively correspond to any eight numbers of spatial streams in numbers 1 to 16 of spatial streams. This is not limited in this application.

For example, the values 0 to 7 of the quantity of bits may respectively correspond to numbers 1, 2, 4, 6, 8, 10, 12, and 16 of spatial streams. Alternatively, the values 0 to 7 of the quantity of bits may respectively correspond to numbers 1, 3, 5, 7, 9, 11, 13, and 16 of spatial streams. This is not limited.

For example, the quantity of bits of the SU-MIMO NSS subfield is equal to 4. Values 0 to 15 of the quantity of bits may correspond to numbers 1 to 16 of spatial streams, and a specific correspondence between a bit value and a number of spatial streams is not limited. In a possible implementation, the values 0 to 15 of the quantity of bits one-to-one correspond to the numbers 1 to 16 of spatial streams. To be specific, a bit value 0 corresponds to a number 1 of spatial streams, a bit value 1 corresponds to a number 2 of spatial streams, and examples are not enumerated herein.

Further, the first field may further include an RU allocation subfield. A quantity of bits of the RU allocation subfield is 5, a quantity of bits of the RU allocation subfield is 7, a quantity of bits of the RU allocation subfield is 8, or a quantity of bits of the RU allocation subfield is 9.

For descriptions of the RU allocation subfield, refer to related descriptions of the RU allocation subfield in FIG. 10 to FIG. 24 and Table 6 to Table 10. Details are not described again.

Further, the first field may further include one or more of the following subfields: first indication information whose quantity of bits is 1, a BW subfield whose quantity of bits is greater than or equal to 3, an MSI/partial PPDU parameters subfield whose quantity of bits is 2, a Tx beamforming subfield whose quantity of bits is 1, and fourth indication information whose quantity of bits is 1.

Further, a PPDU corresponding to the first field may further include a control identifier field corresponding to the first field.

For descriptions of the first indication information, the BW subfield, the MSI/partial PPDU parameters subfield, the Tx beamforming subfield, the fourth indication information, and the control identifier field corresponding to the first field, refer to related descriptions in the foregoing embodiment. Details are not described again.

Based on the foregoing descriptions of the LA control field and the control identifier field corresponding to the first field, in this embodiment of this application, bit compression may also be performed by using one or more of the foregoing method 1 to method 6 and the following method 8, to better support more features and functions (for example, a larger number of spatial streams, more RUs, a larger bandwidth, and effective differentiation between an HE LA control subfield and an EHT LA control subfield) in the 802.11be standard or a future Wi-Fi standard by using the saved bits on the basis that the quantity of bits of the first field is kept to be 26. In other words, as long as the quantity of bits of the first field is 26, one or more of the foregoing method 1 to method 6 and the following method 8 may be used for combination, to implement bit compression or perform function information extension by using the bits saved through compression. For how to indicate related information by using a quantity of bits corresponding to a specific field, refer to the descriptions in the foregoing embodiments. Details are not described below.

Method 8: The RU allocation subfield may be removed to implement bit compression.

Figure 31:
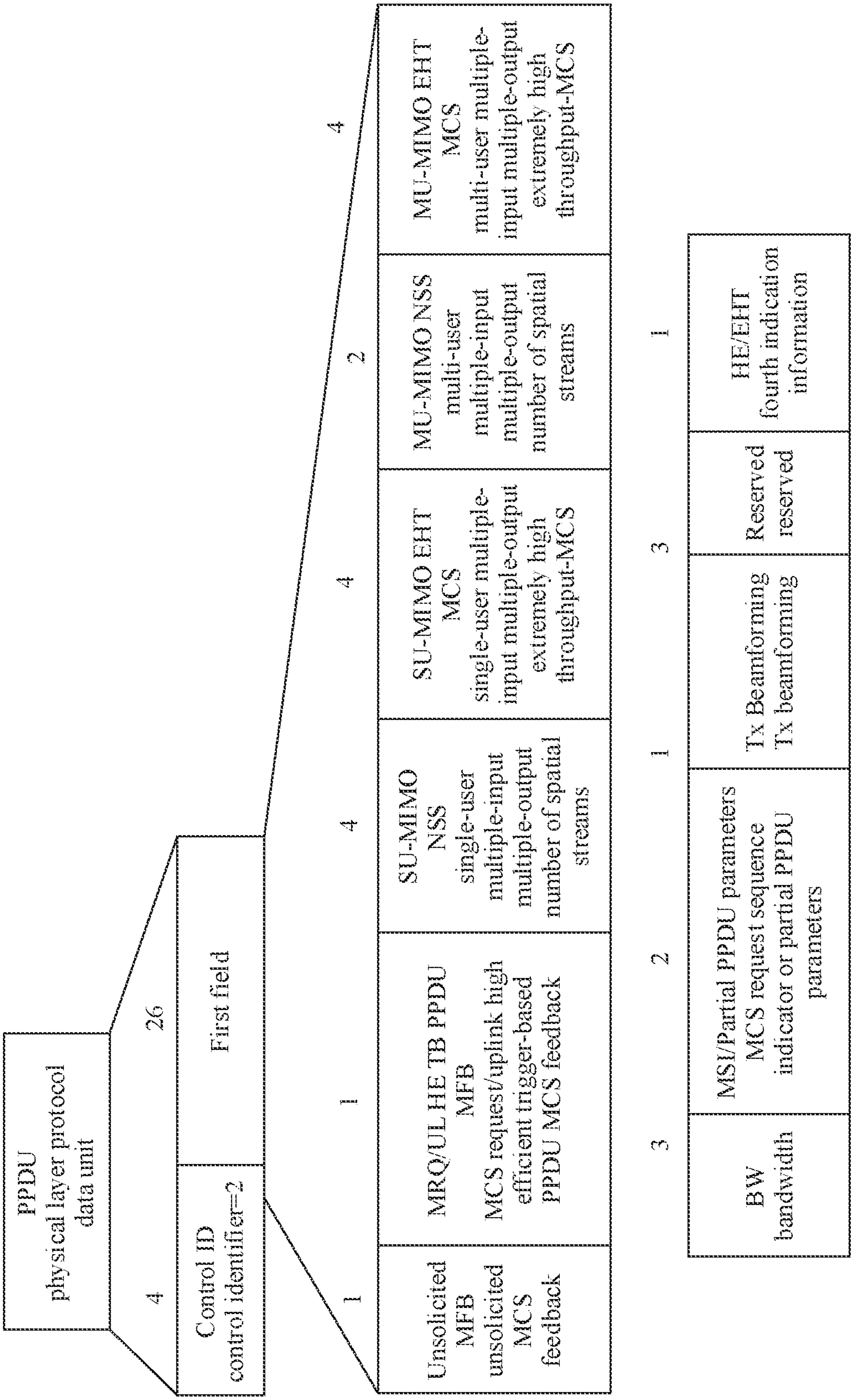
FIG. 31 is a schematic diagram of a structure of a first field frame according to an embodiment of this application.

For example, as shown in FIG. 31, compared with the 802.11ax standard, an MRQ and an UL EHT TB PPDU MFB may be compressed into 1 bit, the MSI/partial PPDU parameters subfield may be compressed into two bits, a DCM subfield may be removed, and the RU allocation subfield may be removed, so that the 4-bit SU-MIMO NSS subfield, the 4-bit SU-MIMO EHT-MCS subfield, the 2-bit MU-MIMO NSS subfield, and the 4-bit MU-MIMO EHT-MCS subfield are added, the BW subfield is extended to 3 bits, and the fourth indication information is added to indicate whether the first field is the HE LA control subfield or the EHT LA control subfield by using the saved bits and a 4-bit HE-MCS. In this way, more features and functions such as the larger number of spatial streams, more RUs, the larger bandwidth, and effective differentiation between the HE LA control subfield and the EHT LA control subfield in the 802.11be standard or the future Wi-Fi standard can be supported. It should be noted that, in this case, there are still 3 bits that are reserved bits and are not used for specific indication information. When function extension is performed on the first field, the 3-bit reserved bits may indicate specific information. When the 3 bits are used, the 3 bits are no longer considered as reserved bits.

Corresponding to the first field shown in FIG. 9 to FIG. 31, an embodiment of this application further provides a first field.

A quantity of bits of the first field is 26, and the first field may include third indication information. The third indication information may indicate that the first field corresponds to OFDMA, or the third indication information may indicate that the first field corresponds to non-OFDMA.

In an example, when the third indication information indicates that the first field corresponds to the OFDMA, the first field may further include an SU-MIMO EHT-MCS subfield whose quantity of bits is 4, an SU-MIMO NSS subfield whose quantity of bits is greater than or equal to 3, and a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9. When the third indication information indicates that the first field corresponds to the non-OFDMA, the first field may further include an SU-MIMO EHT-MCS subfield whose quantity of bits is 4, an SU-MIMO NSS subfield whose quantity of bits is greater than or equal to 3, an MU-MIMO NSS subfield whose quantity of bits is 2, and an MU-MIMO EHT-MCS subfield whose quantity of bits is 4.

In another example, when the third indication information indicates that the first field corresponds to the OFDMA, the first field may further include an SU-MIMO SNR subfield whose quantity of bits is 6, an SU-MIMO NSS subfield whose quantity of bits is greater than or equal to 3, and a resource unit allocation subfield. A quantity of bits of the resource unit allocation subfield is 5, a quantity of bits of the resource unit allocation subfield is 7, a quantity of bits of the resource unit allocation subfield is 8, or a quantity of bits of the resource unit allocation subfield is 9. When the third indication information indicates that the first field corresponds to the non-OFDMA, the first field further includes an SU-MIMO SNR subfield whose quantity of bits is 6, an SU-MIMO NSS subfield whose quantity of bits is greater than or equal to 3, an MU-MIMO NSS subfield whose quantity of bits is 2, and an MU-MIMO SNR subfield whose quantity of bits is 6.

Based on the foregoing two examples, compared with the OFDMA, when the first field corresponds to the non-OFDMA, a manner of reusing a quantity of bits may be used. A quantity of bits of an RU allocation subfield in the first field is used as the quantity of bits of the MU-MIMO NSS subfield and the quantity of bits of the MU-MIMO EHT-MCS subfield, to effectively distinguish between the OFDMA and the non-OFDMA in limited bits through bit reusing. In this way, feedback is more accurate, and a throughput of a communication system is improved.

Further, the first field may further include one or more of the following subfields: first indication information whose quantity of bits is 1, a BW subfield whose quantity of bits is greater than or equal to 3, an MSI/partial PPDU parameters subfield whose quantity of bits is 2, a Tx beamforming subfield whose quantity of bits is 1, and fourth indication information whose quantity of bits is 1.

Further, a PPDU corresponding to the first field may further include a control identifier field corresponding to the first field.

For descriptions of the first indication information, the BW subfield, the MSI/partial PPDU parameters subfield, the Tx beamforming subfield, the fourth indication information, and the control identifier field corresponding to the first field, refer to related descriptions in the foregoing embodiment. Details are not described again.

Based on the foregoing descriptions of the LA control field and the control identifier field corresponding to the first field, in this embodiment of this application, bit compression may also be performed by using one or more of the foregoing method 1 to method 6, to better support more features and functions (for example, a larger number of spatial streams, more RUs, a larger bandwidth, and effective differentiation between an HE LA control subfield and an EHT LA control subfield) in the 802.11be standard or a future Wi-Fi standard by using the saved bits on the basis that the quantity of bits of the first field is kept to be 26. In other words, as long as the quantity of bits of the first field is 26, the foregoing method 1 to method 6 may be used for combination, to implement bit compression or perform function information extension by using the bits saved through compression. For how to indicate related information by using a quantity of bits corresponding to a specific field, refer to the descriptions in the foregoing embodiments. Details are not described below.

Figure 32:
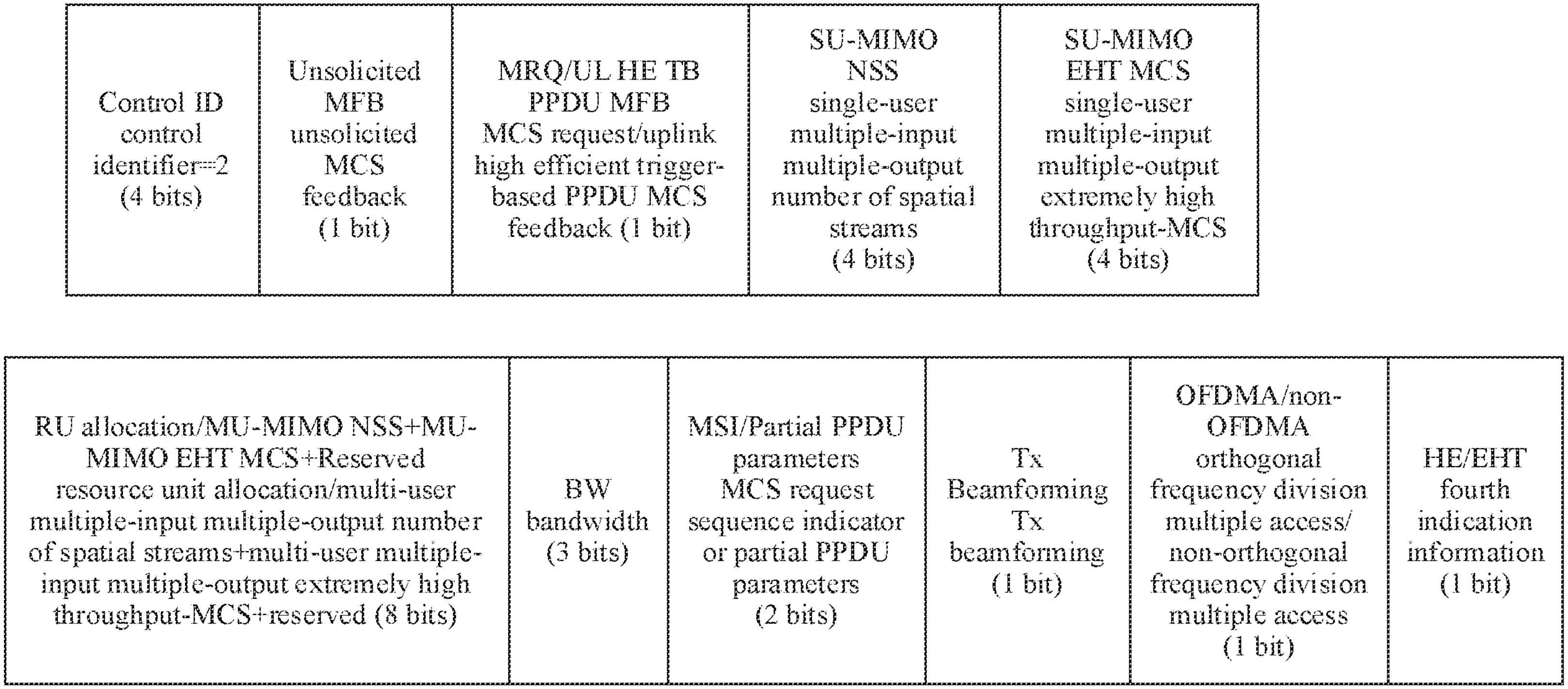
FIG. 32 is a schematic diagram of a structure of a first field frame according to an embodiment of this application.

For example, as shown in FIG. 32, compared with the 802.11ax standard, an MRQ and an UL EHT TB PPDU MFB may be compressed into 1 bit, the MSI/partial PPDU parameters subfield may be compressed into 2 bits, and a DCM subfield may be removed, so that the 1-bit third indication information, a 4-bit SU-MIMO NSS subfield, and the 4-bit SU-MIMO EHT-MCS subfield are added by using the saved bits. 8 bits of the RU allocation subfield in the 802.11ax standard indicate RU allocation. Alternatively, 8 bits of the RU allocation subfield in the 802.11ax standard no longer indicate RU allocation, but function division is performed on the 8 bits again, to indicate the 2-bit MU-MIMO NSS subfield, the 4-bit MU-MIMO EHT-MCS subfield, and 2-bit reserved bits. The BW subfield is extended to 3 bits, and the fourth indication information is added to indicate whether the first field is the HE LA control subfield or the EHT LA control subfield. In this way, more features and functions such as the larger number of spatial streams, more RUs, the larger bandwidth, and effective differentiation between the HE LA control subfield and the EHT LA control subfield in the 802.11be standard or the future Wi-Fi standard can be supported. It should be noted that, in this case, there are still 2 bits that are reserved bits and are not used for specific indication information. When function extension is performed on the first field, the 2-bit reserved bits may indicate specific information. When the 2 bits are used, the 2 bits are no longer considered as reserved bits.

It should be noted that the foregoing embodiments may be used as independent embodiments, or may be combined with other embodiments. This is not limited.

The foregoing mainly describes the solutions provided in embodiments of this application from a perspective of interaction between the devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, division into modules is an example, and is merely logical function division. In actual implementation, another division manner may be used.

Figure 33:
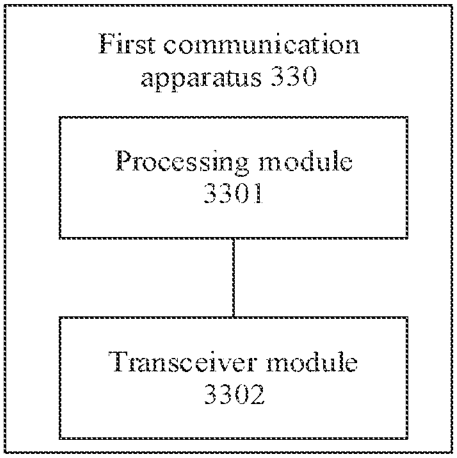
FIG. 33 is a schematic composition diagram of a first communication apparatus according to an embodiment of this application.

When each functional module is obtained through division based on each corresponding function, FIG. 33 shows a first communication apparatus. Afirst communication apparatus 330 may include a processing module 3301 and a transceiver module 3302. For example, the first communication apparatus 330 may be the first communication apparatus, or may be a chip used in the first communication apparatus, or another combined component or component that has functions of the first communication apparatus. When the first communication apparatus 330 is the first communication apparatus, the processing module 3301 may be a processor (or a processing circuit), for example, a baseband processor. The baseband processor may include one or more CPUs. The transceiver module 3302 may be a transceiver, and the transceiver may include an antenna, a radio frequency circuit, and the like. When the first communication apparatus 330 is the component that has the functions of the first communication apparatus, the processing module 3301 may be a processor (or a processing circuit), for example, a baseband processor. The transceiver module 3302 may be a radio frequency module. When the first communication apparatus 330 is a chip system, the processing module 3301 may be a processor (or a processing circuit) of the chip system or a logic circuit, and may include one or more central processing modules. The transceiver module 3302 may be an input/output interface of a chip (for example, a baseband chip). It should be understood that the processing module 3301 in this embodiment of this application may be implemented by a processor or a processor-related circuit component (or referred to as a processing circuit). The transceiver module 3302 may be implemented by a transceiver or a transceiver-related circuit component.

For example, the processing module 3301 may be configured to perform all operations performed by the first communication apparatus in the embodiments shown in FIG. 9 to FIG. 32 except sending and receiving operations, and/or configured to support another process of the technology described in this specification. The transceiver module 3302 may be configured to perform all the sending and receiving operations performed by the first communication apparatus in the embodiments shown in FIG. 9 to FIG. 32, and/or configured to support another process of the technology described in this specification.

In another possible implementation, the processing module 3301 in FIG. 33 may be replaced by a processor, and the processor may integrate a function of the processing module 3301. The transceiver module 3302 may be replaced by a transceiver, and the transceiver may integrate a function of the transceiver module 3302. Further, the first communication apparatus 330 shown in FIG. 33 may further include a memory. When the processing module 3301 is replaced by the processor, and the transceiver module 3302 is replaced by the transceiver, the first communication apparatus 330 in this embodiment of this application may be the communication apparatus shown in FIG. 8.

Figure 34:
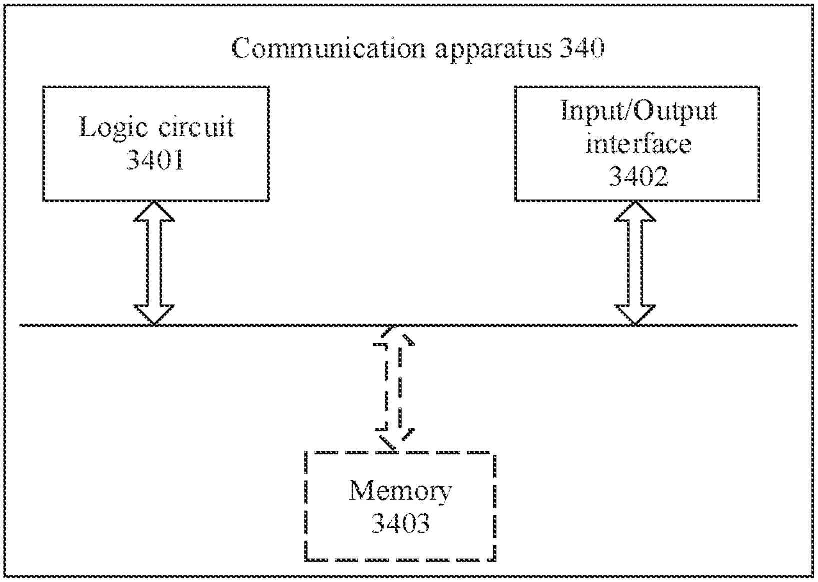
FIG. 34 is a schematic composition diagram of a communication apparatus according to an embodiment of this application.

Alternatively, when the processing module 3301 is replaced by the processor, and the transceiver module 3302 is replaced by the transceiver, the first communication apparatus 330 in this embodiment of this application may alternatively be a communication apparatus 340 shown in FIG. 34. The processor may be a logic circuit 3401, and the transceiver may be an input/output interface 3402. Further, the communication apparatus 340 shown in FIG. 34 may further include a memory 3403.

Figure 35:
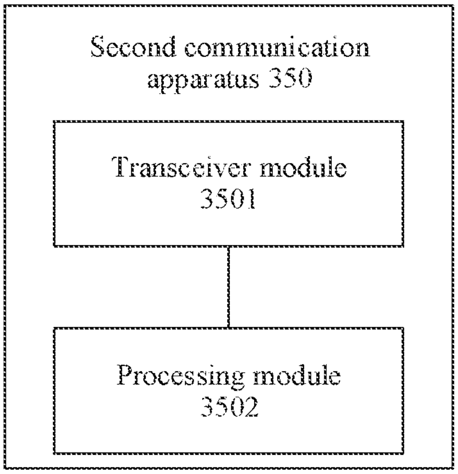
FIG. 35 is a schematic composition diagram of a second communication apparatus according to an embodiment of this application.

When each functional module is obtained through division based on each corresponding function, FIG. 35 shows a second communication apparatus. A second communication apparatus 350 may include a transceiver module 3501 and a processing module 3502. For example, the second communication apparatus 350 may be the second communication apparatus, or may be a chip used in the second communication apparatus, or another combined component or component that has functions of the second communication apparatus. When the second communication apparatus 350 is the second communication apparatus, the transceiver module 3501 may be a transceiver, and the transceiver may include an antenna, a radio frequency circuit, and the like. The processing module 3502 may be a processor (or a processing circuit), for example, a baseband processor. The baseband processor may include one or more CPUs. When the second communication apparatus 350 is the component that has the functions of the second communication apparatus, the transceiver module 3501 may be a radio frequency module, and the processing module 3502 may be a processor (or a processing circuit), for example, a baseband processor. When the second communication apparatus 350 is a chip system, the transceiver module 3501 may be an input/output interface of a chip (for example, a baseband chip). The processing module 3502 may be a processor (or a processing circuit) of the chip system or a logic circuit, and may include one or more central processing modules. It should be understood that the transceiver module 3501 in this embodiment of this application may be implemented by a transceiver or a transceiver-related circuit component, and the processing module 3502 may be implemented by a processor or a processor-related circuit component (or referred to as a processing circuit).

For example, the transceiver module 3501 may be configured to perform all sending and receiving operations performed by the second communication apparatus in the embodiments shown in FIG. 9 to FIG. 32, and/or configured to support another process of the technology described in this specification. The processing module 3502 may be configured to perform all operations performed by the second communication apparatus in the embodiments shown in FIG. 9 to FIG. 32 except the sending and receiving operations, and/or configured to support another process of the technology described in this specification.

In another possible implementation, the transceiver module 3501 in FIG. 35 may be replaced by a transceiver, and the transceiver may integrate a function of the transceiver module 3501. The processing module 3502 may be replaced by a processor, and the processor may integrate a function of the processing module 3502. Further, the second communication apparatus 350 shown in FIG. 35 may further include a memory. When the transceiver module 3501 is replaced by the transceiver, and the processing module 3502 is replaced by the processor, the second communication apparatus 350 in this embodiment of this application may be the communication apparatus shown in FIG. 8.

Alternatively, when the transceiver module 3501 is replaced by the transceiver, and the processing module 3502 is replaced by the processor, the second communication apparatus 350 in this embodiment of this application may alternatively be the communication apparatus 340 shown in FIG. 34. The processor may be the logic circuit 3401, and the transceiver may be the input/output interface 3402. Further, the communication apparatus 340 shown in FIG. 34 may further include the memory 3403.

An embodiment of this application further provides a computer-readable storage medium. All or some of procedures in the foregoing method embodiments may be implemented by a computer program instructing related hardware. The program may be stored in the foregoing computer-readable storage medium. When the program is executed, the procedures in the foregoing method embodiments may be included. The computer-readable storage medium may be an internal storage unit of the terminal (including a data transmit end and/or a data receive end) in any one of the foregoing embodiments, for example, a hard disk drive or a memory of the terminal. Alternatively, the computer-readable storage medium may be an external storage device of the terminal, for example, a plug-in hard disk, a smart media card (SMC), a secure digital (SD) card, a flash card, or the like that are configured on the terminal. Further, the computer-readable storage medium may further include both the internal storage unit of the terminal and the external storage device. The computer-readable storage medium is configured to store the computer program and other programs and data that are required by the terminal. The foregoing computer-readable storage medium may be further configured to temporarily store data that has been output or is to be output.

It should be noted that, in the specification, claims, and accompanying drawings of this application, the terms "first", "second", and the like are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

It should be understood that, in this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate that only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of this application. Therefore, "in one embodiment" or "in an embodiment" appearing throughout the specification does not necessarily refer to a same embodiment. In addition, these particular features, structures, or characteristics may be combined in one or more embodiments by using any appropriate manner.

The foregoing descriptions about implementations allow a person skilled in the art to understand that, for the purpose of convenient and brief description, division into the foregoing functional modules is used as an example for illustration. In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a ROM, a RAM, a magnetic disk, or an optical disc.

What is claimed is:

1. A communication method, comprising:

generating, by a first communication apparatus, a physical layer protocol data unit (PPDU), wherein:

the PPDU comprises a first field with 26 bits, and the first field comprises a one-bit unsolicited modulation and coding scheme (MCS) feedback (MFB) subfield and a one-bit first indication information;

based on a value of the one-bit unsolicited MFB subfield being a first value, the one-bit first indication information indicates an MCS request (MRQ); and based on the value of the one-bit unsolicited MFB subfield being a second value, the one-bit first indication information indicates an uplink extremely high throughput trigger-based PPDU MFB (UL EHT TB PPDU MFB); and sending, by the first communication apparatus, the PPDU to a second communication apparatus.

2. The method according to claim 1, wherein:

when the value of the unsolicited MFB subfield is 0, the first indication information indicates whether a solicited feedback is used; and when the value of the unsolicited MFB subfield is 1, the first indication information indicates whether information provided in the first field is used for an UL TB PPDU.

3. The method according to claim 1, wherein the first field further comprises a number of spatial streams (NSS) subfield with a quantity of bits greater than or equal to 3.

4. The method according to claim 1, wherein the first field further comprises an extremely high throughput MCS (EHT-MCS) subfield with a quantity of bits equal to 4.

5. The method according to claim 1, wherein the first field further comprises a resource unit allocation subfield with a quantity of bits equal to 8.

6. The method according to claim 1, wherein the first field further comprises a bandwidth (BW) subfield with a quantity of bits equal to 3.

7. The method according to claim 1, wherein the first field further comprises a one-bit fourth indication information, and wherein the fourth indication information indicates that the first field is an extremely high throughput link adaptation (EHT LA) control subfield, or the fourth indication information indicates that the first field is a high efficient link adaptation (HE LA) control subfield.

8. The method according to claim 1, wherein the first field further comprises a one-bit Tx beamforming subfield.

9. The method according to claim 1, wherein the PPDU further comprises a control identifier field corresponding to the first field, and a value of the control identifier field is 2.

10. A communication apparatus, comprising:

at least one processor; and at least one memory coupled to the at least one processor and storing programming instructions for execution by the at least one processor to cause the apparatus to:

generate a physical layer protocol data unit (PPDU), wherein:

the PPDU comprises a first field with 26 bits, and the first field comprises a one-bit unsolicited modulation and coding scheme (MCS) feedback (MFB) subfield and a one-bit first indication information;

based on a value of the one-bit unsolicited MFB subfield being a first value, the one-bit first indication information indicates an MCS request (MRQ); and based on the value of the one-bit unsolicited MFB subfield being a second value, the one-bit first indication information indicates an uplink extremely high throughput trigger-based PPDU MFB (UL EHT TB PPDU MFB); and send the PPDU to a second communication apparatus.

11. The apparatus according to claim 10, wherein:

when the value of the unsolicited MFB subfield is 0, the first indication information indicates whether a solicited feedback is used; and when the value of the unsolicited MFB subfield is 1, the first indication information indicates whether information provided in the first field is used for an UL TB PPDU.

12. The apparatus according to claim 10, wherein the first field further comprises a number of spatial streams (NSS) subfield with a quantity of bits greater than or equal to 3.

13. The apparatus according to claim 10, wherein the first field further comprises an extremely high throughput MCS (EHT-MCS) subfield with a quantity of bits equal to 4.

14. The apparatus according to claim 10, wherein the first field further comprises a resource unit allocation subfield with a quantity of bits equal to 8.

15. The apparatus according to claim 10, wherein the first field further comprises a bandwidth (BW) subfield with a quantity of bits equal to 3.

16. The apparatus according to claim 10, wherein the first field further comprises a one-bit fourth indication information, and wherein the fourth indication information indicates that the first field is an extremely high throughput link adaptation (EHT LA) control subfield, or the fourth indication information indicates that the first field is a high efficient link adaptation (HE LA) control subfield.

17. The apparatus according to claim 10, wherein the first field further comprises a one-bit Tx beamforming subfield.

18. The apparatus according to claim 10, wherein the PPDU further comprises a control identifier field corresponding to the first field, and a value of the control identifier field is 2.

19. A non-transitory computer-readable storage medium, wherein the non-transitory computer-readable storage medium stores computer instructions or programs for execution by a computer to:

generate a physical layer protocol data unit (PPDU), wherein:

the PPDU comprises a first field with 26 bits, and the first field comprises a one-bit unsolicited modulation and coding scheme (MCS) feedback (MFB) subfield and a one-bit first indication information;

based on a value of the one-bit unsolicited MFB subfield being a first value, the one-bit first indication information indicates an MCS request (MRQ); and based on the value of the one-bit unsolicited MFB subfield being a second value, the one-bit first indication information indicates an uplink extremely high throughput trigger-based PPDU MFB (UL EHT TB PPDU MFB); and send the PPDU to a communication apparatus.

20. The non-transitory computer-readable storage medium according to claim 19, wherein:

when the value of the unsolicited MFB subfield is 0, the first indication information indicates whether a solicited feedback is used; and when the value of the unsolicited MFB subfield is 1, the first indication information indicates whether information provided in the first field is used for an UL TB PPDU.

* * * * *